(12) United States Patent
Elkabetz et al.

(10) Patent No.: US 10,955,585 B2
(45) Date of Patent: Mar. 23, 2021

(54) REAL-TIME PRECIPITATION FORECASTING SYSTEM

(71) Applicant: ClimaCell Inc., Boston, MA (US)

(72) Inventors: Shimon Elkabetz, Boston, MA (US); Itai Zlotnik, Cambridge, MA (US); Rei Goffer, Boston, MA (US); Jacob Ribnik, New York, NY (US); Nir Nossenson, Winchester, MA (US); Rotem Bar-Or, Jerusalem (IL); Karl Ginter, Beltsville, MD (US)

(73) Assignee: CLIMACELL INC., Boston, MA (US)

( * ) Notice: Subject to any disclaimer, the term of this patent is extended or adjusted under 35 U.S.C. 154(b) by 0 days.

(21) Appl. No.: 16/102,659

(22) Filed: Aug. 13, 2018

(65) Prior Publication Data

US 2018/0348402 A1     Dec. 6, 2018

Related U.S. Application Data

(63) Continuation of application No. 15/632,025, filed on Jun. 23, 2017, now Pat. No. 10,078,155.
(Continued)

(51) Int. Cl.
*G01W 1/10* (2006.01)
*G01S 13/95* (2006.01)

(52) U.S. Cl.
CPC .............. *G01W 1/10* (2013.01); *G01S 13/95* (2013.01); *G01W 2203/00* (2013.01); *Y02A 90/10* (2018.01)

(58) Field of Classification Search
CPC .................................. G01W 1/10; G01S 13/95
(Continued)

(56) References Cited

U.S. PATENT DOCUMENTS

| 5,675,081 A | 10/1997 | Solheim et al. |
| 6,683,609 B1 | 1/2004 | Baron, Sr. et al. |

(Continued)

FOREIGN PATENT DOCUMENTS

| CN | 103680143 B | 12/2013 |
| WO | 2009/135522 A1 | 11/2009 |

(Continued)

OTHER PUBLICATIONS

International Search Report dated Apr. 25, 2018, issued in International Application No. PCT/US2017/039039.
(Continued)

*Primary Examiner* — Ricky Ngon
(74) *Attorney, Agent, or Firm* — Nixon & Vanderhye PC

(57) ABSTRACT

A computerized method of processing data for use in weather modeling is provided. The method includes receiving, from a first data source, by a first server, microwave link data including signal attenuation information. The method also includes pre-processing, in real time, by the first server, the microwave link data, thereby producing pre-processed microwave link data. The method also includes storing the pre-processed microwave link data in a first data store. The method also includes receiving, from the first data store, by a second server, the pre-processed microwave link data. The method also includes processing, on a scheduled routine, by the second server, the pre-processed microwave link data using a data transform, thereby producing first weather data.

30 Claims, 37 Drawing Sheets

Related U.S. Application Data

(60) Provisional application No. 62/479,025, filed on Mar. 30, 2017, provisional application No. 62/354,320, filed on Jun. 24, 2016.

(58) Field of Classification Search
USPC .......................................................... 702/3
See application file for complete search history.

(56) References Cited

U.S. PATENT DOCUMENTS

| | | | |
|---|---|---|---|
| 6,980,908 B2 | 12/2005 | McKewon et al. | |
| 7,365,674 B2 | 4/2008 | Tillotson et al. | |
| 9,535,158 B1 | 1/2017 | Breiholz | G01S 13/953 |
| 2001/0030624 A1* | 10/2001 | Schwoegler | G01W 1/10 |
| | | | 342/357.52 |
| 2005/0197775 A1* | 9/2005 | Smith | G08B 21/10 |
| | | | 702/3 |
| 2007/0183604 A1 | 8/2007 | Araki | G10L 17/26 |
| | | | 381/56 |
| 2008/0252412 A1 | 10/2008 | Larsson et al. | |
| 2009/0047943 A1 | 2/2009 | Araki | H04L 43/00 |
| | | | 455/423 |
| 2009/0160700 A1 | 6/2009 | Messer-Yaron et al. | |
| 2011/0054776 A1* | 3/2011 | Petrov | G01C 21/3694 |
| | | | 701/533 |
| 2011/0102192 A1* | 5/2011 | Batsakes | G08G 5/0021 |
| | | | 340/905 |
| 2012/0147030 A1* | 6/2012 | Hankers | G01W 1/00 |
| | | | 345/619 |
| 2013/0054603 A1 | 2/2013 | Birdwell et al. | |
| 2014/0300510 A1 | 10/2014 | Mills | G01W 1/04 |
| | | | 342/26 A |
| 2015/0325096 A1 | 11/2015 | Hatch | F24F 11/001 |
| | | | 340/601 |
| 2016/0299255 A1* | 10/2016 | Dail | G01W 1/10 |
| 2017/0017014 A1* | 1/2017 | Kleeman | G01W 1/10 |
| 2017/0249056 A1* | 8/2017 | Rainey | G06Q 50/26 |
| 2017/0329048 A1* | 11/2017 | Lemos | G01W 1/10 |

FOREIGN PATENT DOCUMENTS

| | | |
|---|---|---|
| WO | 201323596 A1 | 8/2013 |
| WO | 2015/111050 A1 | 7/2015 |

OTHER PUBLICATIONS

Alpert, P Novel Meteorological Applications of the Microwave Technique & New emerging avenues in atmospheric research, EGU Conference (2013).
Alpert, P. et.al. Recent advances in near-surface moisture monitoring using commercial microwave links in Tel-Aviv University, Geophysical Research Abstracts 17 (2015): pp. 2618.
Bianchi, Blandine, Joerg Rieckermann, and Alexis Berne. "Quality control of rain gauge measurements using telecommunication microwave links."Journal of Hydrology 492 (2013): 15-23.
Bianchi-2014.pdf: "A Variational Approach to Retrieve Rain Rate by Combining Information from Rain Gauges, Radars, and Microwave Link," Journal of Hydrometeorology, vol. 14, 2013.
Blazquez, R. Ruiz, Emmanuelle Vivier, and Balwant Godara. "Meteorology Using microwaves links: A comparative study." Wireless Communication Systems, 2009. /SWCS 2009. 6th International Symposium on. IEEE, 2009.
Brauer, Claudia C., et al. "The effect of differences between rain fall 1 measurement techniques on groundwater and 2 discharge simulations in a lowland catchment." Hydrological Processes (2016).
Chwala, et al, 2012.pdf: "Precipitation observation using microwave backhaul links in the alpine and pre-alpine region of Southern Germany", Hydrol. Earth Syst. Sci. 16, 2647-2661, 2012.
David, N., P. Alpert, and H. Messer. "Technical Note: Novel method for water vapour monitoring using wireless communication networks measurements."Atmospheric Chemistry and Physics 9.7 (2009): 2413-2418.
N. David, P. Alpert, H. Messer; Flash floods warning technique based on wireless communication networks data; Geophysical Research Abstracts, 2010 vol. 12 pp. Num:EGU 2010-1169-3.
David, Noam, Hagit Messer, and Pinhas Alpert. Humidity measurements using commercial microwave links. Intech Open Access Publisher, 2011.
David, N., P. Alpert, and H. Messer. "The potential of cellular network infrastructures for sudden rainfall monitoring in dry climate regions ."Atmospheric Research 131 (Sep. 2013): 13-21.
David, Noam, et al. "Cellular network infrastructure: the future of fog monitoring?." Bulletin of the American Meteorological Society 96 (Oct. 2015): 1687-1698.
David, N. et al. The potential of commercial microwave neworks to monitor dense fog-feasibility study, Journal of Geophysical Research: Atmospheres 118.20 (2013), pp. 11750-11761.
Dumounia, Ali, et al. "Rainfall monitoring based on microwave links from cellular telecommunication networks: First results from a West African test bed." Geophysical Research Letters 41.16 (2014): 6016-6022.
Fencl, M., et al. "Assessing the potential of using telecommunication microwave links in urban drainage modelling." Water Sci. Techno/. 68 (2013).
Fenicia, Fabrizio, et al. "Microwave links for rainfall estimation in an urban environment: Insights from an experimental setup in Luxembourg-City."Journal of Hydrology 464 (2012): 69-78.
Gaona, et al., 2015.pdf: "Measurement and interpolation uncertainties in rainfall maps from cellular communication networks.," Hydrol. Earth Syst. Sci., 19, 3571-3584, 2015.
Goldshtein, Oren, Hagit Messer, and Artem Zinevich. "Rain rate estimation using measurements from commercial telecommunications links." Signal Processing, IEEE Transactions on 57.4 (2009): 1616-1625.
Hoedjes, Joost, et al. "Towards Near Real-time Convective Rainfall Observations over Kenya." EGU General Assembly Conference Abstracts. vol. 15. 2013.
Hoedjes, Joost Cb, et al. "A conceptual flash flood early warning system for Africa, based on terrestrial microwave links and flash flood guidance." ISPRS International Journal of Geo-Information 3.2 (2014):584-598.
Kaufmann, M., and J. Rieckermann. Identification of dry and rainy periods using telecommunication microwave links. II 12nd International Conference on Urban Drainage, Porto Alegre/Brazil. 2011.
Leijnse_et_al.—Water_Resources_Research.pdf: "Hydrometeorological application of a microwave link: 2. Precipitation," Water Resources Research, vol. 43, 2007.
Leonhardt, Gunther, et al. "Comparison of two model based approaches for areal rainfall estimation in urban hydrology." Journal of Hydrology 511 (2014): 880-890.
Libatique, N.J. C., et al. "Design of a tropical rain-Disaster alarm system: A new approach based on wireless sensor networks and acoustic rain rate measurements." Instrumentation and Measurement Technology Conference, 2009. 12MTC'09. IEEE. IEEE, 2009.
Liberman, Y and H. Messer; Accurate Reconstruction of Rain Field Maps from Commercial Microwave Networks Using Sparse Field Modeling; 2014 IEEE International Conference on Accoustic, Speech, and Signal Processing (ICASSP) pp. 6786-6789.
Liberman, Y. and R. Samuels, P. Alpert, H. Messer; New Algorithm for Integration Between Wireless Microwave Sensor Network and Radar for Improved Rainfall Measurement and Mapping; Atmospheric Measuring Techniques 2014 vol. pp. 3549-3563 No. 7.
Liberman, Y. Object Tracking Extensions for Accurate Recovery of Rainfall Maps Using Microwave Sensor Network; 2014 European Signal Processing Conference (EUSIPCO) pp. 1322-1326.
Metzler, Christian, Ernest Koffi, and Alexis Berne. "Monitoring rain rate with data from networks of microwave transmission links." Antennas and Propagation, 2009. EuCAP 2009. 3rd European Conference on. IEEE, 2009.
Messer, H. and O. Sendik "A new approach to precipitation monitoring: A critical survey of existing technologies and challenges." Signal Processing Magazine, IEEE32.3 (2015): 110-122.

(56) References Cited

OTHER PUBLICATIONS

Messer, Hagit, Artem Zinevich, and Pinhas Alpert. "Environmental monitoring by wireless communication networks." Science 312. 5774 (2006):713-713.
Messer, Hagit, Artem Zinevich, and Pinhas Alpert. "Environmental sensor networks using existing wireless communication systems for rainfall and wind velocity measurements." Instrumentation & Measurement Magazine, IEEE15.2 (2012): 32-38.
H. Messer; Rainfall Monitoring Using Cellular Networks; IEEE Signal Processing Magazine 2007 pp. 142, 144.
H. Messer, O. Goldshtein, A. Rayitsfeld, P. Alpert; Recent Results of Rainfall Mapping from Celluar Network Measurements; 2008 IEEE International Conference on Accoustic, Speech, and Signal Processing (ICASSP) pp. 5157-5160.
Ostrometzky, J. and Messer, H. Real-Time Extraction of the Rain Induced Attenuation from Wireless Microwave Signals Based on Minimum Attenuation Values, (journal unknown, date unknown).
Overeem, A., H. Leijnse, and R. Uijlenhoet. "Measuring urban rainfall using microwave links from commercial cellular communication networks." Water Resources Research 47.12 (2011).
Overeem, Aart, Hidde Leijnse, and Remko Uijlenhoet. "Country-wide rainfall maps from cellular communication networks." Proceedings of the National Academy of Sciences 110.8 (2013):2741-2745.
A. Overeem, H. Leijnse, R. Uijlenhoet; Retrieval Algorithm for Rainfall Mapping From Microwave Links in a Cellular Communication Network; Atmospheric Measurement Techniques 2016 pp. 2425-2444 No.9.
Rahimi, A. et. al. Use of dual-frequency microwave links for measuring path-averaged rainfall, Journal of Geophysical Research 108.D15 (2003).
Rayitsfeld, Asaf et al. "Comparison of Two Methodologies for Long Term Rainfall Monitoring Using a Commercial Microwave Communication System" Journal of Atmospheric Research 104-105 (2012) pp. 119-127.
Ronkko, Mauna, et al. "Proactive environmental systems: the next generation of environmental monitoring," (2012).
Ronkko, Mauna, et al. "Automated preprocessing of environmental data."Future Generation Computer Systems 45 (2015): 13-24.
Roy, Venkat et al. "Dynamic Rainfall Monitoring Using Microwave Links" EURASIP Journal on Advances in Signal Processing 77 (2016).
Schleiss, Marc, and Alexis Berne. Identification of dry and rainy periods using telecommunication microwave links. II Geoscience and Remote Sensing Letters, IEEE 7.3 (2010): 611-615.
Omry Sendik and Hagit Messer, On the achievable coverage of rain field mapping using measurements from a given set of microwave links, Electrical & Electronics Engineers in Israel (IEEEI), 2014 IEEE 28th Convention of Electrical and Electronics in Israel.
Tromel, S. Using Microwave Backhaul Links to Optimize the Performance of Algorithms for Rainfall Estimation and Attenuation Correction, Jornal of Atmospheric and Oceanic Technology 31 (2014), pp. 1748-1760.
Yaghoubi, F. et.a. Mitigation of Rain Impact on Microwave Backhaul Networks, IEEE ICC Workshops (2016.)
A. Zinevich, P. Alpert, H. Messer; Estimation of Rainfall Fields Using Commercial Microwave Communication Networks of Variable Density; Advances in Water Resources 2008 pp. 1470-1480 No. 31.
Zinevich, Artem, Hagit Messer, and Pinhas Alpert. "Frontal rainfall observation by a commercial microwave communication network." Journal of Applied Meteorology and Climatology48.7 (2009):1317-1334.
Carbone, et al. "Observing Weather and Climate from the Ground Up: A Nationwide Network of Networks." National Academies Press, 2009.
"NEXRAD." Wikipedia. Wikimedia Foundation, Inc. Sep. 8, 2003. Web. Jun. 15, 2017.
H. Messer and L. Gazit, "From cellular networks to the garden hose: Advances in rainfall monitoring via cellular power measurements." 2016 IEEE Global Conference on Signal and Information Processing (GlobalSIP), Washington, DC, 2016, pp. 1012-1016.
Extended European Search Report for corresponding EP17816311, dated Jan. 30, 2020; 9 pages.
D. Giuli, et al., "Tomographic Reconstruction of Rainfall Fields through Microwave Attenuation Measurements", Journal of American Meteorology Society, vol. 30, Sep. 1, 1991; pp. 1323-1340.
International Preliminary Report on Patenability for corresponding PCT/US2018/067203, dated Jun. 23, 2020.
Related U.S. Appl. No. 16/181,137, filed Nov. 5, 2018.
Related U.S. Appl. No. 16/181,148, filed Nov. 5, 2018.

* cited by examiner

Transforming data from sources to Collections Stack

Precipitation NowCasting

Overview Map

Timeline

Select a time range

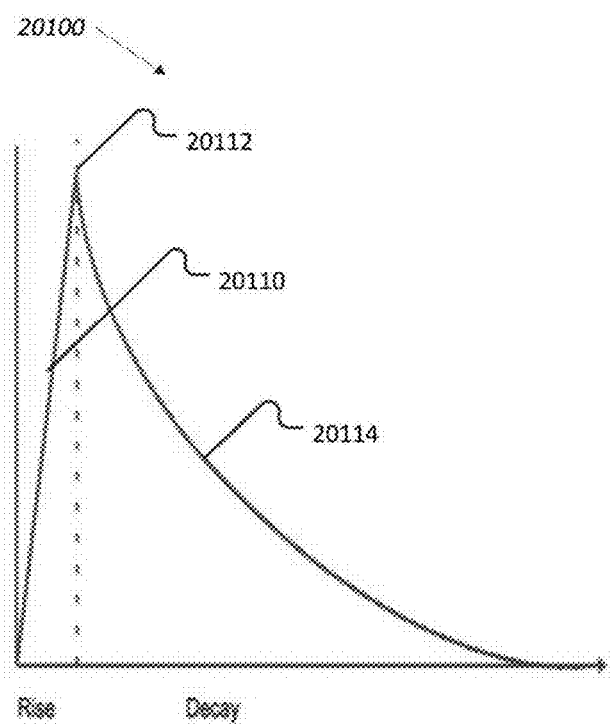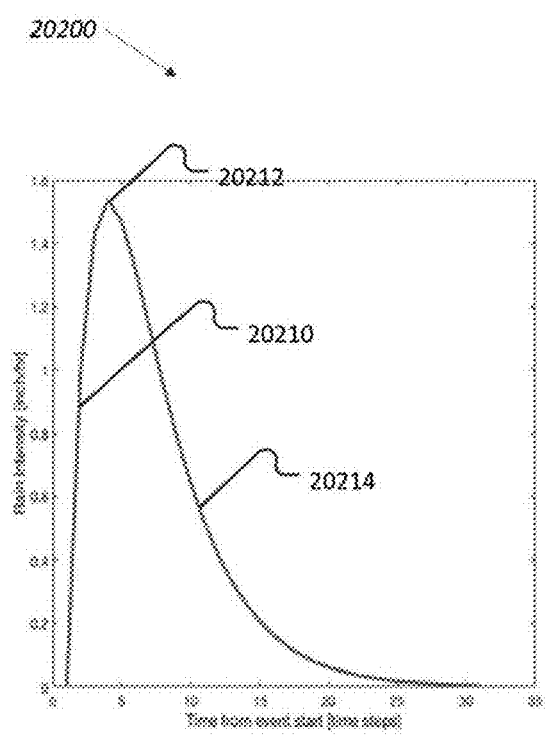
FIGURE 35A                      FIGURE 35B

REAL-TIME PRECIPITATION FORECASTING SYSTEM

1 CROSS REFERENCE TO RELATED U.S. PATENT APPLICATIONS

The present application claims the benefit of application Ser. No. 15/632,025 filed on Jun. 23, 2017, now U.S. Pat. No. 10,078,155, and PCT/US17/39039 filed Jun. 23, 2017, which claim priority from provisional U.S. Patent Application No. 62/354,320 filed Jun. 24, 2016 and provisional U.S. Patent Application No. 62/479,025 filed Mar. 30, 2017, all of which are incorporated herein by reference in their entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2017, ClimaCell, Inc.

3 BACKGROUND

3.1 Field

The exemplary, illustrative, technology herein relates to systems, software, and methods for the determination of current weather phenomena and the generation of accurate weather and precipitation forecasts using automated means of collecting and processing signal attenuation information in accordance with the descriptions provided herein. The technology herein has applications in the areas of signal processing, radio network operations, and precipitation forecasting.

3.2 The Related Art

Radio signal propagation, and in particular, radio signal attenuation, has been associated with weather phenomena for many years. In past decades, attempts have been made to correlate weather and signal attenuation and, more recently, to predict future weather based upon this information. The approaches to date have encountered obstacles.

U.S. patent application Ser. No. 11/995,335 describes an attempt to calculate instantaneous rainfall rates from point-to-point microwave link network attenuation data. There are a number of constraints and limitations that prevented these techniques from effectively being used in real-time (or near real-time) production systems. The algorithms used in these attempts were too computationally intensive to complete the calculations in a timely manner. Specifically, all of these calculations were made after the events, diminishing any predictive value of the calculations.

It is well understood that precipitation, and in particular, heavy precipitation, severely attenuates microwave signals at frequencies above 5 GHz as illustrated in FIG. 1. Radars, terrestrial microwave links, and satellite uplink/downlink signals typically operate in this frequency range and are affected by this attenuation. Signal path length also affects signal attenuation. Besides the attenuation inherent in the signal path due to path length, a longer signal path is affected more by precipitation and other weather phenomena along the path.

Known weather information display systems include websites and weather applications such as those provided by AccuWeather, the Weather Channel, or wunderground.com. These systems display precipitation forecasts derived from National Oceanic and Atmospheric Administration (NOAA) weather radar measurements and numerical weather prediction (NWP) models. The displayed information is typically based on cloud-level and other higher level atmospheric measurements, sometimes combined with or supplemented by rain gauge data, which has limited availability and limited temporal and spatial resolution. Furthermore, the precipitation data in these systems is typically of low spatial resolution. For example, NWP information is typically provided for 1 km×1 km grids, which is interpolated for display to end users. Additionally, the temporal accuracy of this information is low, with updates occurring approximately every 20 minutes. These limitations of input data result in low fidelity commercial forecasts that have low accuracy.

FIG. 2 illustrates a typical prior art Terrestrial Wireless Network based upon Long Term Evolution (LTE) networking standards included in 3rd Generation Partnership Project (3GPP) Release 8 and subsequent 3GPP releases. A typical 5 GHz terrestrial wireless network (200) includes a plurality of antenna masts (210a, 210b, 210c) each of which has at least one antenna connected to one or more E-UTRAN node B (eNB) nodes. An antenna mast is any structure to which an antenna is mounted, typically a cell phone tower, water tower, or tall building. An eNB may be connected to a plurality of antennas on a single antenna mast, or may be connected to one or more antennas on a plurality of antenna masts. eNB nodes include cellular phone system transceivers that perform functions for radio bearer control, radio admission control, connection mobility control, dynamic allocation of resources, and collection of link measurement data for signal strength, attenuation, link status, and device location/mobility.

Point-to-point microwave links (220a-b, 220b-a, 220a-c, 220b-c) are geographically stationary, and include dedicated point-to-point microwave transceivers forming microwave links in the 5 Ghz to 80 GHz frequency range. Static microwave links include eNB to eNB cellular frequency links (e.g. 240b-c). Dynamic microwave links include those cellular microwave links (240a-240h, 255a, 255b) between eNBs and UEs where one or both link endpoints are changing location on at least a periodic basis. eNB and point-to-point microwave link transceivers are optionally in communication using either point-to-point microwave links or dedicated data lines (282a, 282b, 282c) with one or more network management systems (NMS) (280) that monitor and collect link measurement and signal information. Wireless network (200) further comprises cellular microwave links (240a-240h) between one or more eNBs and handsets (230a-230i), and cellular microwave links (255a, 255b) between small-cell/base stations (250), customer premises equipment (CPE) router (260), and an eNB (210c). Handsets (230a-230i), CPE Router (260), and small-cell/base station (250) are collectively referred to herein as "user equipment" (UE). An eNB can often determine the general location of a particular connected UE (e.g. UE that has a link to the eNB) based upon the antenna that the wireless signal is received upon and the propagation time of the signal. Dynamic microwave links attributes such as frequency, link length, and the resulting dry air attenuation can change with time, for example, link lengths that change as UEs move closer to or further from a serving eNB and transition from a first serving eNB to a second serving eNB, or that change the frequency that is used for the link.

Point-to-point microwave link frequencies can include licensed spectrum such as 6-42 GHz and 80 GHz or unlicensed or lightly licensed spectrum including sub 6 GHz and 60 GHz. Example point-to-point link frequencies include: 6-8 GHz (for example, in rural implementations with link lengths up to 25 miles) and 23 GHz in urban locations with link lengths of less than 5 miles.

Typical baseline or dry air attenuation experienced for point-to-point microwave link signaling can be approximately 10 dB for link lengths of approximately 3-10 miles and 1-2 dB for link lengths of approximately 1 mile.

Terrestrial Wireless Network operators record and store, in their NMS (280), link measurement data that can be used to characterize and track microwave link quality. Link measurement data may be recorded on whatever time interval is desired by the Terrestrial Wireless Network operator, although to reduce bandwidth usage of maintenance messages and to save storage space, various measurement intervals are used. Measured parameters include Transmitted Signal Level (TSL) and Received Signal Level (RSL). Terrestrial Wireless Network operators and microwave link equipment manufacturers use various approaches for sampling and storing microwave signal characteristics. Typically, Terrestrial Wireless Network operators will store TSL and RSL data. Sometimes, only limited samples of the TSL and RSL are stored to decrease data storage requirements. Sampling can include storing average values wherein the technology saves the average of the signal level over an operator specified time frame, typically 1, 5, or 15 minutes. Some Terrestrial Wireless Network operators save only the minimum and the maximum values of the TSL and the RSL [e.g. min/max TSL, min/max RSL]. Terrestrial Wireless Network operators can also perform instantaneous sampling of link measurement data, saving one sample per sampling instance on a periodic basis.

Quantization is a procedure used for constraining something from a continuous set of values (such as the real numbers) to a relatively small discrete set (such as the integers). For example, quantization of 0.1 will convert a number such as 54.612343 to 54.6 [rounding]. Common quantization levels are 0.1, 0.3 and 1.0 dB.

Point-to-point microwave links are microwave links with known geographic endpoints (e.g. microwave link 220a-c) with link characteristics that are all known or that can be straightforwardly computed. For each point-to-point microwave link, generally at least the following microwave link infrastructure data parameters are known: link identifiers including path name, a first path endpoint (a), antenna name, a second path endpoint (b) antenna site name; endpoint (site a and site b) antenna locations (including longitude and latitude), link length, and microwave signal parameters including frequency used (in MHz), polarization (e.g. horizontal or vertical), and quantization level (dB).

User equipment (UE) devices comprise handsets (230a-230i), CPE Router (260), and small cell/base station (250), all of which are devices that connect to an eNB using dynamic or static microwave links. Handset UEs (230a-230i) represent any mobile device, workstation, tablet, laptop computer. personal digital assistant (PDA), cellular telephones, or other equipment capable of communicating with eNB antennas mounted on antenna masts (210a, 210b, 210c). Small cell/Base station (250) represents a repeater device which relays a cellular microwave link signal (255a) to provide a boosted dynamic microwave signal (252). CPE Router (260) represents a router that connects with an eNB (via an antenna on an antenna mast (210c)) over a cellular microwave link (255b) and provides internet access, via the cellular microwave link (255b), to a computing device (264) over Wi-Fi link (262).

Cellular microwave links (240a-240h and 255a, 255b) represent one of LTE, cellular radiotelephone and data links such as 3rd Generation Partnership Project (3GPP) 3G, or 4G cellular radio network links. Cellular microwave links configured according to LTE or 4G standards can use channels with bandwidths of 1.4 MHz to 20 MHz in the 452-3800 MHz frequency bands and in the unlicensed 5322-5925 MHz frequency bands. Proposed 5G dynamic microwave links can use frequencies greater than 5 GHz, for example frequencies in the 15, 26, 28, 38, 60 and 72-73 GHz frequency bands.

During network operation, each antenna mast (210a, 210b, 210c) periodically transmits specific reference signals (RS) at a configured constant magnitude of transmitted power. Each eNB node can also transmit UE specific reference signals and reference signals associated with multicast services. Each reference signal is transmitted in a power boosted manner (6 dB more than surrounding data symbols) and includes an identifier of the eNB node that transmitted the RS. UEs (230a-230h, 250, 260) are informed of reference signal transmit power and perform periodic link measurements of the RS received power (RSRP). This link measurement data provides the basis for signal attenuation calculations. The eNB-UE signals also include timing information that permits both the UE and the eNB to determine the signal propagation time and thus calculate the link length. Calculated link length for a UE and several eNB nodes enables triangulation of the UE location if a location is not known.

Link measurements of RSRP by multiple UEs are reported to eNB nodes and forwarded to the network management systems (280) for use in managing the radio network. eNB nodes also measure RSRP of reference signals sent from UEs to eNB. RSRP measurements are especially useful for determining link attenuation that may be associated with precipitation events.

Link measurement data can also be gathered directly from UE devices. These devices may collect and report signal measurement, including received power measurements of reference signals, to an eNB and/or a management system, or a management system may connect with UE devices on a periodic, scheduled, or other basis to collect signal measurement data. Terrestrial Wireless Network operators record and store link measurement data, including RSRP and received signal strength indicator (RSSI) data, that can be used to characterize and track link signal quality. Similar to data collection of point-to-point microwave link signal metrics, different Terrestrial Wireless Network operators and microwave link equipment manufacturers use different protocols for sampling and storing the RSRP and RSSI data and may use quantization for RSSI data to constrain data storage resources. For example, RSRP data measurements may be encoded and reported as an integer representing a range of measurement values, e.g. 1 represents −140<=RSRP<−139, 2 represents −139<=RSRP<−138, etc.

Link-related metadata and ancillary data available from Terrestrial Wireless Network operators include eNB node information comprising site (antenna) name, antenna location including longitude and latitude, and antenna height. Information available for UE from Terrestrial Wireless Network operators also includes UE identification, UE location from GPS coordinates or using triangulation information from multiple towers, signal transmit strength, signal frequency, modulation scheme, and bandwidth.

Attenuation of cellular microwave links (240a-240h) due to precipitation can be relatively small (e.g. less than 10 dB) such that perturbations in attenuation due to precipitation or other atmospheric conditions of interest can be difficult to differentiate from random or non-rain related variations based on individual link signal measurements.

Radio links to endpoints located in buildings, for example links 240h, 255a, and 255b, suffer from increased signal attenuation due to interference caused by building materials and indoor endpoints (230h, 250, 260). Indoor signal attenuation can be determined using experimental measurements or an adjustment factor can be applied to path loss models. In some cases, the magnitude of the signal attenuation may be used to determine whether or not a UE is within a building structure.

5 Ghz Terrestrial Wireless Networks exhibit static or dynamic microwave link characteristics for UE to eNB communications. Some UE (e.g. small cell/base stations and repeaters) are typically installed in static locations and that exhibit microwave link characteristics that are generally static, although the frequency used and the eNB that they are connected to may infrequently change. Static UE are often line powered and may use higher power levels (and thus have longer link distances to an eNB). Handset UEs have dynamic location and link characteristics (e.g. link length, frequency used, distance-based attenuation), because the handsets are frequently moving, and often use lower power levels to conserve battery life The constantly changing link topologies of cellular networks make the existing static topology algorithms for characterizing and mapping precipitation unworkable, particularly when real-time prediction of the precipitation is needed. Existing calculation algorithms were modelled using relatively infrequent measurements of link attenuation and rely upon fixed microwave link characteristics in order to map possible precipitation along the link path. Real time data collection and prediction requires much shorter measurement intervals and results in data volumes increasing many-fold.

In particular, many of the proposed academic algorithm processing times exponentially scale with respect to the number of link inputs. Increasing the number of microwave links by incorporating the UE-based link measurement data means the processing time to calculate the link effects due to precipitation grows exponentially. Calculation schemes that work in batch mode on statically defined sparse network links break down when there are orders of magnitude more network links and the resulting calculations must be completed quickly for the data to be useful.

Furthermore, the mapping of microwave link attenuation to precipitation estimates depends upon communication links being well defined (e.g. static locations and frequencies), and the resulting area coverage of these links being well defined, in order to reduce the complexity of the modelling calculations. When many of these microwave links are dynamically changing with respect to location and even presence, and furthermore when they may vary in frequency usage from minute to minute, the ability to statically map links to area coverage becomes much harder.

Taken together, these challenges mean that existing systems fail from an information handling perspective in their ability to provide real-time prediction of precipitation amounts.

The prior art approaches collectively demonstrate notable deficiencies when applied to current and planned microwave-based network topologies. First, they are hindcast model development techniques, which provide, by definition, a forecast after the event has happened. They are also limited with respect to the data sources used, as these data sources have built in inaccuracies due to limits in the underlying models, and are based upon unchanging configurations of networks and data sources. Accordingly, they are non-generalizable and are insufficient to support real-time analysis and prediction of weather-related phenomena. New methods of collecting and processing information are needed in order to produce the desired real-time analysis and prediction capabilities.

4 SUMMARY

In one aspect, the technology herein features a computerized method of processing data for use in weather modeling. The method includes receiving, from a first data source, by a first server, microwave link data including signal attenuation information. The method also includes pre-processing, in real time, by the first server, the microwave link data, thereby producing pre-processed microwave link data. The method also includes storing the pre-processed microwave link data in a first data store. The method also includes receiving, from the first data store, by a second server, the pre-processed microwave link data. The method also includes processing, on a scheduled routine, by the second server, the pre-processed microwave link data using a data transform, thereby producing first weather data.

In some embodiments, the method includes storing the first weather data in a second data store. In some embodiments, the method includes receiving, by a third server, the first weather data. In some embodiments, the method includes receiving, by the first server, from a second data source, second weather data. In some embodiments, the method includes storing the second weather data in a third data store. In some embodiments, the method includes processing, by the third server, the first weather data and the second weather data, thereby producing blended weather data.

In some embodiments, the blended weather data includes at least a precipitation intensity for a plurality of tiles, each tile corresponding to a grid location. In some embodiments, the method includes storing the blended weather data in a fourth data store. In some embodiments, the method includes receiving, by a fourth server, the blended weather data. In some embodiments, the method includes processing, by the fourth server, the blended weather data, thereby producing processed blended weather data, the processed blended weather data usable by an on-demand information product.

In some embodiments, the method includes producing, by the third server, forecast data based on the blended weather data. In some embodiments, the microwave link data comprises terrestrial wireless network data including wireless network topology information and wireless link information. In some embodiments, the processed blended weather data includes map data usable to display a map on a viewing device. In some embodiments, the on-demand information product is a real-time precipitation map.

In some embodiments, the first data store and the second data store are included in a common database. In some embodiments, two or more of the first data store, the second data store, the third data store, and the fourth data store are included in a common database. In some embodiments, pre-processing of the microwave link data and processing of the pre-processed microwave link data include associating the pre-processed microwave link data with a cadence instance Mi of a cadence cycle, the cadence cycle having a predetermined time delay between cadence instances. In some embodiments, processing of the pre-processed microwave link data occurs successively for multiple cadence instances of the cadence cycle. In some embodiments, the predetermined time delay is less than five minutes. In some embodiments, the predetermined time delay is less than fifteen minutes.

In some embodiments, storing of the pre-processed microwave link data occurs successively for multiple cadence instances of the cadence cycle. In some embodiments, each cadence instance includes one or more tile layers, each tile layer representing pre-processed microwave link data. In some embodiments, the method includes receiving, by a third server, first weather data. In some embodiments, the method includes calculating, by the third server, forecast weather data based upon the first weather data. In some embodiments, the method includes storing, by the third server, the forecast weather data in a fourth data store. In some embodiments, the method includes receiving, from the fourth data store, the first forecast weather data. In some embodiments, the method includes producing, based on the first forecast weather data, second forecast weather data. In some embodiments, the method includes storing, by the third server, in the fourth data store, the second forecast weather data.

In some embodiments, the method includes receiving, by a third server, blended weather data. In some embodiments, the method includes calculating, by the third server, forecast weather data based upon the blended weather data. In some embodiments, the method includes storing, by the third server, in a fourth data store, the forecast weather data. In some embodiments, the method includes receiving, from the fourth data store, the first forecast weather data. In some embodiments, the method includes producing, based on the first forecast weather data, second forecast weather data. In some embodiments, the method includes storing, by the third server, in the fourth data store, the second forecast weather data.

In another aspect, the technology herein features a system for processing data for use in weather modeling. The system includes a first server for receiving microwave link data and pre-processing the microwave link data, thereby creating pre-processed microwave link data. The system also includes a second server for receiving the pre-processed microwave link data and processing the pre-processed microwave link data, thereby producing first weather data, the second server in communication with the first server via a communications network. The system also includes a first data store for storing the pre-processed microwave link data, the first data store in communication with the first server via the communications network.

In some embodiments, the system includes a second data store for storing the first weather data, the second data store in communication with the second server via the communications network. In some embodiments, the system includes a third server for receiving first weather data and second weather data and processing the first and second weather data to produce blended weather data, the third server in communication with the first server and the second server via the communications network. In some embodiments, the system includes a fourth server for receiving the blended weather data and producing processed blended weather data usable by an on-demand information product, the fourth server in communication with the first server, the second server and the third server via the communications network.

In another aspect, the technology herein features a method of determining a local precipitation intensity based on cellular network data. The method includes obtaining, by a first server in communication with a cellular network, a first data set from the cellular network. The data set includes location, power, attenuation and frequency information of a first wireless link operating at a frequency above 5 GHz between an eNB and a customer device. The method also includes calculating, by the first server in communication with the cellular network, link parameters for the first wireless link based on the first data set. The link parameters include one of a length of the first wireless link and an endpoint of the first wireless link. The method also includes obtaining, by the first server, a second data set for at least one other wireless link. The second data set includes attenuation information for the at least one other wireless link. The method also includes determining, by the first server, if link parameters including link length and link endpoints are missing for wireless links in the second data set, and if link parameters are missing, calculating one or more missing link parameters. The method also includes determining, by a second server in communication with the cellular network, based on the first and second data sets, the local precipitation intensity.

In another aspect, the technology herein features a computerized method of defining a data transform for processing pre-processed microwave link data. The method includes receiving, by a first server, microwave link infrastructure data. The method also includes error checking, by the first server, the microwave link infrastructure data, the first server rejecting or correcting any erroneous portions of the microwave link infrastructure data, thereby producing cleaned microwave link infrastructure data. The method also includes storing the cleaned microwave link infrastructure data in a first data store in communication with the first server. The method also includes receiving, from the first data store, by a second server in communication with the first data store, the cleaned microwave link infrastructure data. The method also includes processing, by the second server, the cleaned microwave link infrastructure data, thereby producing a microwave link infrastructure transform. The method also includes storing the microwave link infrastructure transform in a second data store in communication with the second server.

In some embodiments, processing the cleaned microwave link infrastructure data further includes: creating, by the second server, a lookup table for a set of microwave links of the microwave link infrastructure data, each microwave link in the table corresponding to one or more precipitation effect data points distributed on a grid and having grid coordinates; associating, by the second server, a percentage of a normalized attenuation for each microwave link to a corresponding precipitation effect data point; and/or converting, by the second server, the precipitation effects data points from grid coordinates to tile coordinates.

In some embodiments, processing the cleaned microwave link infrastructure data further includes: creating, by the second server, a grid of proforma microwave links surrounding one or more eNBs; creating, by the second server, a lookup table for a set of proforma microwave links of the microwave link infrastructure data, each proforma microwave link in the table corresponding to a precipitation effect data point distributed on a grid and having grid coordinates; associating, by the second server, a percentage of a normalized attenuation for each proforma microwave link with a corresponding precipitation effect data point; and/or converting, by the second server, each precipitation effect data point from grid coordinates to tile coordinates.

5 BRIEF DESCRIPTION OF THE DRAWINGS

The features of the present technology will best be understood from a detailed description of the technology and example embodiments thereof selected for the purposes of illustration and shown in the accompanying drawings in which.

Figure 15:
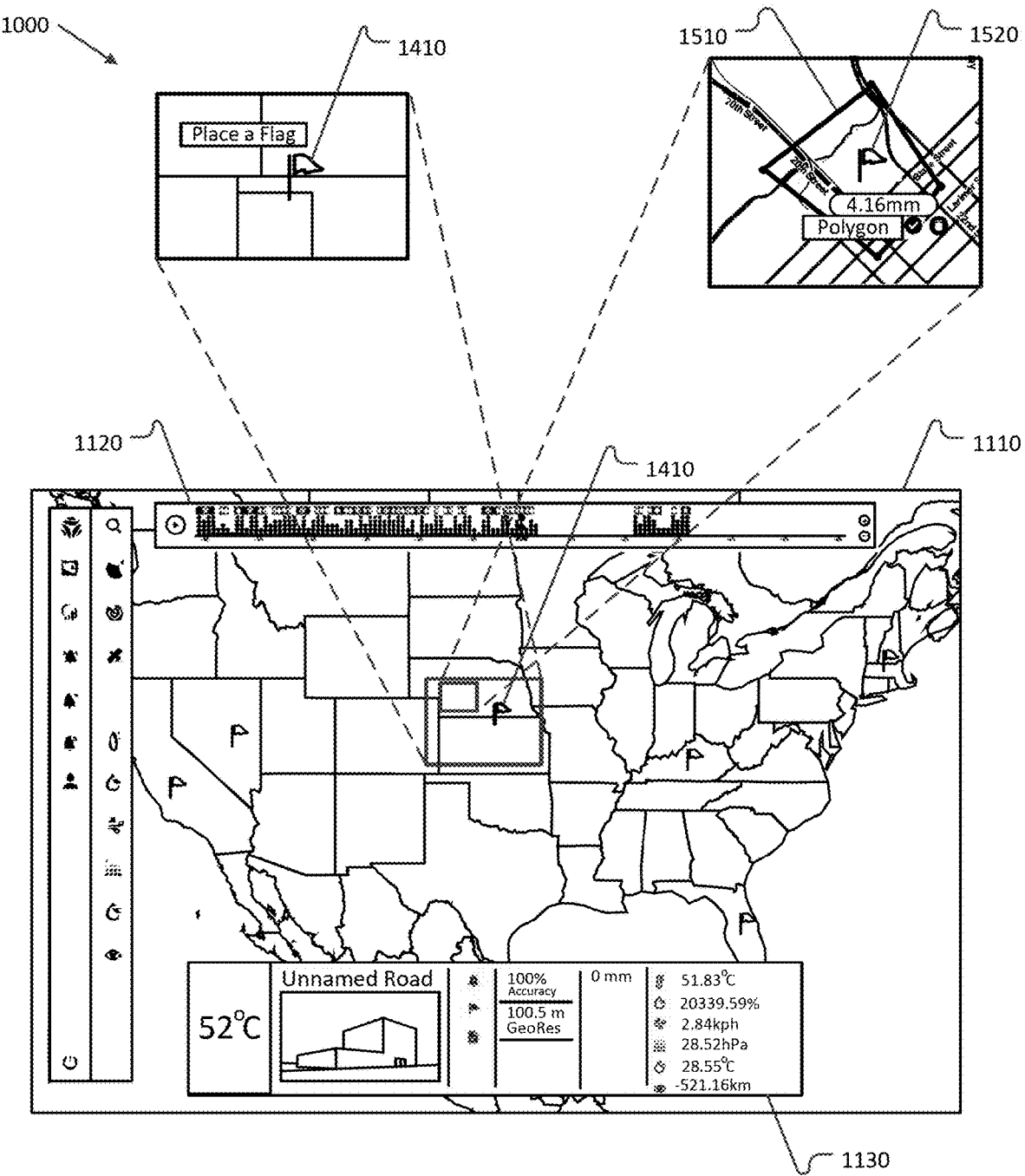

FIG. 15 provides an exemplary overview map display indicating user specified locations of interest and detailed display bar for one of the locations of interest, according to an illustrative embodiment.

Figure 16:
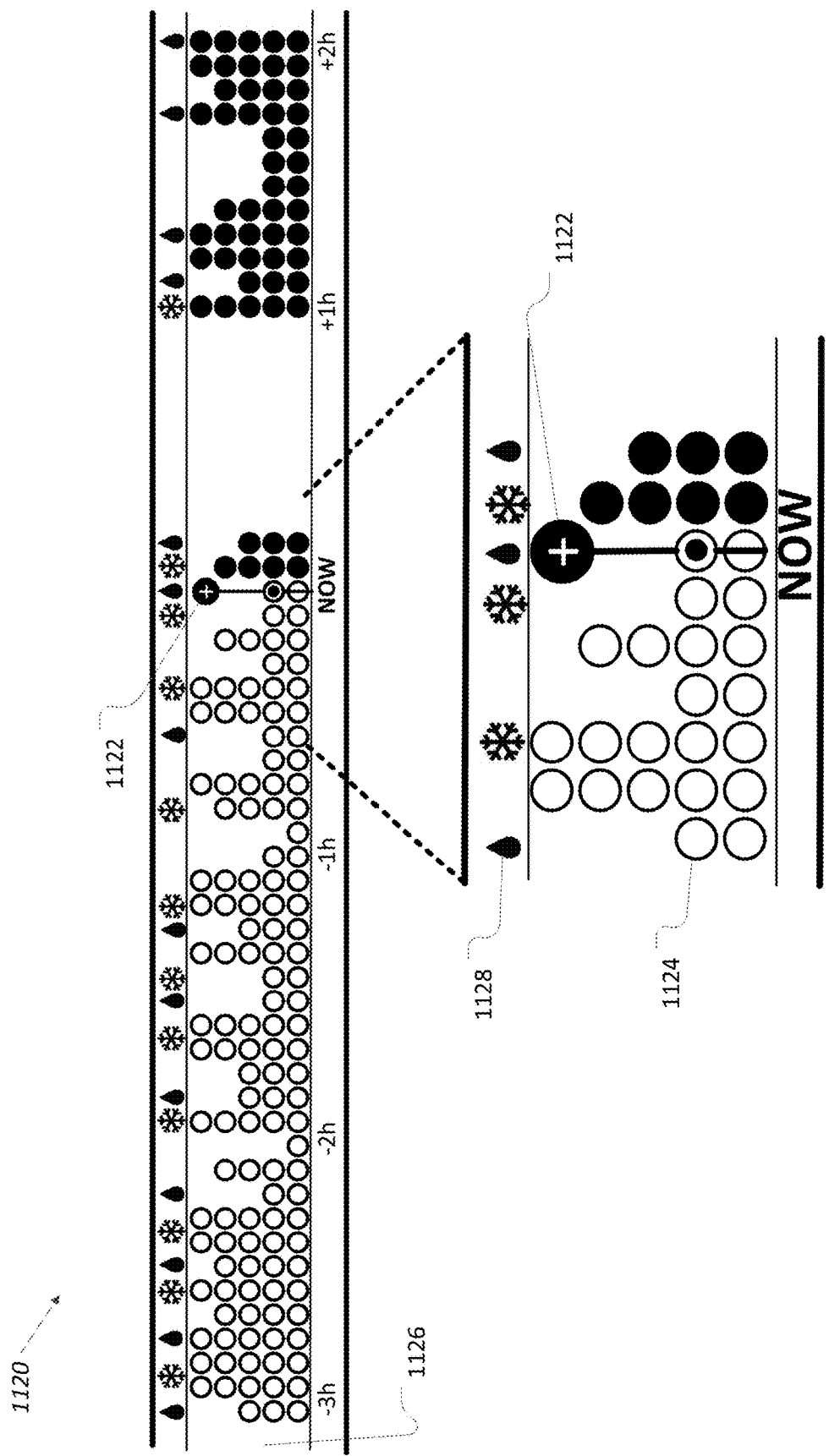

FIG. 16 provides an exemplary illustration of the timeline component of the overview map display, according to an illustrative embodiment.

Figure 17:
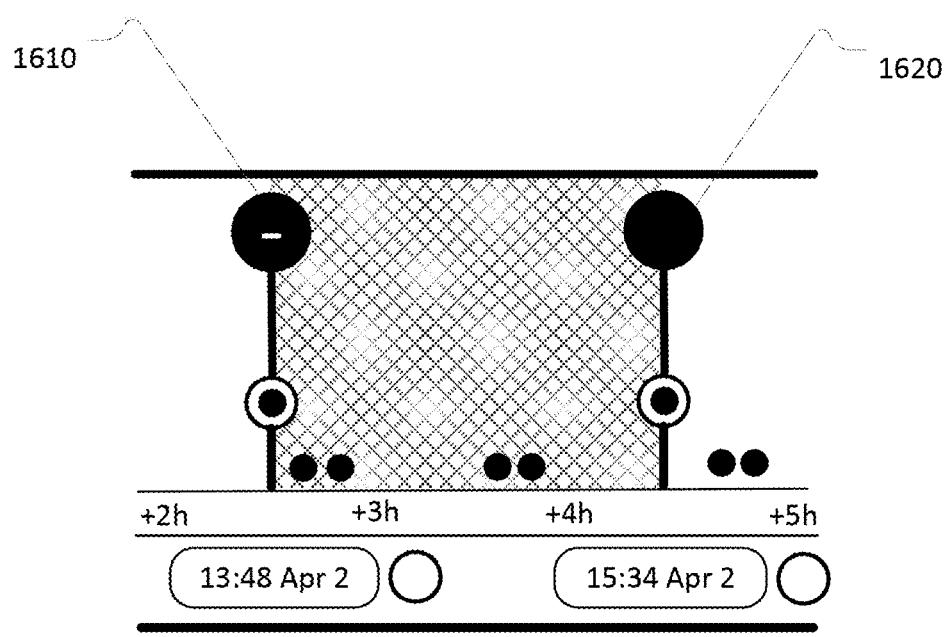

FIG. 17 provides an exemplary illustration of a "select a time range" function within the timeline component, according to an illustrative embodiment.

Figure 18:
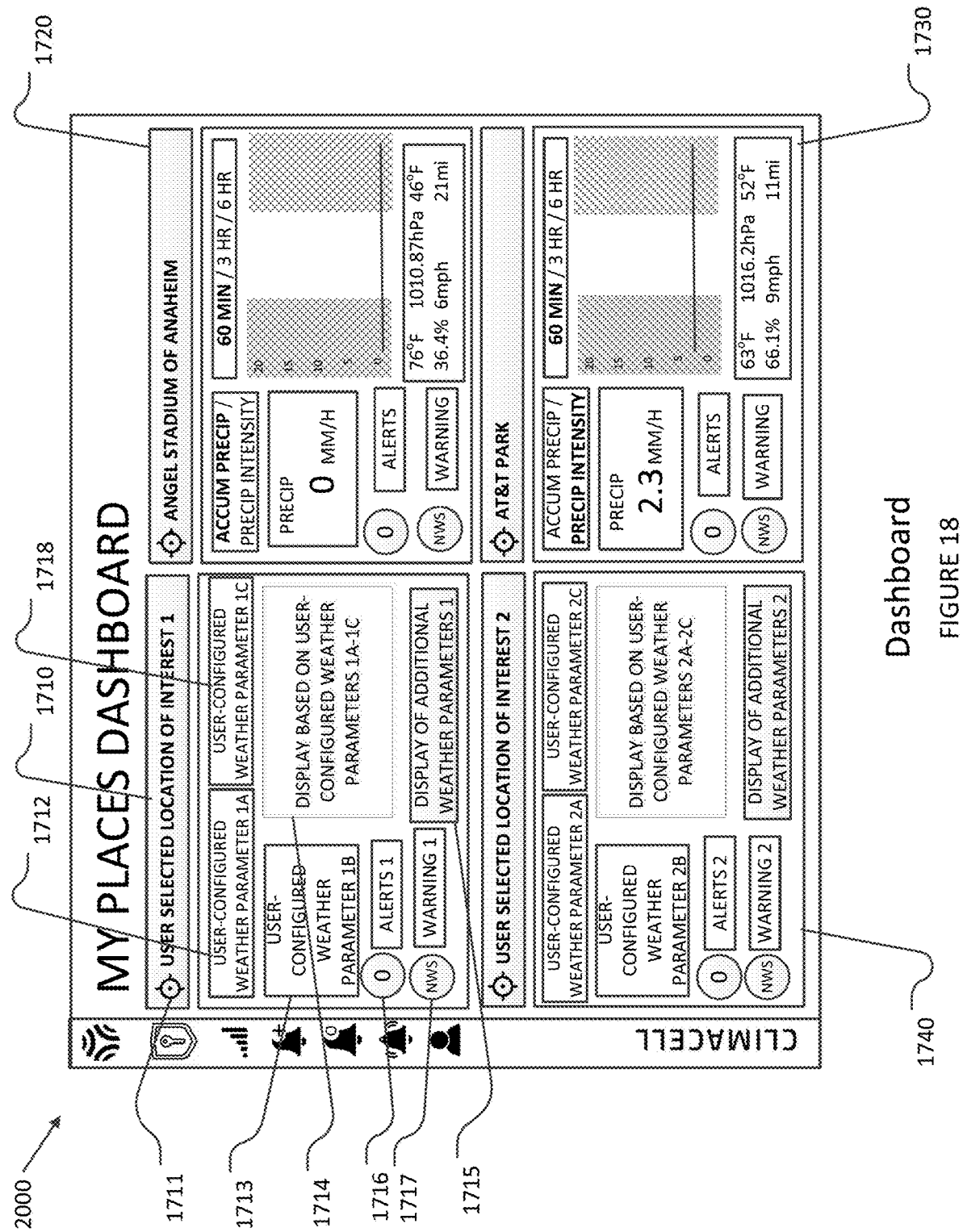

FIG. 18: provides an illustrative depiction of a dashboard function of the Hypercast program, according to an illustrative embodiment.

Figure 19A:
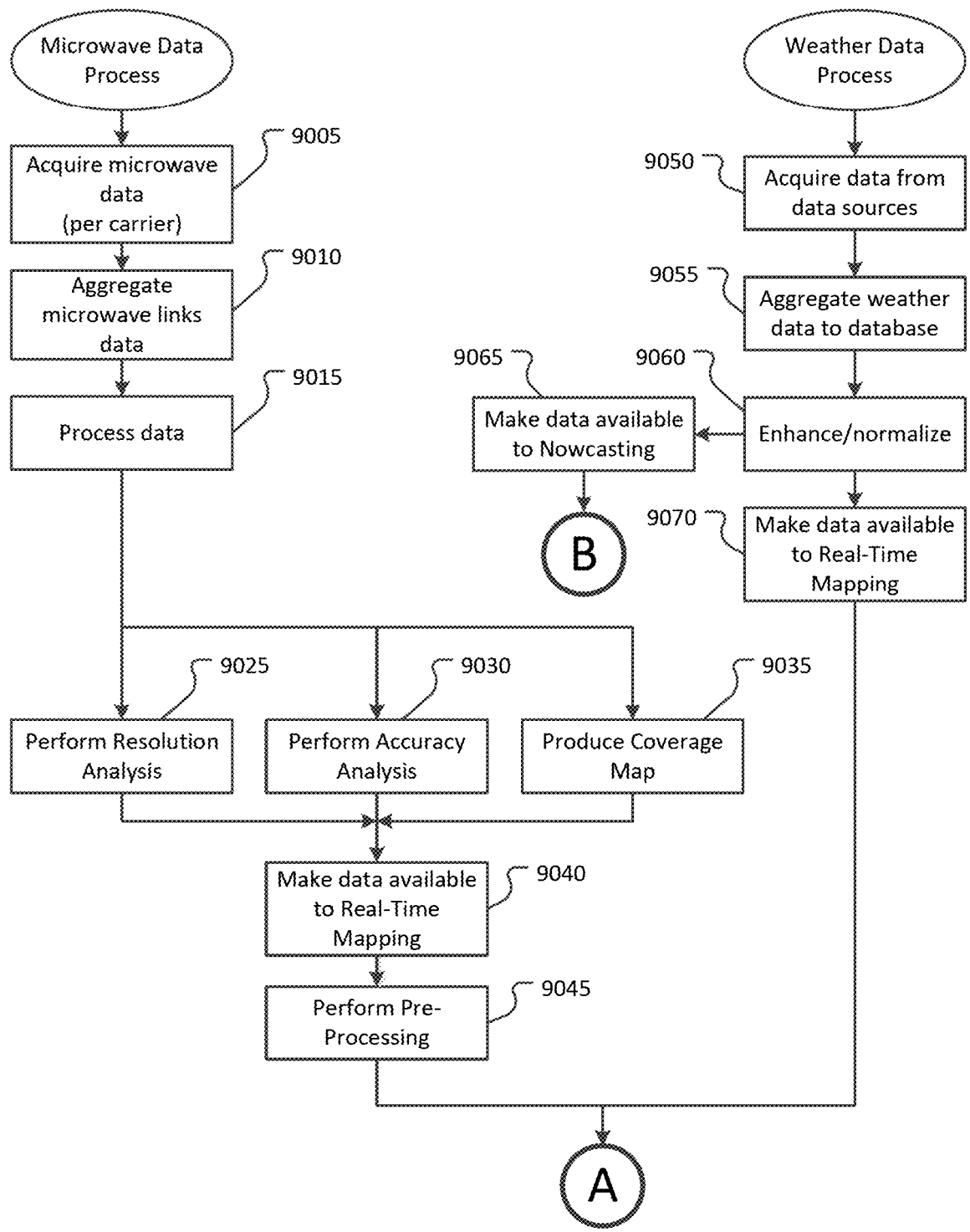
Figure 19B:
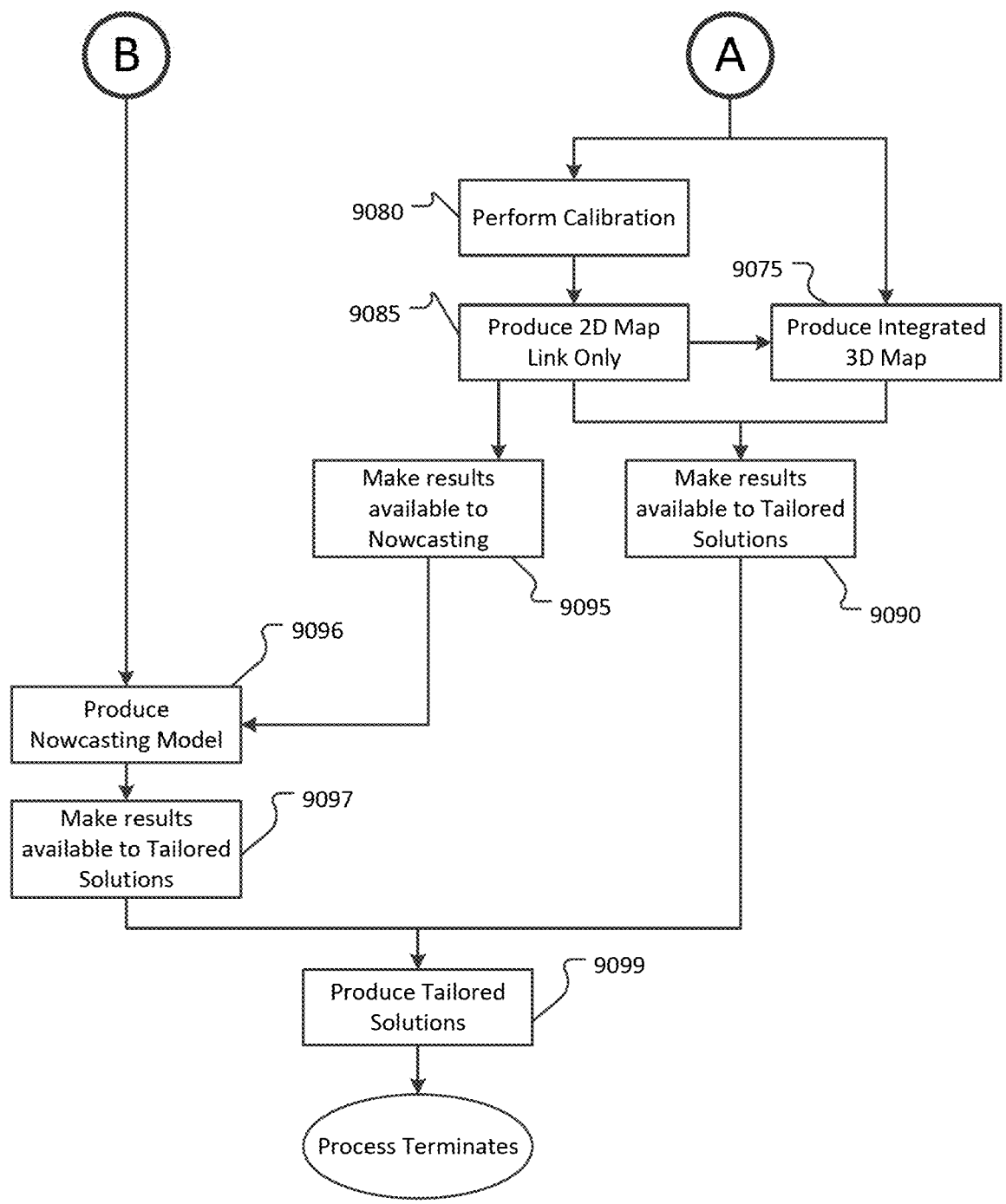

FIGS. 19A and 19B depict a process flowchart for an exemplary information flow through the system, according to an illustrative embodiment.

Figure 20:
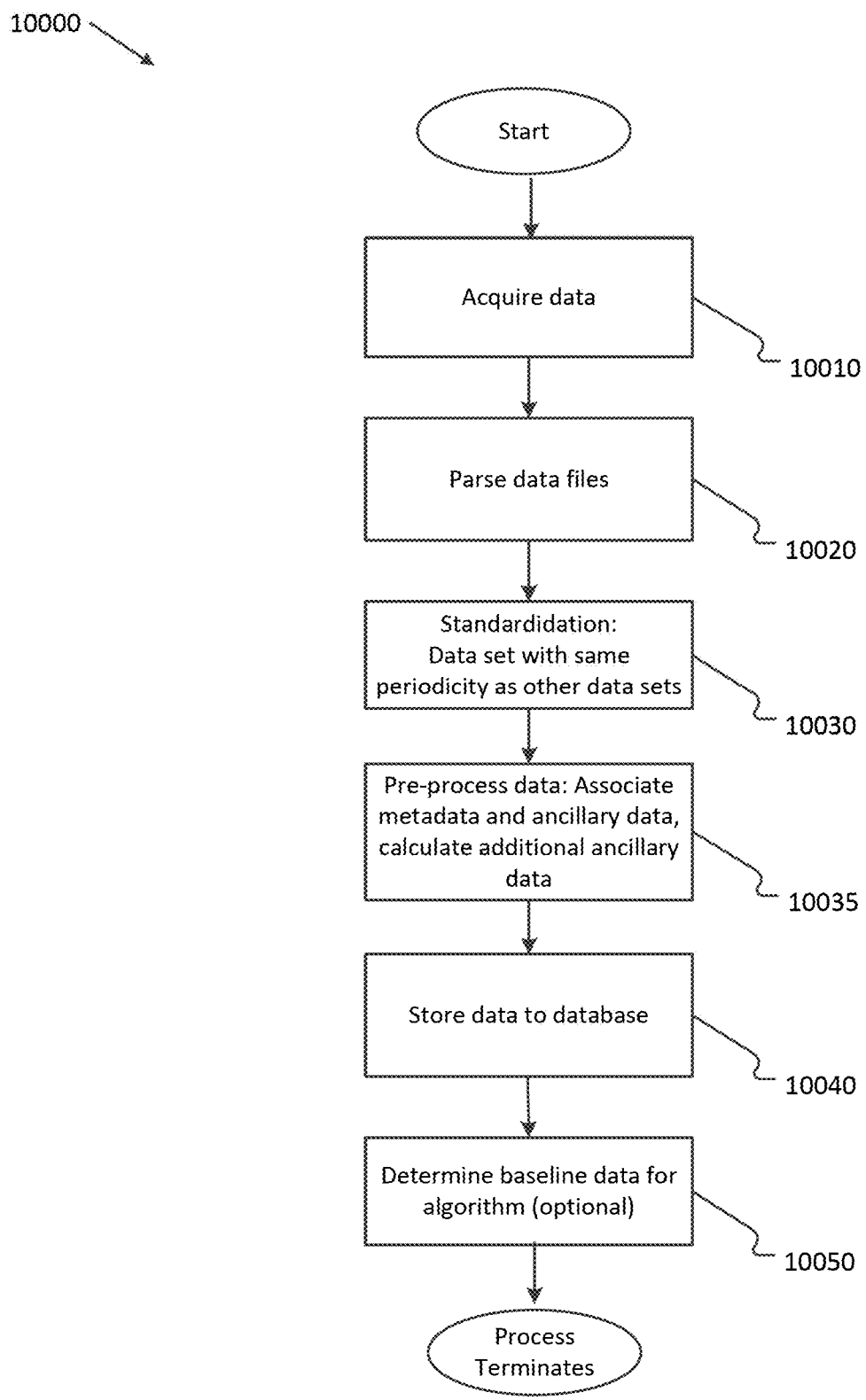

FIG. 20 depicts a process flowchart for an exemplary method for receiving, pre-processing, and storing data, according to an illustrative embodiment.

Figure 21:
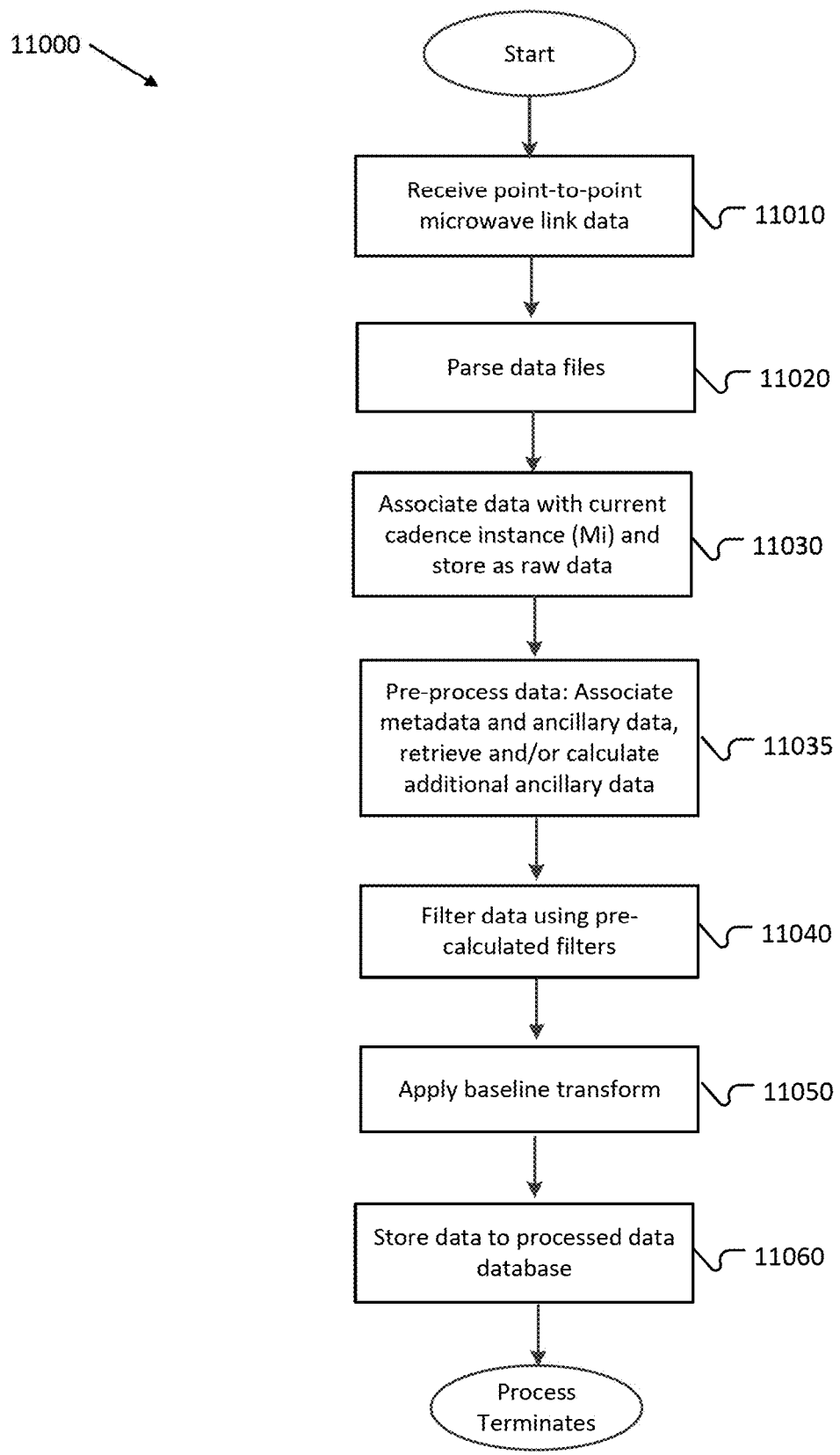

FIG. 21 depicts a process flowchart for an exemplary point-to-point microwave network information collection process, according to an illustrative embodiment.

Figure 22:
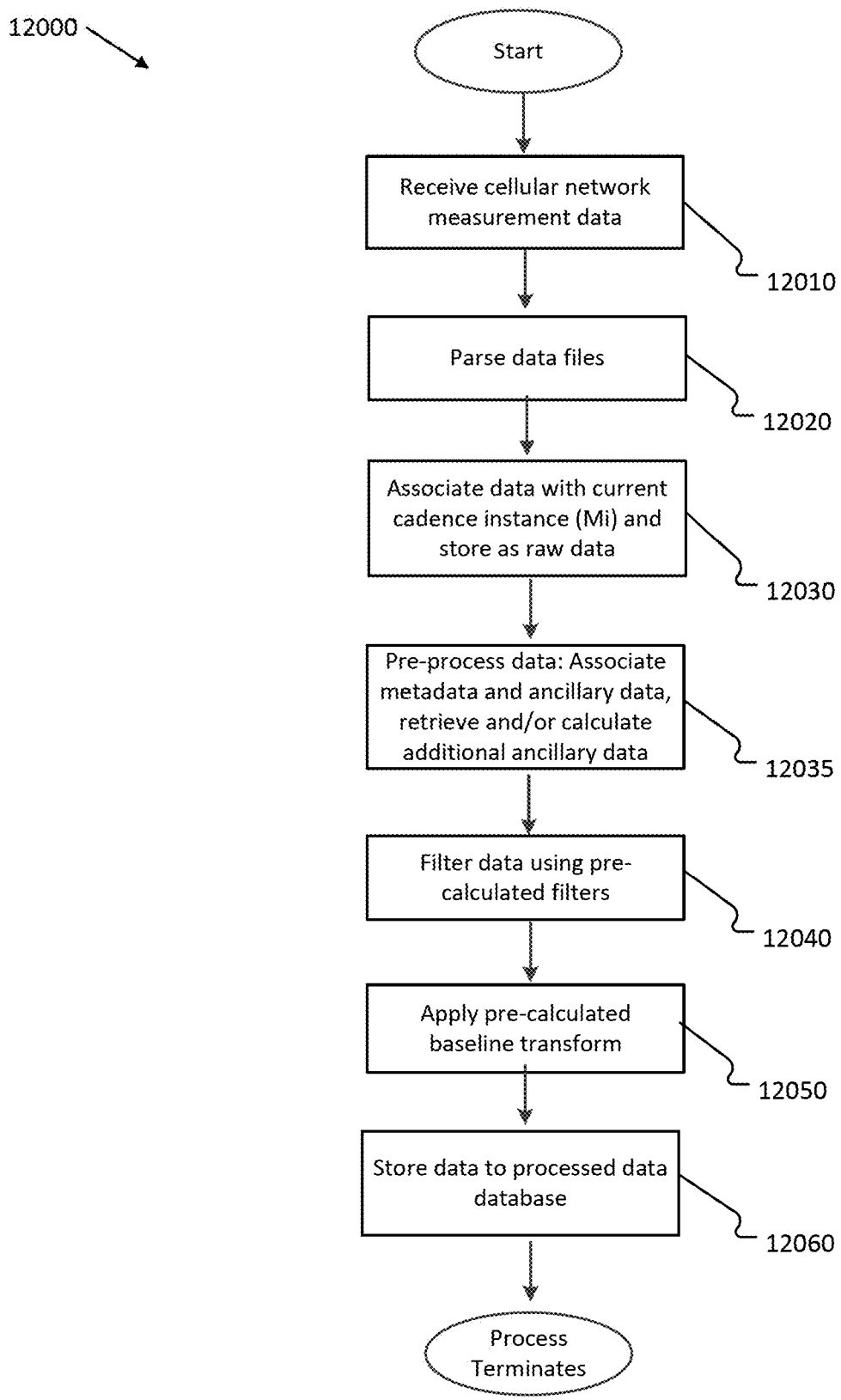

FIG. 22 depicts a process flowchart for an exemplary cellular radio network information collection process, according to an illustrative embodiment.

Figure 23:
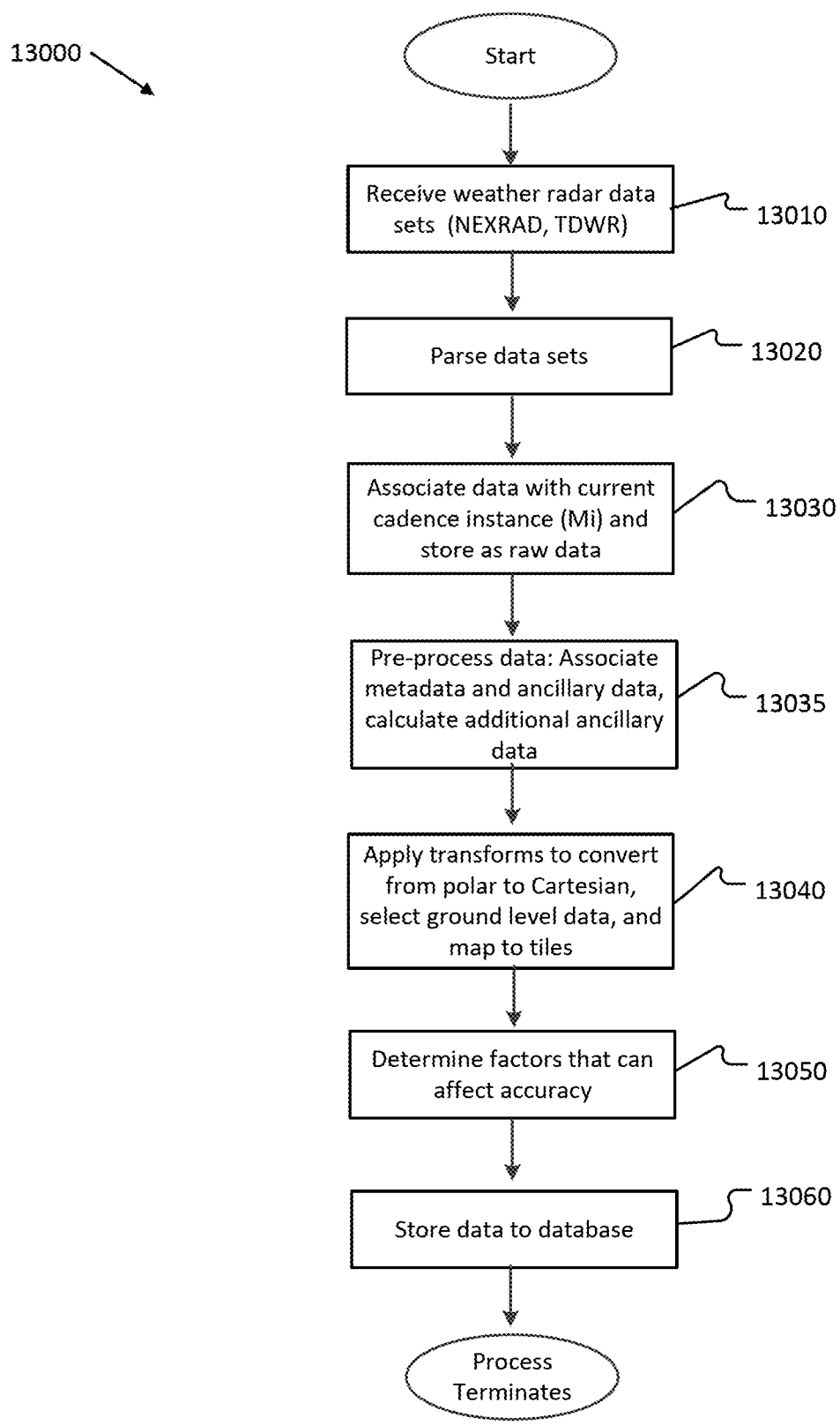

FIG. 23 depicts a process flowchart for an exemplary weather radar information collection process, according to an illustrative embodiment.

Figure 24:
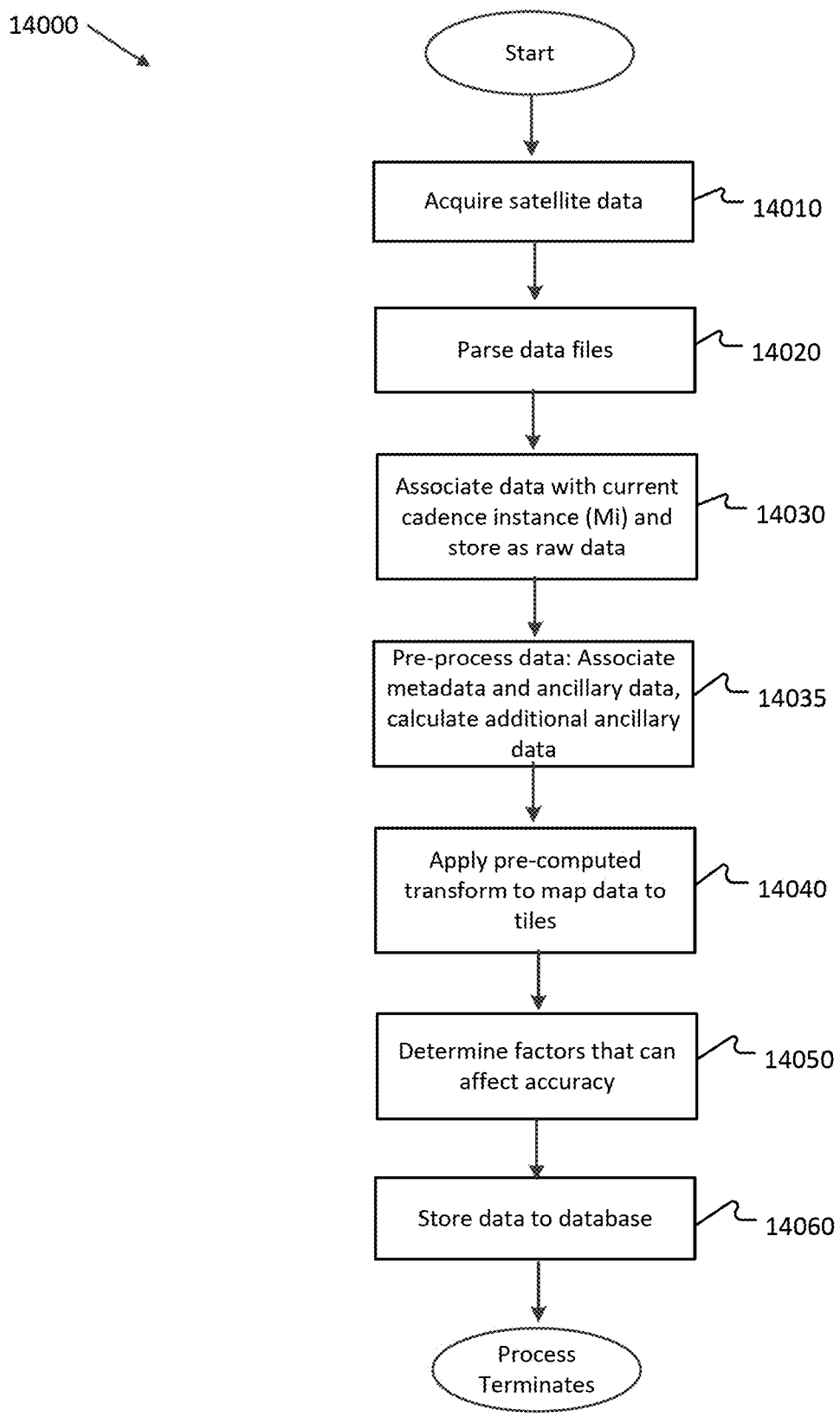

FIG. 24 depicts a process flowchart for an exemplary weather satellite information collection process, according to an illustrative embodiment.

Figure 25:
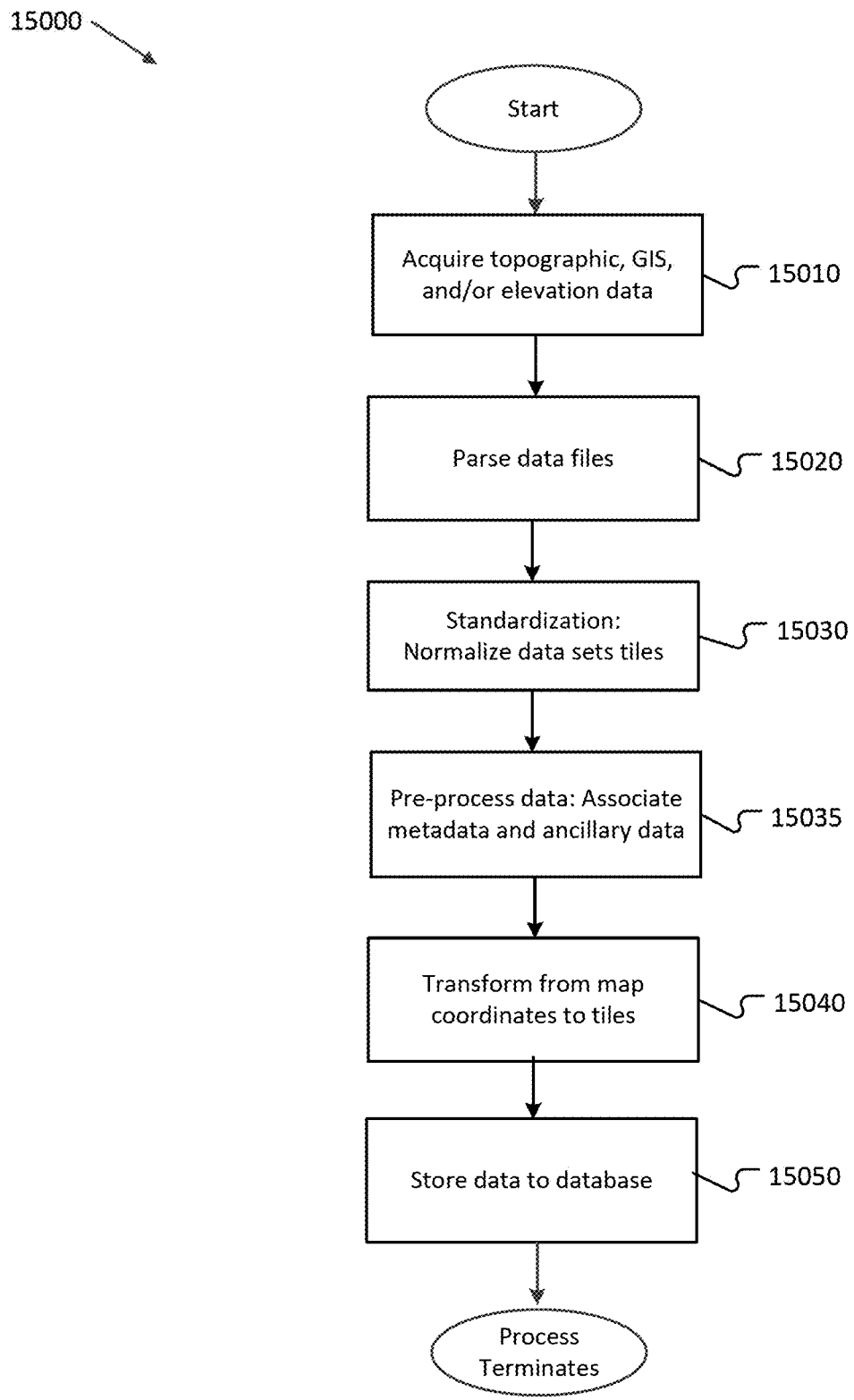

FIG. 25 depicts a process flowchart for an exemplary map data collection process, according to an illustrative embodiment.

Figure 26:
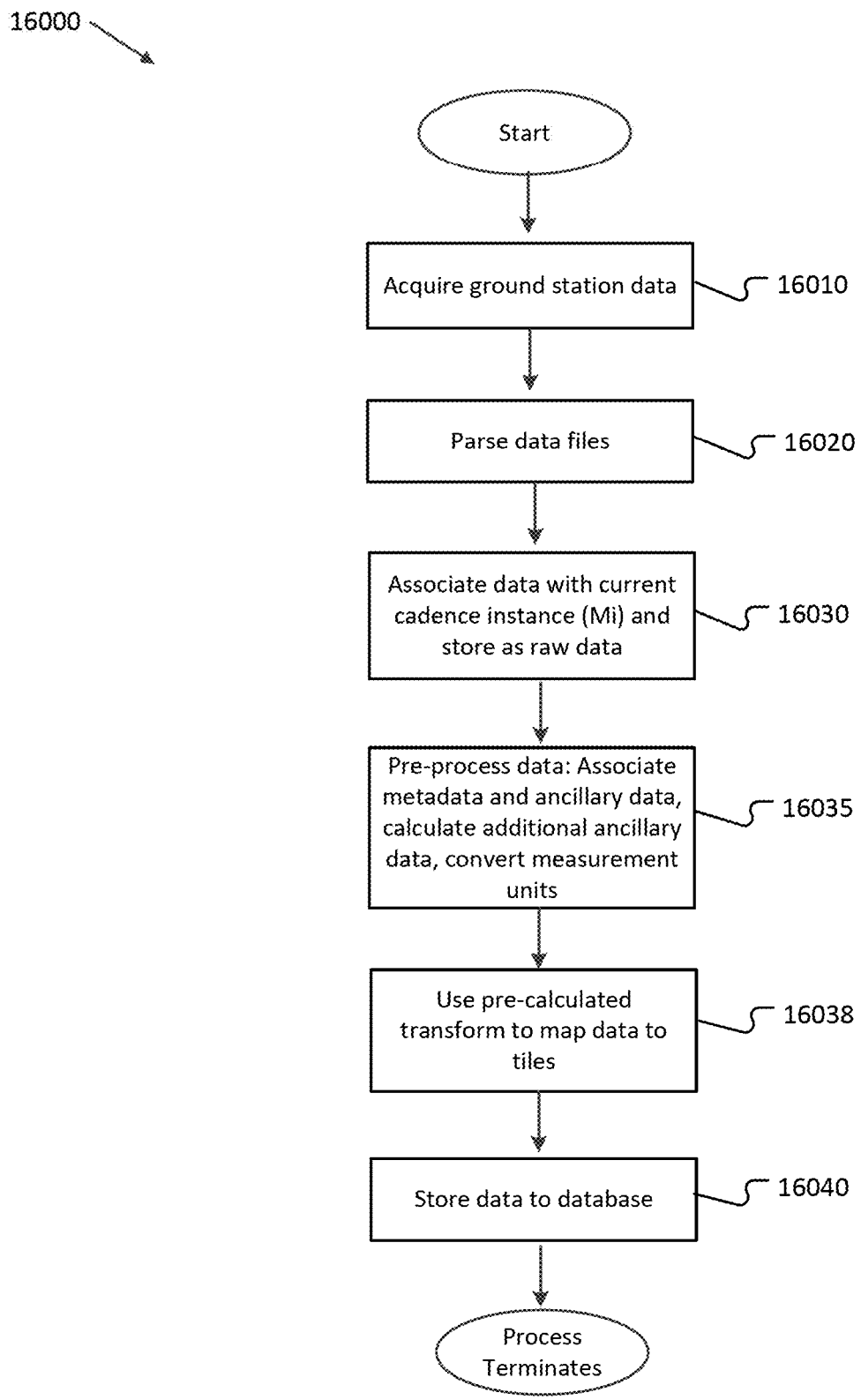

FIG. 26 depicts a process flowchart for an exemplary rain gauge information collection process, according to an illustrative embodiment.

Figure 27:
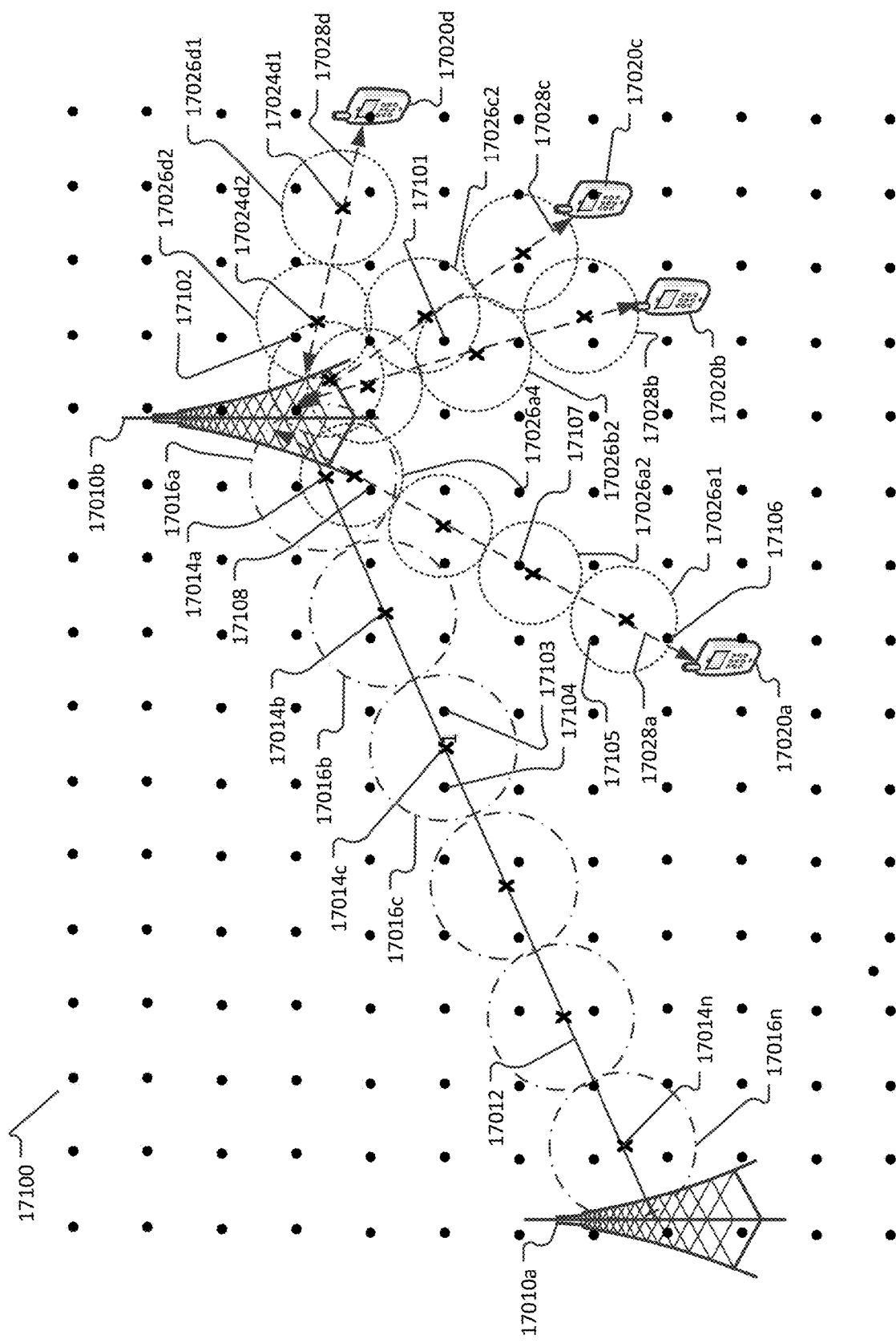

FIG. 27 illustrates an exemplary 5 GHz terrestrial wireless radio network overlaying a precipitation intensity grid, according to an illustrative embodiment.

Figure 28:
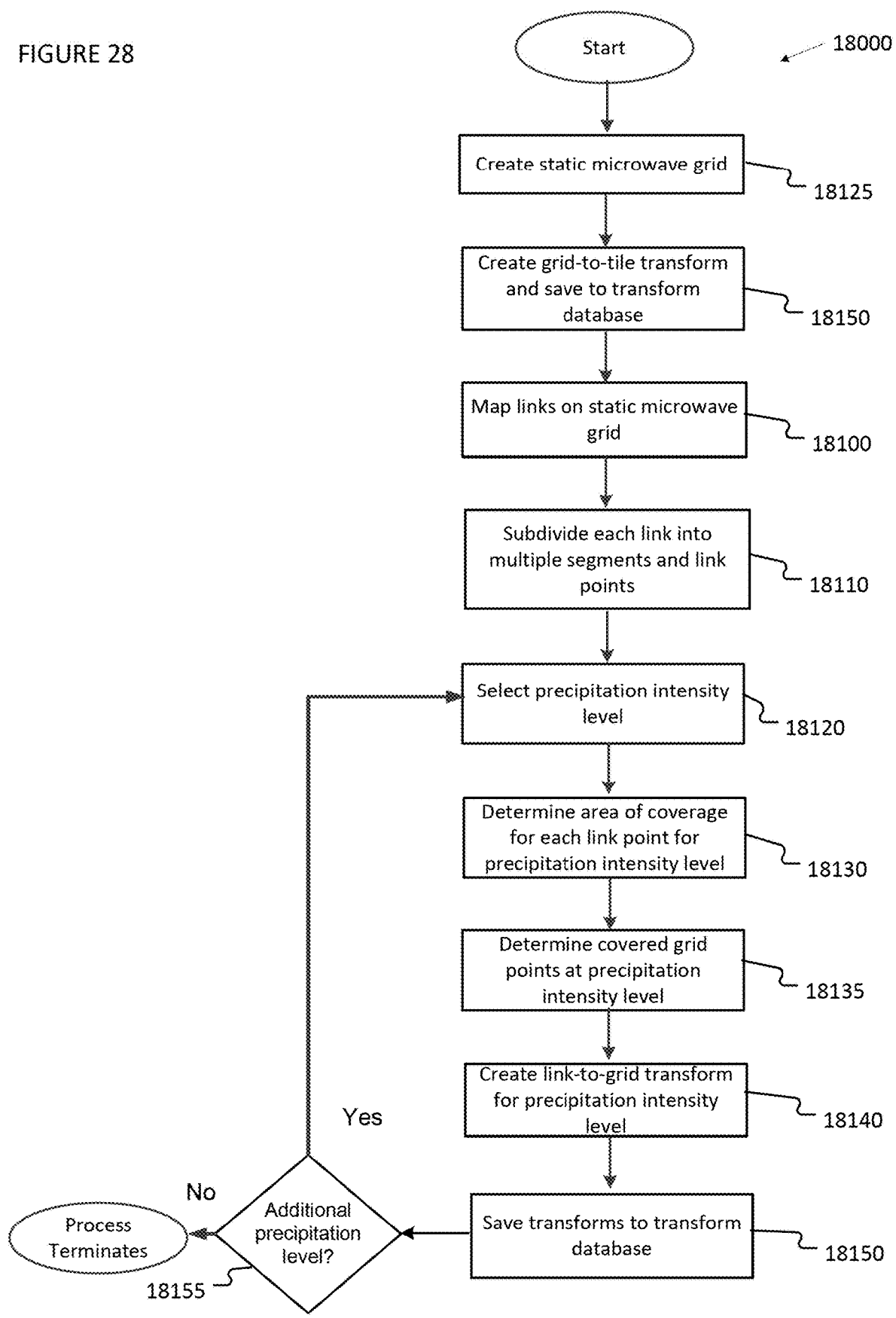

FIG. 28 depicts a process flow chart for an exemplary process for determining point-to-point and cellular microwave link-based precipitation intensity coverage and pre-calculating precipitation intensity link-to-grid transforms, according to an illustrative embodiment.

Figure 29:
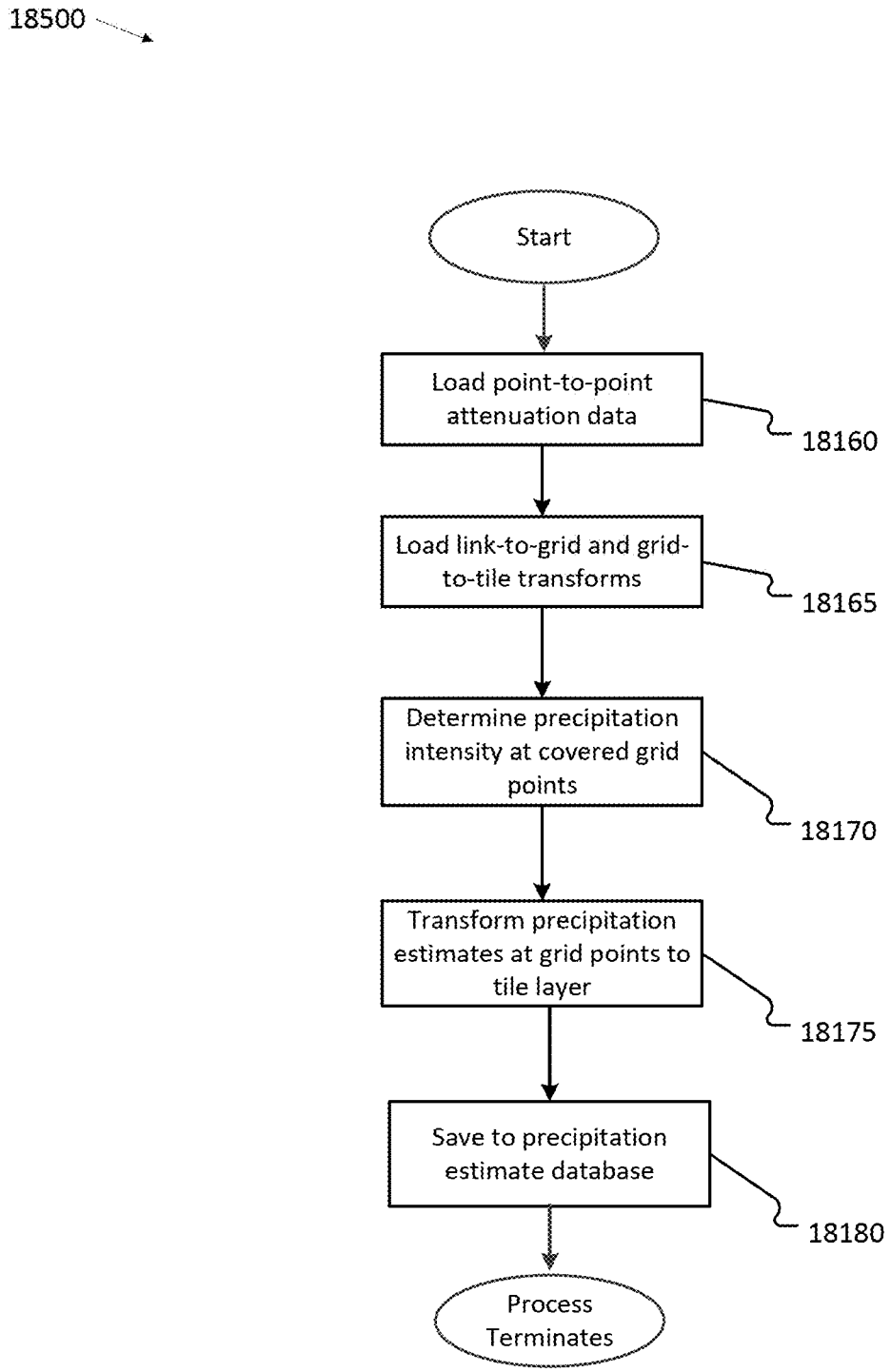

FIG. 29 depicts a process flow chart for an exemplary process for d estimating point-to-point and cellular microwave link-based precipitation intensity values using link measurement data and pre-calculated link-to-grid transforms, according to an illustrative embodiment.

Figure 30:
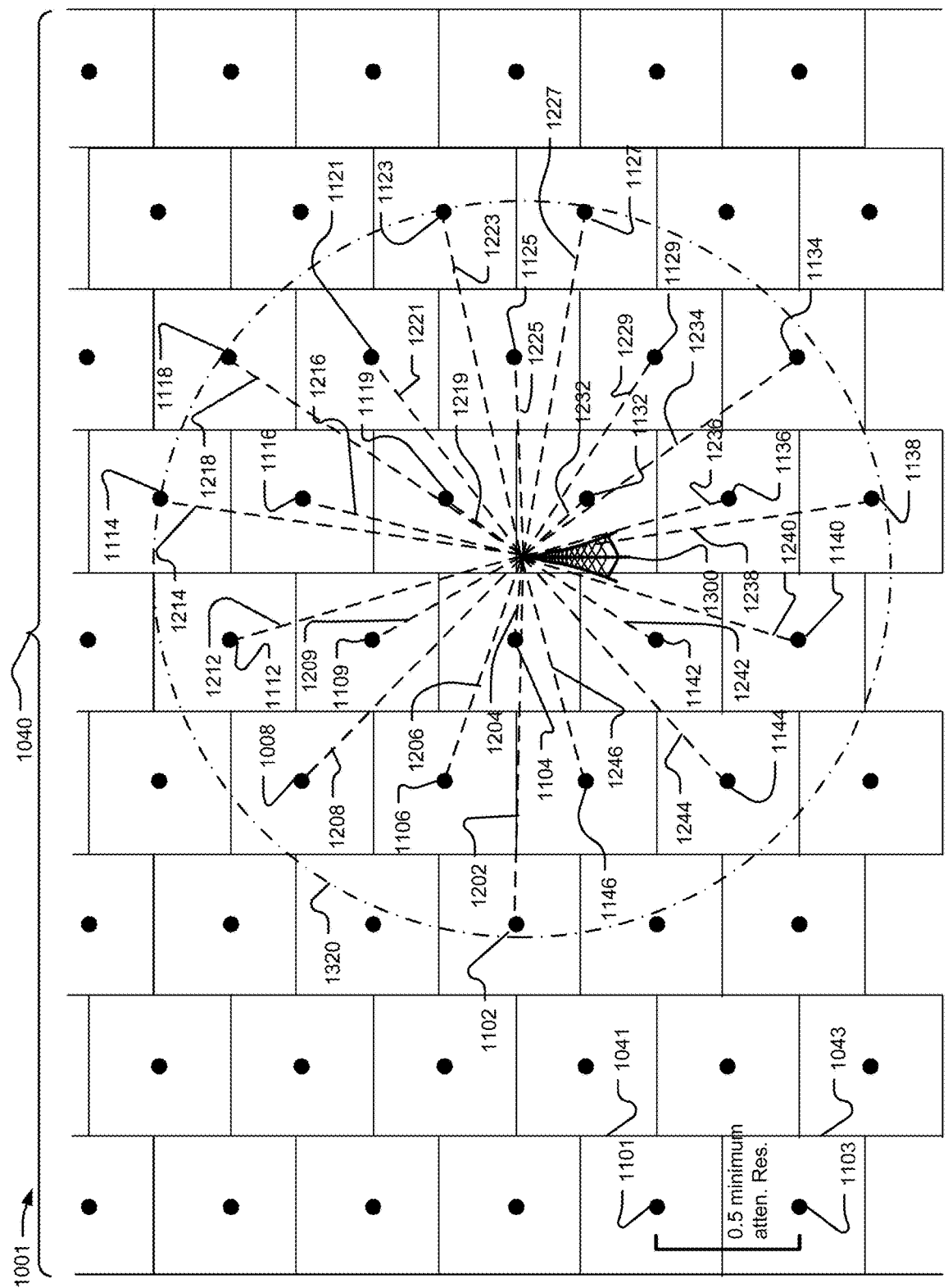

FIG. 30 depicts multiple proforma links extending from eNB to each of multiple grid points of a proforma link grid, according to an illustrative embodiment.

Figure 31:
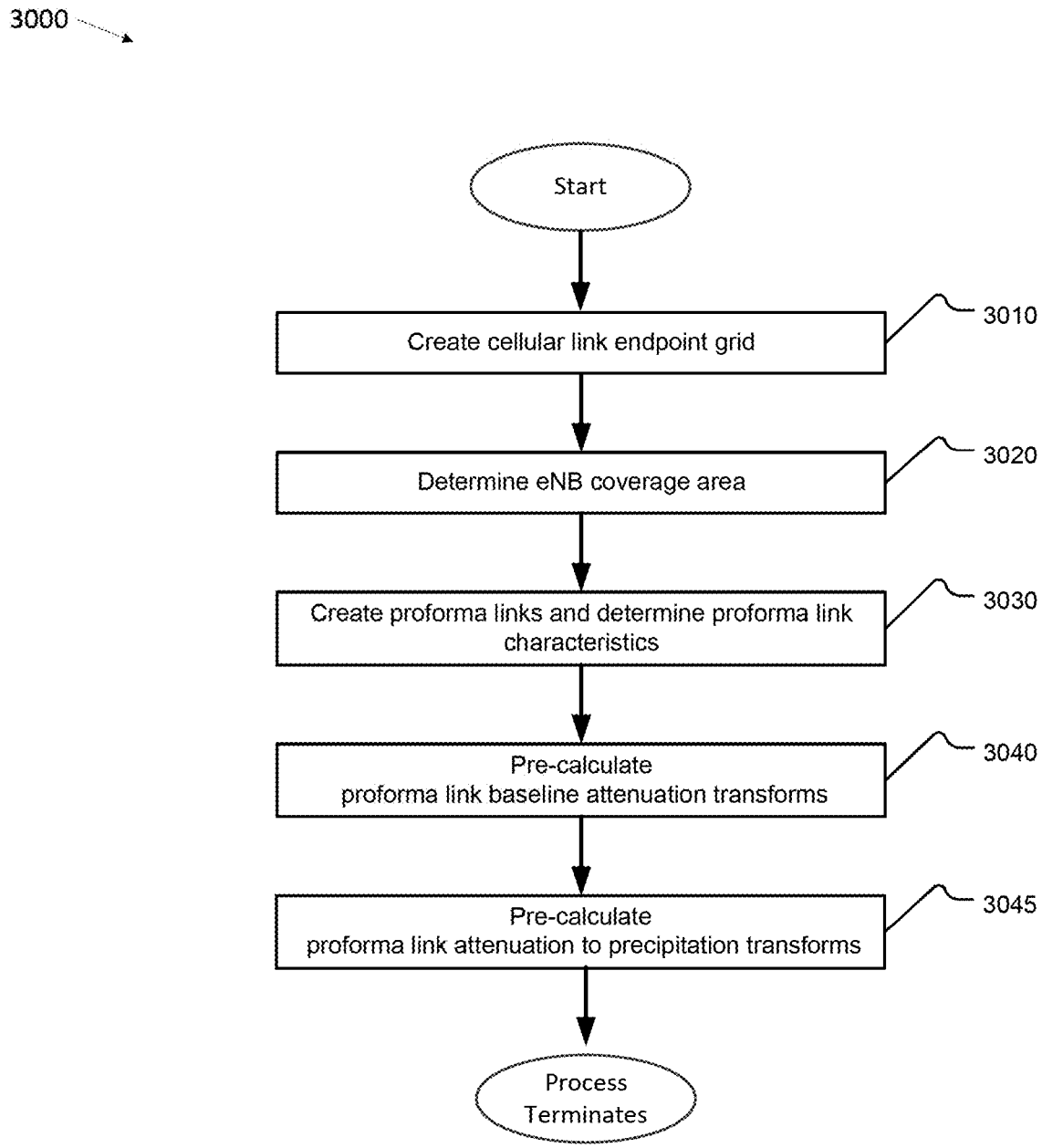

FIG. 31 depicts a process flowchart for an exemplary method for mapping dynamic cellular network links to pre-determined (static) proforma links with which pre-computed filters and transforms are associated, according to an illustrative embodiment.

Figure 32:
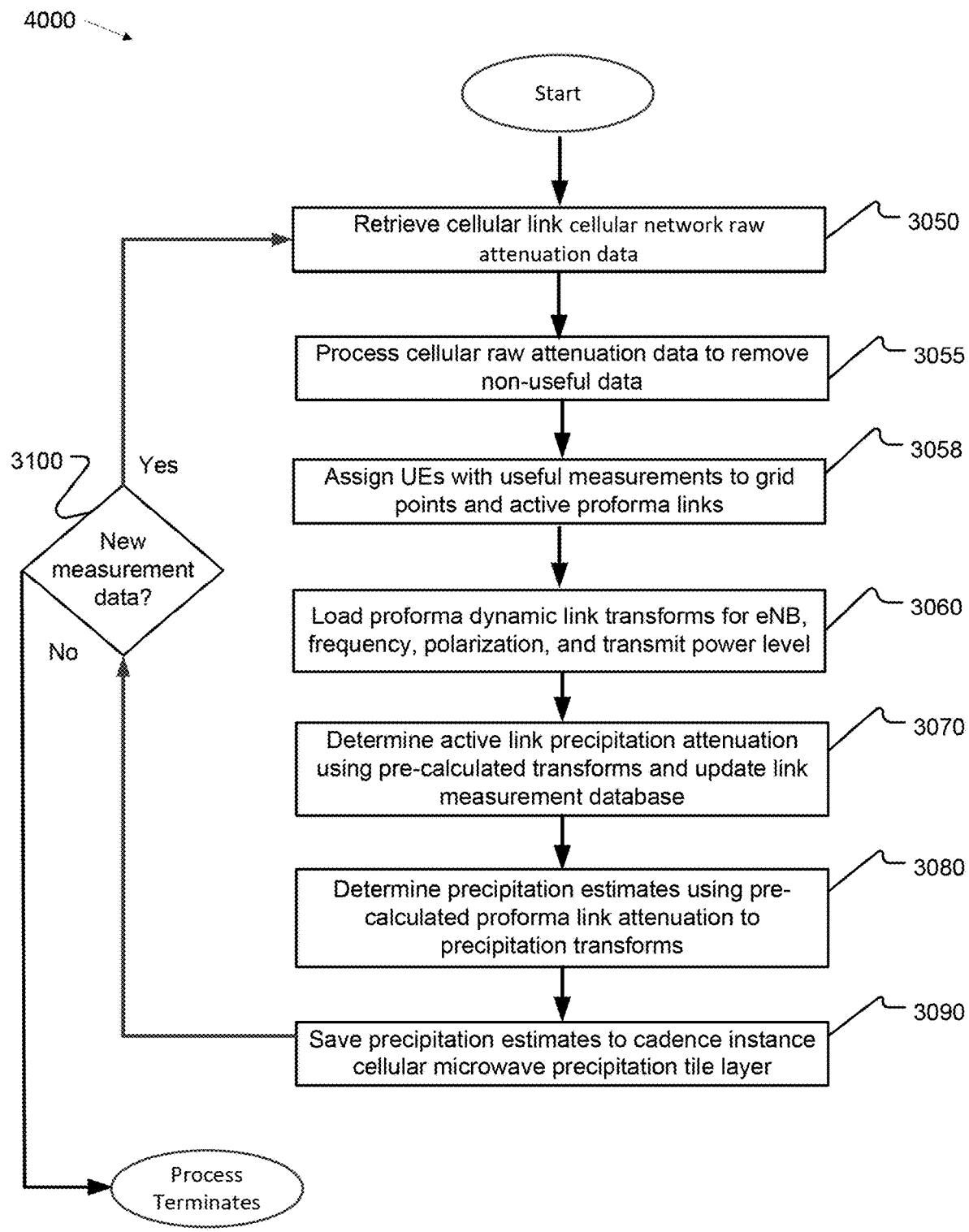

FIG. 32 depicts a flowchart for an exemplary method for mapping cellular dynamic links to proforma links and generating precipitation intensity estimates based on dynamic link attenuation using pre-calculated proforma link transforms, according to an illustrative embodiment.

Figure 33:
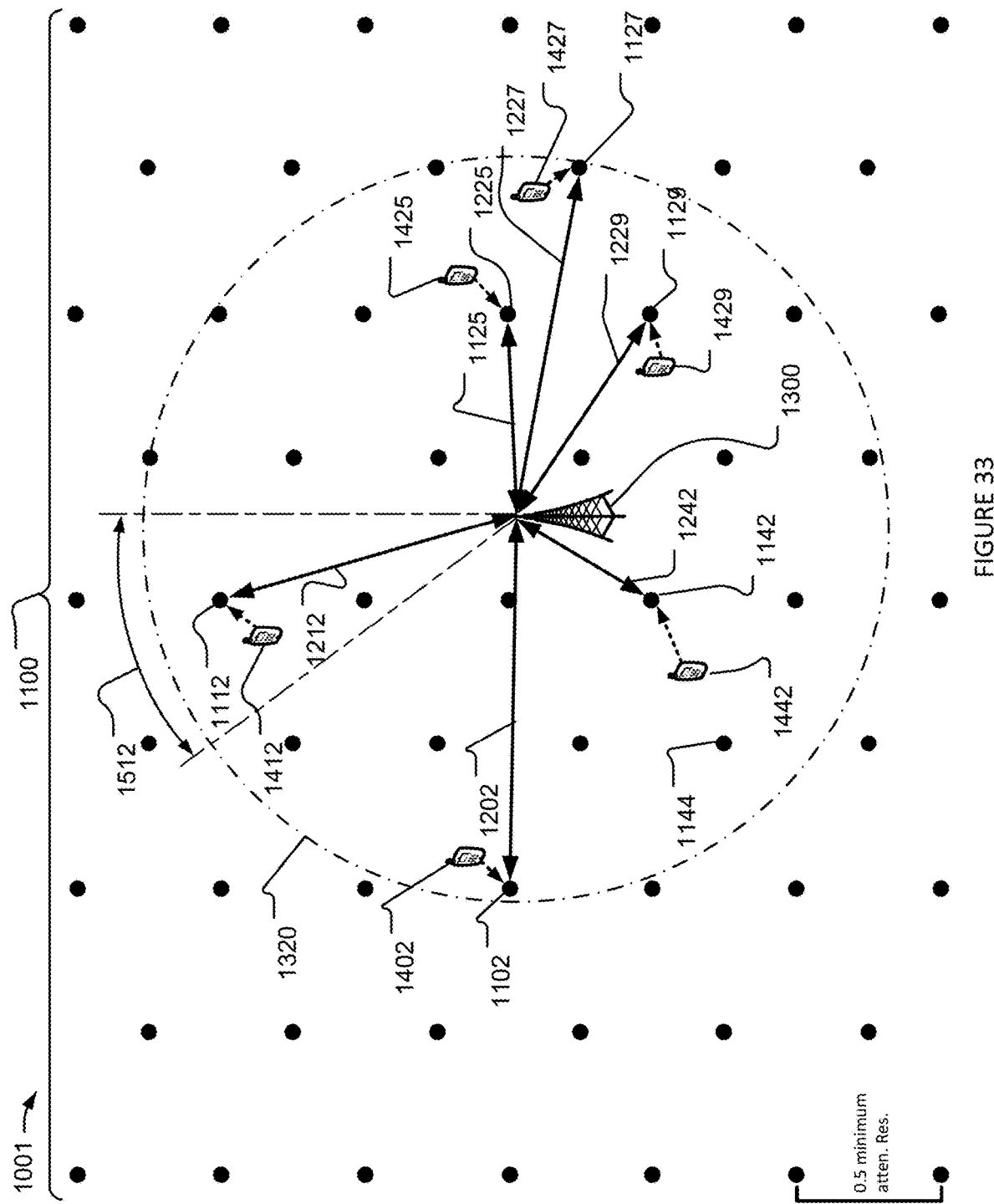

FIG. 33 depicts mapping of dynamic links to specific grid points, according to an illustrative embodiment.

Figure 34:
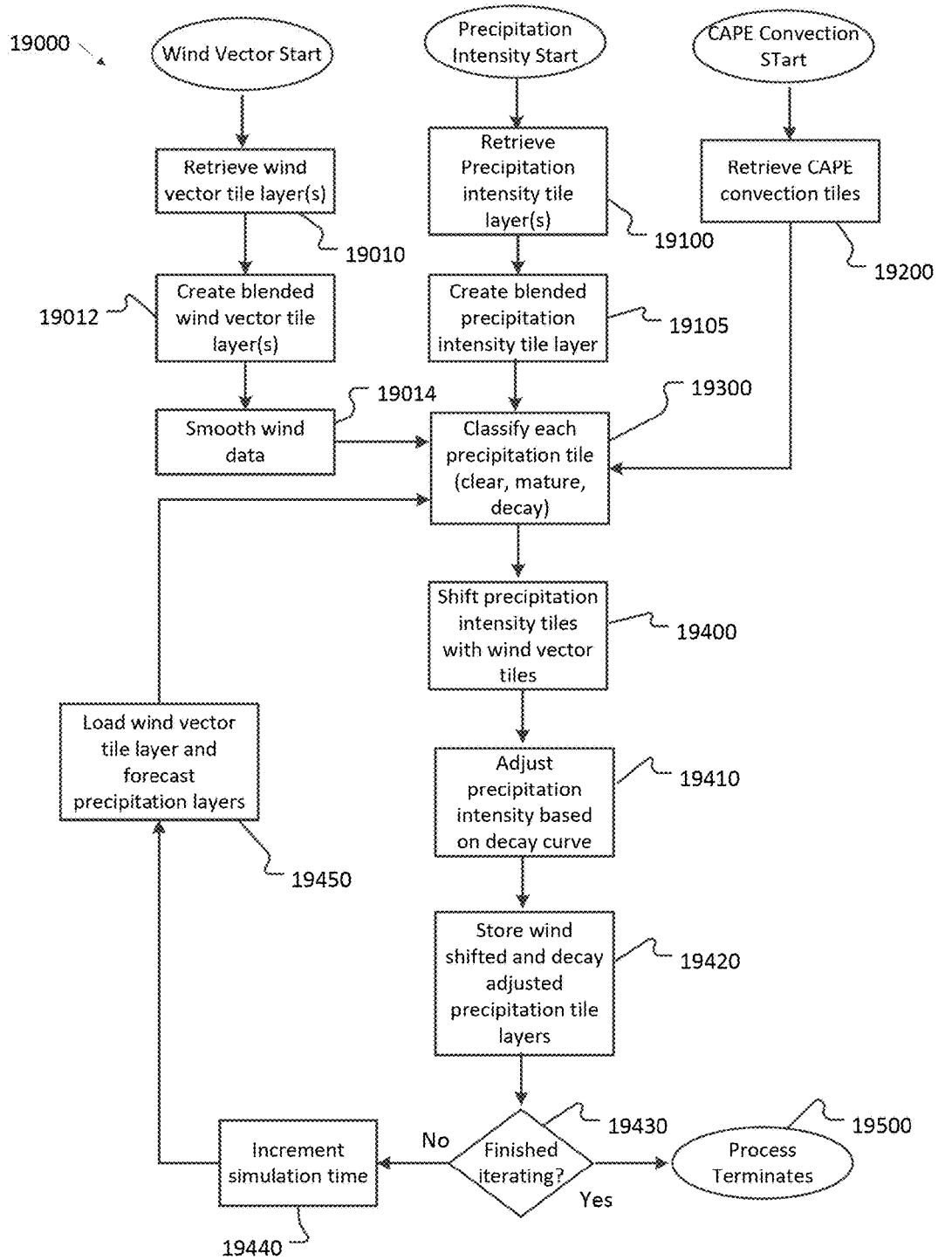

FIG. 34 depicts a process flowchart for an exemplary now-casting and forecasting process of the system, according to an illustrative embodiment.

FIG. 35A illustrates a convective storm rise and decay precipitation intensity profile over time, according to an illustrative embodiment.

FIG. 35B illustrates a stratified storm rise and decay precipitation intensity profile over time, according to an illustrative embodiment.

Figure 36:
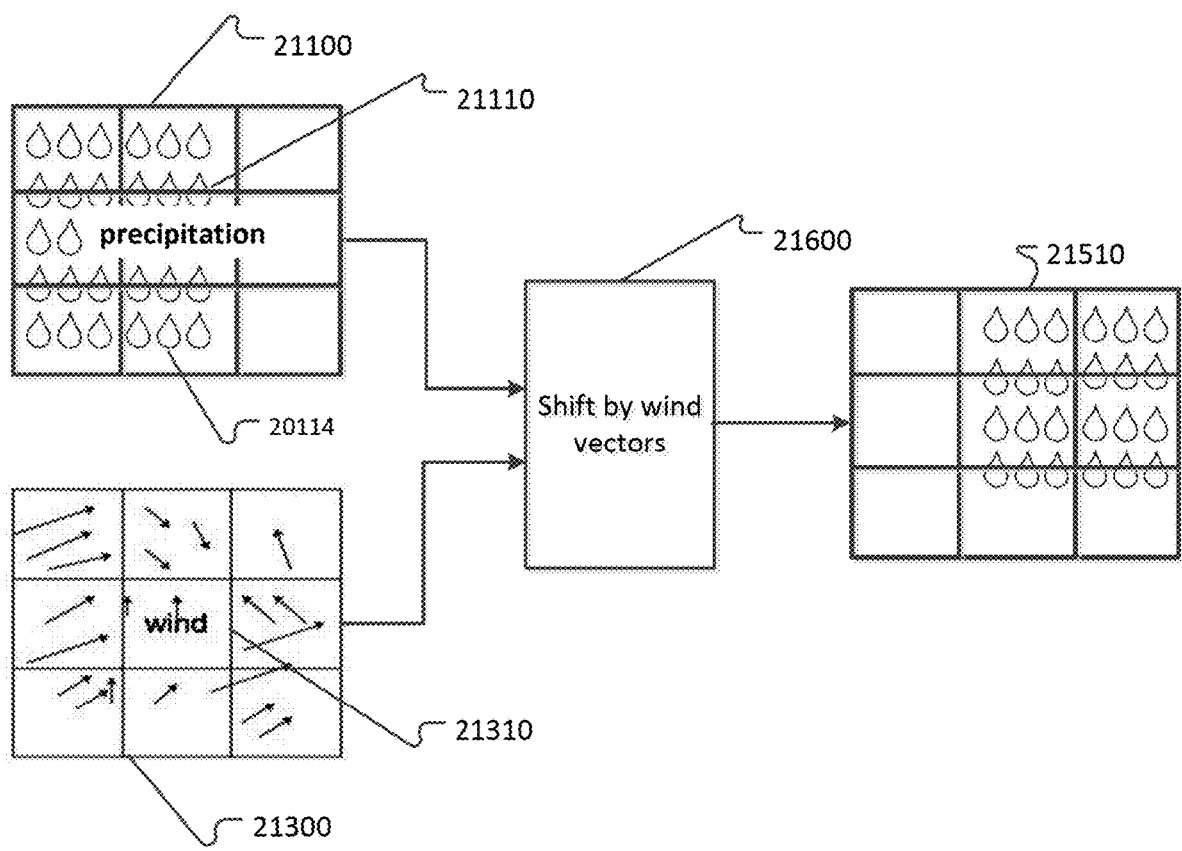

FIG. 36 illustrates an exemplary diagram representing precipitation intensity tiles shifted with wind vector tiles, according to an illustrative embodiment.

6 DESCRIPTION OF SOME EMBODIMENTS

6.1 Overview

The systems and methods described herein provide a mechanism for collecting information from a diverse suite of sensors and systems, calculating the current precipitation and other atmospheric-based phenomena based upon these sensor readings, and predicting future precipitation and atmospheric-based phenomena. Unlike current systems, the described system and methods provide improved data collection and augmentation, dynamically updated data sets, significant accuracy improvements, and real-time projections.

"Real time" meteorology equipment, such as weather radar, provides precipitation maps showing precipitation intensities and locations on a short time interval, e.g., less than a fifteen minute interval, or optionally less than a five minute interval, or optionally a one minute interval or thereabout. Weather radar signals attenuate when passing through precipitation, so the precipitation maps derived from weather radar have known limitations as the signal is attenuated.

Diverse meteorological phenomena have diverse temporal evolution (e.g., humidity changes much more slowly than does precipitation intensity). Accordingly the definition of "real time" or "most current data" may depend on the meteorological phenomena being measured and reported.

The system described herein supports a dynamically defined network of microwave links, including continually changing microwave link presence, link length, and microwave signal frequency characteristics, with high temporal resolution of microwave link signal attenuation measurements, from a plurality of information sources that asynchronously provide updated microwave signal attenuation measurements and other information to the system.

The system implements a parallel processing pipeline that provides pre-processing of microwave link attributes which support an order of magnitude reduction in the system compute requirements. The pre-processing steps include the pre-processing steps of creating transforms and filters for the processing steps to convert microwave link attenuation measurements into precipitation estimates, transforms for the conversion of radar-based weather data into data structures usable by the system, transforms and lookup tables that permit static network attenuation analysis to be performed upon dynamically changing network topologies, and ongoing accuracy improvement analysis that permits the system to make effective blending selection decisions of precipitation intensity (and other weather data) that improve the accuracy of resulting forecast data by between 30 and 70%. Pre-computed transforms provide an efficient way to capture computing steps that are performed repeatedly as a single computation, significantly reducing the amount of computation required. For example, by precomputing an attenuation transform for a point-to-point wireless network, we are able to calculate the effect of a specific link attenuation value at a number of different map points. By combining the complex set of calculations into a single transform, the received attenuation data for a link may be passed through the transform once and precipitation values for each effected map coordinate obtained from the single calculation. This type of processing, when combined with the processing architectures described herein, enable the near real-time calculation of weather data.

The system also supports the ongoing asynchronous collection of input data, so forecast modeling cadence is separated from the collection cycles, which permits the asynchronous updates of different types and sources of data. The system further implements a massively parallel collection processing and forecasting component in order to produce a precipitation forecast model in near real time for the system users.

The system architecture has four servers (e.g., including data processing components), each described below, based in part upon its function and the nature of the information being processed.

The first server (including a data processing component) is an information collection and normalization component that collects, error-corrects, normalizes, and stores information collected from external sensors and data sources, and stores the collected information into one or more databases in order to make it available to the other components of the system. The stored data is formatted in a manner that allows more efficient further processing of the stored data and provision of a more accurate precipitation model and precipitation forecast model.

The second server (including a data processing component) is an offline/background processing component that performs non-time critical processing of collected information and non-time critical updating of low-temporal resolution calculations and modelling. The results of these processes are written to one or more databases in order to make them available to other components of the system. The stored data is formatted in a manner that allows more efficient further processing of the stored data, and provision of a more accurate precipitation model and precipitation forecast model.

The third server (including a data processing component) is a modelling and prediction component that performs parallel computations for preparing a precipitation forecast that at least indicates a precipitation type and a precipitation intensity at various locations and is based at least on microwave attenuation data from a plurality of microwave links and is preferably further based on other weather phenomena, using other data types, such as current radar attenuation data, wind characteristics, temperature, humidity, dew point, and other conventional weather related information that has been collected, formatted and stored in the various databases as input. The modelling and prediction component, using the available pre-formatted data, produces calculated outputs that are written to databases for use by subsequent iterations of modelling and prediction processing and for subsequent use in one or more user products produced by the system.

The fourth server (including a data processing component), an information distribution and alerting component, uses the information stored in the various databases to produce information products on demand, including a map and/or report showing current precipitation intensity and other weather conditions over a geographic region, a forecast map showing expected precipitation intensities and other weather conditions over the geographic region, wherein each map may include expected total precipitation accumulation from a given weather event, or the like, as well as other products usable to alert users of potentially hazardous conditions, to track historic weather conditions, to predict further weather conditions and to provide customized weather maps focused on user selectable parameters (e.g. for a particular building or property, or the like).

The system as described provides significant improvements in the algorithms and processing throughput, as well as providing improvements in accuracy and timeliness of the forecasts and information provided.

These and other aspects and advantages will become apparent when the Description below is read in conjunction with the accompanying Drawings.

6.2 Definitions

The following definitions are used throughout, unless specifically indicated otherwise:

| TERM | DEFINITION |
| --- | --- |
| Microwave Link | A microwave link is a wireless signal connection between two separate antennas, either point-to-point, static, or dynamic, operating in the microwave or millimeter frequency range. |
| Microwave link, point-to-point | A microwave link between two microwave transceivers, with fixed link attributes. |
| Microwave link, static | A microwave link between a UE or eNB and a second eNB, characterized by both endpoints having relatively static locations. |
| Microwave link, dynamic | A microwave link between a UE and an eNB antenna, characterized by at least one endpoint location moving regularly. |
| Microwave | Radio signals in the 1.8 GHz to 60 GHz frequency range. |
| Millimeter wave | Radio signals used for communication above 60 GHz frequency range. |
| Small cell | Small cells are fully featured, short range mobile phone basestations used to complement mobile phone service from larger macrocell towers. Also known as femtocell, picocell, or metrocell cellular transceiver. |
| Tomography | A technique for constructing a three-dimensional image atmospheric water vapor in a region created by analyzing the propagation of waves of energy, such as microwave transmissions, through the region of the atmosphere. |
| Parameters | Weather data elements selected or configured by the user (either through the UI or the API (835)). |
| Location of interest | One or more geo-located points or polygons for which a user desires forecast data. |
| Real-time | Relating to a system in which input data is processed and made available as it is received, typically within seconds, so that it is available virtually immediately for further use or computation. |

6.3 Exemplary System Architecture

An illustrative, non-limiting, computing system that implements aspects of the technology(ies) is structured with four general processing components, based in part upon the nature of the information being processed, and the manner in which the information is processed in order to enable near real-time determination of the nature of weather conditions of a geographic region and to forecast weather conditions over the geographic region. As described above, the logical processing components of the system comprise:

Information collection and data pre-processing,
Offline/background processing,
Modelling and prediction, and
Information distribution and alerting.

This functional breakdown is provided for illustrative purposes; other functional breakdowns may be implemented using the techniques described herein without deviating from the present invention.

We now turn to describing the system as a logical model of information representation and storage, and the general processing flow within the system in order to illustrate the functioning of the physical hardware systems. The logical model describes the information organization and how the information is collected and forecast information is organized to permit efficient processing, storage, and retrieval by the computer processors and computer systems described herein, and in particular the processing of the information in large parallel processing systems.

It should be noted that the physical processing and storage system have the data being read and written directly to one or more system databases, and organized within those databases so that the subsequent data access steps are efficient.

6.3.1 Cadence Cycles and Cadence Instances as Logical Processing Flow and Data Models The system described herein operates in two modes: a series of repeating processing steps that collect, process, and generate forecast weather data called the cadence cycle, and a set of ad-hoc processing steps related to monitoring the data created as result of these processes and for making the created information available in a variety of forms. The system can support more than one cadence cycle at a time, but only a single cadence cycle is illustrated herein for clarity.

The data collection and processing for each cadence cycle iteration is represented by a data construct called a cadence instance. The cadence instance is represented by a cadence instance data structure stored in a system database that serves as a "master control record" for cadence cycle processing. Data collected or generated during the processing of the cadence cycle is associated with at least one cadence instance structure.

As the cadence cycle processing progresses and data is generated and stored to the system databases indexed by cadence instance and cadence cycle processing step, the information that is made available by referencing the cadence instance increases. The data that is generated and stored includes collected data, data derived from the collected data, forecast data generated during the forecast cycles of the cadence instance, and information that is further generated or derived from the forecast data. Collected data, generated data, and forecast data are organized by their tile representation in a cadence instance tile layer.

The system manages a sequence of cadence instances, one for each cadence cycle that is performed by the system. For ease of understanding, we refer to a cadence instance by the abbreviation $M_i$, where (i) is the cadence instance ID. The cadence instance ID can be a unique identifier, or simply a constantly increasing number such as a system clock count or even a monotonically increasing value. Each cadence instance structure also contains one or more timestamps which identifies (a) when the cadence instance was started, (b) when collection was completed, (c) when each processing step was performed, and (d) when each forecast cycle's processing was started/completed, and other information useful for tracking and managing the status of a cadence instance.

Data associated with a cadence instance is organized into tile layers. The tile layers organize data collected or created by a specific process as a series of "tiles". Note that tile layers may be sparse structures, as not all tiles in a tile layer are populated with data. Tiles each roughly correspond to map sections, but are not bound to a particular map or scale. Typically, each tile layer has tiles of a consistent size. In some embodiments, however, a tile layer's tile sizes are identical. In other embodiments, the tile sizes of diverse tile layers may differ. The processes that access the data associated with a tile layer manage the translation of the tile layer to whatever geographic coordinates are needed.

Figure 3:
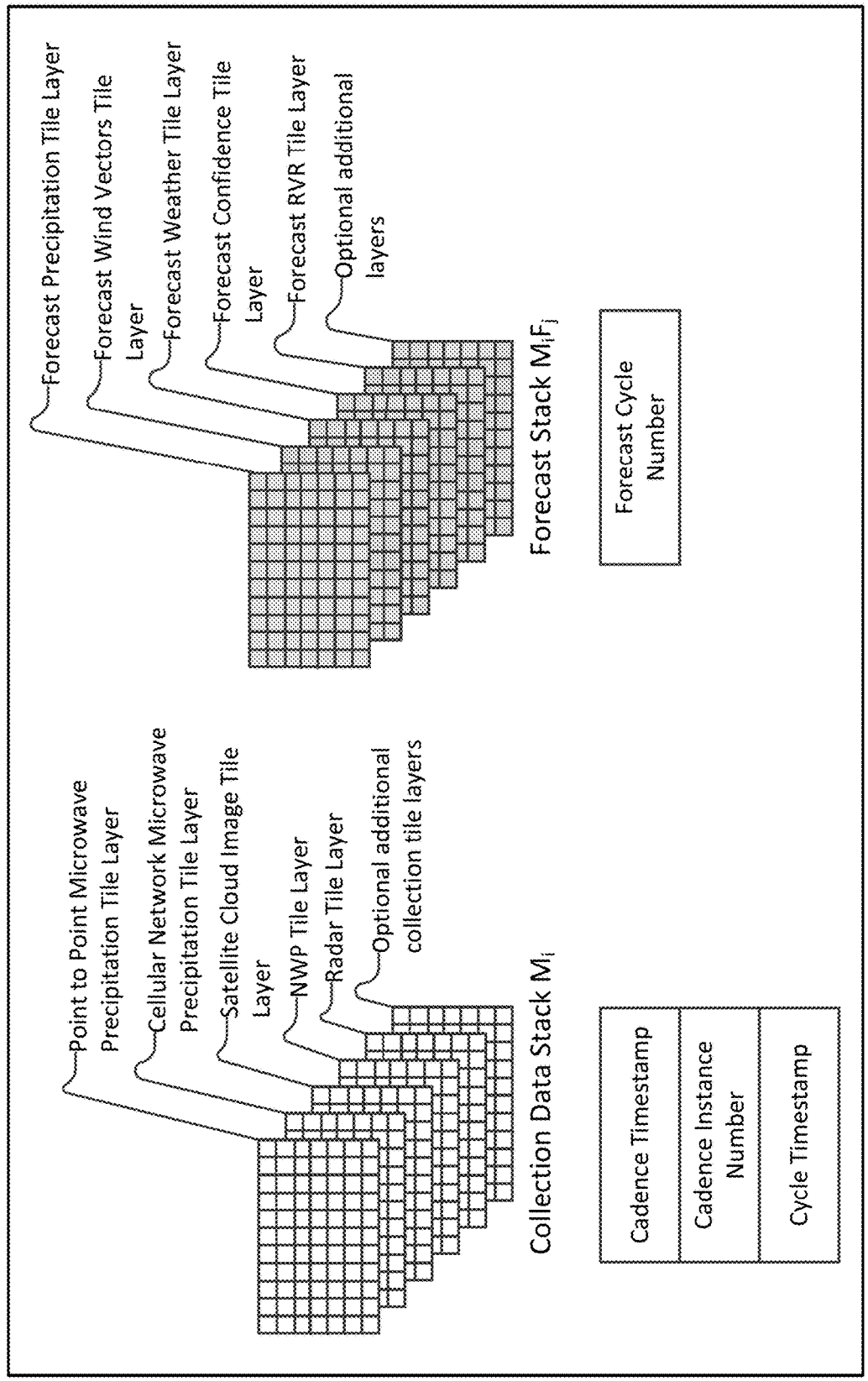
FIG. 3 illustrates an exemplary cadence instance structure, according to an illustrative embodiment.

An example cadence instance logical structure is depicted in FIG. 3. Note that the tile stack includes a tile layer associated with each collection program and processing program in the system, as illustrated in FIG. 3 and detailed below in Table 3. This structure permits the extension of the system by adding additional processing programs and adding one or more additional tile layer(s) associated with each added additional processing program without changing the data organization of cadence instances.

Each cadence instance comprises collection data, processed data, and forecast data.

Collection data is collected by one or more collection processes of the information collection and normalization server (310 of FIG. 9) that are in communication with at least one data source and that process the collected data and then store the collected data into one or more data stores (e.g., one or more source specific databases). Collection data is represented as part of the cadence instance as a set of collection tile layers, one tile layer per input data source. Each collected data is associated with the collection-time current cadence instance (as indicated by the cadence index). Collection processes operate asynchronously and may be computationally complex, so a plurality of collection processes may be simultaneously operating and writing to individual databases without interfering with each other. The ability to asynchronously collect and process input data from a plurality of sources permits the parallelization of the collection process, greatly reducing the effect of the collection processes on overall cadence cycle times. In addition, because each collection process writes to an individual data type specific database, inter-process contention for database resources is avoided. These selections enable the processing of large amounts of data on an asynchronous basis, and enable part of the performance improvements exhibited by the system when compared to its predecessors. Collected data is associated with a particular cadence instance using a cadence index value (the (i) of $M_i$). The cadence index is an increasing number that is used to reference the current (or specific) cadence instance.

Cadence-organized collected data may be pre-processed using one or more pre-processing programs that may use predefined filters and data transforms in order to speed pre-processing. These predefined filters and data transforms automatically convert the collected data into a format usable by the system (i.e. data values in tile form, either 2d or 3d), and store the data into a database associated with the collection input. This stored data, organized by data type, cadence, and tile layer, comprise the Collection data stack, and may be referenced as a data type specific collected data tile layer of Mi as described above.

A cadence instance further comprises forecast data, represented as a set of tile layers (one tile layer for each forecast data type being forecast) for each forecast cycle. Each of the forecast cycles comprises a set of tile layers associated with a timestamp corresponding to increments in the forecast time (e.g. tied to the time of each forecast cycle). Thus, forecast data set (and timestamp) $F_0$ is the time that collection completes for the cadence instance (e.g. the time that the cadence index is incremented), $F_1$ is current time+forecast interval, $F_2$ is current time+2*forecast interval, etc.), repeating out to the forecast limit. Forecast limits are tunable for the system, typical values are between 2-6 hours for short term, high resolution (NowCast) forecasts, and 1-10 days for long term, lower resolution forecasts.

A cadence instance further comprises processed data, which is data that has been previously associated with a cadence instance and has been further processed by one or more data processing programs of the system. Processed data may include additional refinements to collected data, derivation of additional information from collected or forecast data, or data that is calculated by other systems and associated with one or more cadence instances.

Cadence instances tile layers may use references to previously defined (either forecast or collected) tile layers to substitute for slow-update collection processes and to speed processing by copying previously processed data that has not significantly changed. If collection data is not available for a parameter at a location when $M_i$ is populated with data, collected data from older models, i.e. from the set bounded by $M_0$ through $M_{(i-1)}$, corresponding to the location. Historical information can include Collection tile stack information retrieved from cadence instances that are older than model $M_i$, or may include information from historical models that correspond to the requested location and time.

Each cadence instance progresses through a series of processing stages, which are partially controlled by timing parameters. Cadence cycle timing (both instance to instance, forecast cycle to forecast cycle, and inter-cadence cycle delay) may vary, based upon the length of time required to complete each stage of processing and the frequency of system data collection activities. The system may also enforce an interstitial delay between cadence cycles if desired. Cadence cycle timing may vary based upon weather or upon the results of one or more previous cadence cycle processing steps. For example, cadence cycle length and collection interval length may be increased during clear weather and decreased during stormy weather.

Several parameters control the processing of the cadence cycle, as described in the table below:

TABLE 1

Cadence Cycle Processing Control Parameters

| Timing control parameter | Description |
| --- | --- |
| Cadence instance start interval | Interval between cadence instance processing start times. |
| Data collection time interval | Defines the amount of time a cadence cycle will collect data for prior to advancing to the collection post processing stage. |
| Collection post-processing start delay time | Defines the amount of time the cadence instance collection post-processing stage delays starting the collection post collection processing programs. |
| Forecast cycle time increment | The amount of forecast time between forecast cycle iterations. |
| Cadence instance forecast post-processing delay | The amount of time that the forecast cycle post processing stage delays starting the forecast cycle post processing programs. |
| Cadence instance interstitial delay | The amount of time that the cadence cycles delay between cadence instances. |

In some embodiments, the cadence cycles execute asynchronously and the cadence instances are separated by the interstitial delay. In other instances, the cadence instances are performed synchronously, with each cadence instance started at a particular clock interval from a previous cadence instance.

Figure 4:
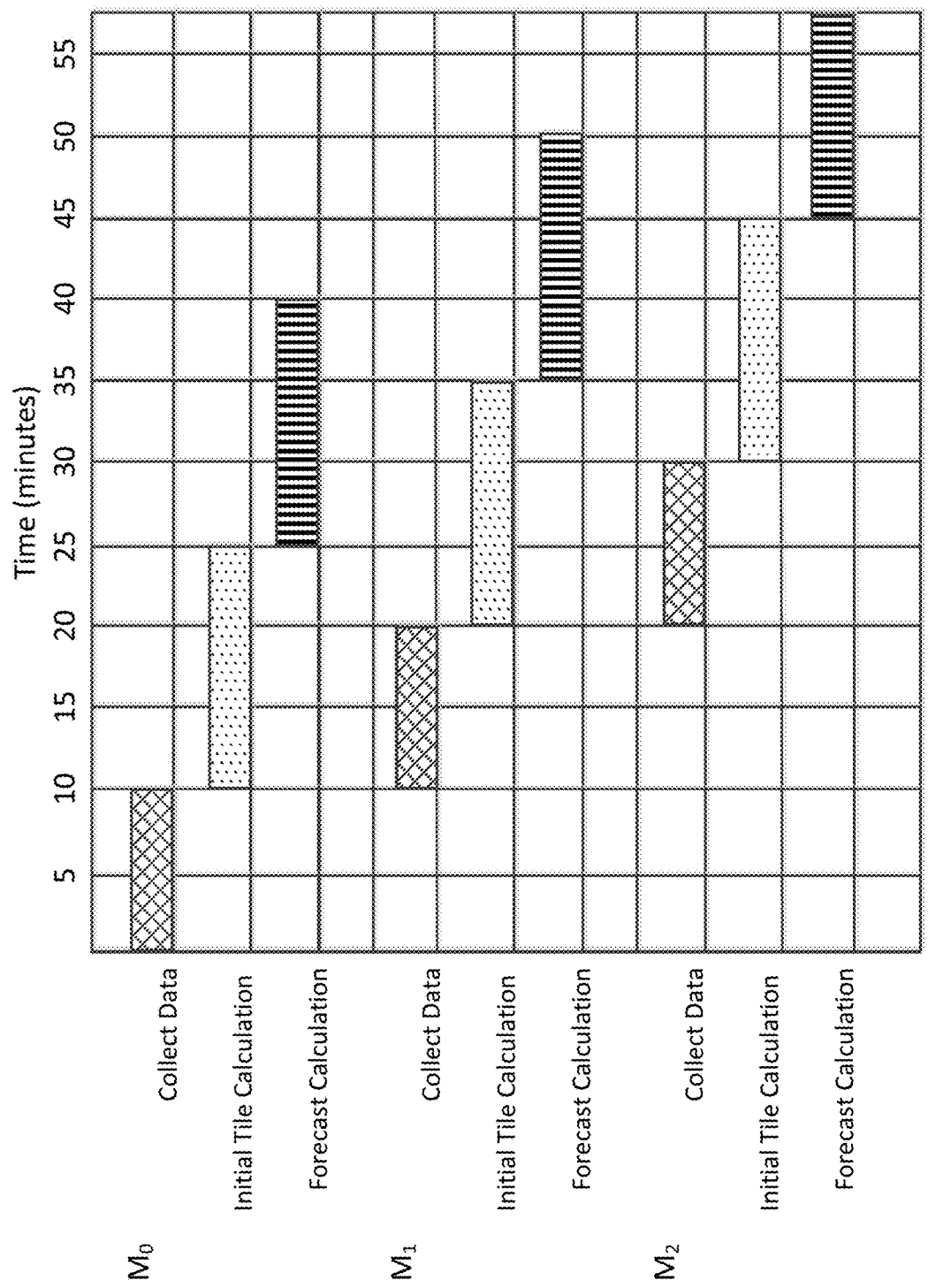
FIG. 4 illustrates cadence cycle processing timing, according to an illustrative embodiment.

FIG. 4 illustrates an exemplary cadence cycle processing for several cadence instances operating synchronously with a cadence instance start interval of 10 minutes and a forecast cycle time increment of 15 minutes. Cadence cycles may be classified as short or long. Short cadence cycles capture near term weather information and support real time and near real time weather forecasting. Long cadence cycles capture longer term weather data and provide for forecasts and models that typically are several days in duration. Typical short cadence cycles have interstitial delays of 0, 5, 10, or 15 minutes, and interstitial delays of 6 hours, 12 hours, 24 hours, or two days for longer cycle cadences. Similarly, short cadence cycle start intervals of 1, 5, or 15 minutes, with data collection times of 1, 5, 10, or even 20 minutes. In some cases, the cadence cycles are operated from a clock-based system such a cron on a Unix-based computer, which causes a cadence cycle to start at a specific time of day (e.g. 12 noon, 6 pm, 7 pm, 7:10 pm)

Figure 5:
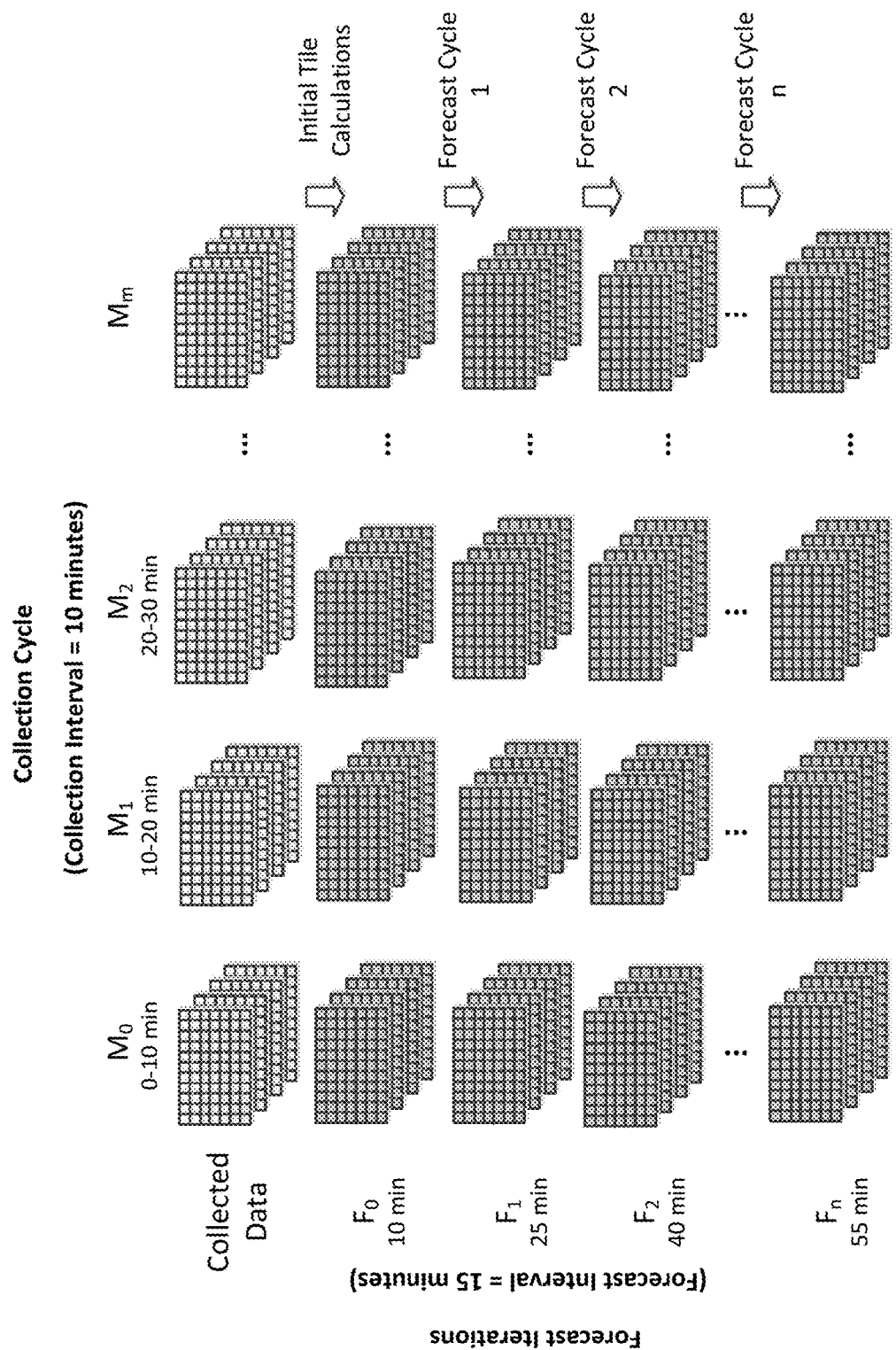
FIG. 5 illustrates data organization of cadence instances after several cadence cycles are processed, according to an illustrative embodiment.
Figure 6:
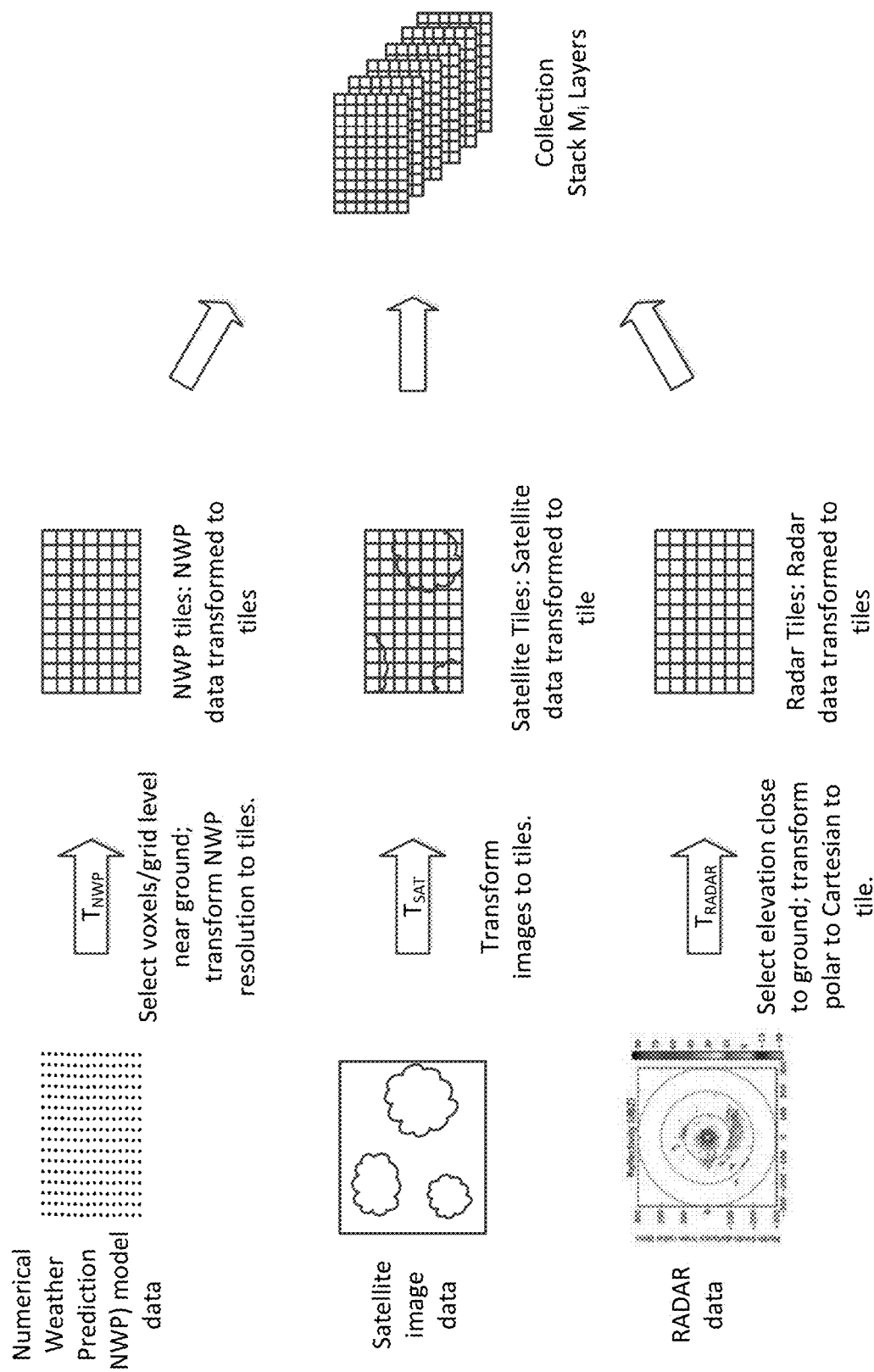
FIG. 6 illustrates exemplary collection to $M_i$ collection stack tile layers information flow, according to an illustrative embodiment.

After several cadence cycles are completed, the cadence instance may be represented as a grid of collected and forecast tile stacks as illustrated in FIG. 5. Since the collected and forecast data may be represented as a grid, individual and sets of logically related data elements can be identified as shown in the table below:

FIG. 6 illustrates several example data collection processing flows, with collected data from the respective data collection programs being received, processed by a stored transform, and converted into tile representations by storing it in a database in a manner that associates it with a cadence instance $M_i$'s collection stack tile layers. Details on these data collection and data processing steps are covered in later sections.

In FIG. 6, the first row represents the transformation of Numerical Weather Prediction (NWP) data to a tile layer. The received data is obtained from the NWP data source and is processed using a NWP processing program the uses a stored NWP data transform ($T_{NWP}$) to convert the NWP data to a tile representation and then stores the converted data in a database. The processing program associates the transformed data with the cadence instance and a particular tile layer.

The second row of FIG. 6 represents the transformation of satellite-based cloud images by a satellite image processing program that uses the stored satellite data transform ($T_{SAT}$) to convert the satellite cloud image from it collected form to a tile representation and then stores the converted data in a database. The processing program associates the transformed data with the cadence instance and a particular tile layer.

The third row of FIG. 6 represents the transformation of RADAR data images by a RADAR data processing program. The RADAR data processing program looks in the transform storage for a radar data transform ($T_{RADAR}$) that will transform the radar data with specific parameters (for a

TABLE 2

General Processing

| Reference notation | Description |
| --- | --- |
| $M_i$ | Cadence instance |
| $M_i$ collected data | The collected data associated with the $M_i$ cadence instance. |
| $M_i$ collected data (tile layer name) | A named tile layer corresponding to a specific input source collected as part of the $M_i$ cadence instance. |
| $M_i$ collected data (tile layer name) tile [x, y] | A specific tile in a collected data named tile layer, identified by its location in the tile layer. Note that indexing may be [x, y, z] for 3-D tile layers. |
| $M_i F_j$ | A specific forecast cycle (j) of the $M_i$ cadence instance |
| $M_i F_{j\ tile\ layer\ name}$ | A named tile layer corresponding to the output of a post-processing or forecast cycle forecast execution. |
| $M_i F_{j\ tile\ layer\ name}$ tile [x, y] | A specific tile in forecast cycle (j)'s named tile layer, identified by its location in the tile layer. Note that indexing may be [x, y, z] for 3-D tile layers. | specific radar site) to tile layer format. If no such transform is found, the program generates an appropriate transform and saves a copy in transform storage. The processing program then uses the transform (either a pre-stored copy or a newly generated copy) to transform that RADAR data to tile layer format and then stores the converted data in a database. The processing program associates the transformed data with the cadence instance and a particular tile layer.

The result of these conversions is a set of stored data associated with cadence instance $M_i$ collected data tile layer stacks. Similar processing approaches are provided for each data collection source in order to produce tile layers for the other collected data.

The table below identifies that pre-, post- and forecast processing programs and the tile layers that their output data are associated with.

TABLE 3

Processing Programs and Associated Output Data Tile Layers

| Data type | Collection Program/ Data Source | Database | Post processing, estimate generation, or forecasting program | $M_i$ layer reference name | Parameters | Units | Notes |
|---|---|---|---|---|---|---|---|
| Point-to-point microwave link raw attenuation data (520) | Microwave data collection program (510a, 510b) | Point-to-point microwave link attenuation database (321) | Point-to-point microwave link attenuation data processing program (610) | None | TSL, RSL | dB | |
| Point-to-point microwave link processed attenuation data (620) | Point-to-point microwave link attenuation database (321) | Point-to-point microwave link attenuation database (321) | None | None | Attenuation | dB | |
| Point-to-point microwave precipitation intensity | Point-to-point microwave link attenuation database (321) | Point-to-point microwave precipitation database (327) | Point-to-point microwave link precipitation program (917) | Collection: Point-to-point microwave precipitation tile layer | a. Precipitation intensity b. Precipitation type c. Precipitation intensity accuracy d. Precipitation intensity spatial resolution | a. mm/hr or in/hr b. Hail, sleet, rain, snow c. %. d. m. km, ft, miles | a. At ground level b. At ground level c. accuracy of microwave vs. radar precipitation intensity accuracy d. Function of link spacing |
| Cellular network raw attenuation data (524) | Microwave data collection program (510a, 510b) | Cellular network link attenuation database (351) | Cellular link attenuation data processing program (614) | None | RSRP and RSSI | dB | |
| Cellular network processed attenuation data (624) | Cellular network link attenuation database (351) | Cellular network link attenuation database (351) | None | None | Attenuation | dB | |
| Cellular network microwave precipitation intensity (624) | Cellular network link attenuation database (351) | Cellular network microwave precipitation database (354) | Cellular network microwave precipitation program (914) | Collection: Cellular network microwave precipitation tile layer | a. Precipitation intensity b. Precipitation type c. Precipitation intensity accuracy d. Precipitation intensity spatial resolution | a. mm/hr or in/hr b. Hail, sleet, rain, snow c. %. d. m. km, ft, miles | a. At ground level b. At ground level c. accuracy of microwave vs. radar precipitation intensity accuracy d. Function of link spacing |
| Radar raw data (521) | Radar data collection program (512) | Radar database (322) | Radar data processing program (611) | None | a. Atmospheric precipitation rate intensity b. Atmospheric precipitation type c. Temperature d. Humidity e. Wind speed f. Wind direction g. Atmospheric pressure gh. Total cloud cover i. Visibility j. Reflectivity (and other numeric data) | a. mm/hr or in/hr b. rain, hail, sleet, snow c. ° C. or ° F. d. % of saturation e. km/hr. or miles/hour f. Compass direction g. mmHg, mPa h. Image i. km or miles j. dBZ | a. Calculated by r data provider b. Calculated by data provider c. Calculated by data provider d. Calculated by data provider e. Calculated by data provider f. Calculated by data provider g. Calculated by data provider |

TABLE 3-continued

Processing Programs and Associated Output Data Tile Layers

| Data type | Collection Program/ Data Source | Database | Post processing, estimate generation, or forecasting program | $M_i$ layer reference name | Parameters | Units | Notes |
|---|---|---|---|---|---|---|---|
| | | | | | | | h. Calculated by data provider |
| | | | | | | | i. Calculated by data provider |
| | | | | | | | j. Raw data |
| Radar processed data (621) | Radar database (322) | Radar database (322) | None | Collection: Radar tile layer | a. Atmospheric precipitation intensity<br>b. Atmospheric precipitation type<br>c. Temperature<br>d. Humidity<br>e. Wind speed<br>f. Wind direction<br>g. Atmospheric pressure<br>h. Total cloud cover<br>i. Visibility<br>j. Reflectivity (and other numeric data) | a. mm/hr or in/hr<br>b. rain, hail, sleet, snow<br>c. ° C. or ° F.<br>d. % of saturation<br>e. km/hr. or miles/hour<br>f. Compass direction<br>g. mmHg, mPa<br>h. Image<br>i. km or miles<br>j. dBZ | |
| Ground weather station raw data (346) | Ground weather station data collection program (513) | Ground weather station database (323) | Ground weather station data processing program (612) | None | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. ° C. or ° F.<br>c. % of saturation<br>d. km/hr. or miles/hour<br>e. Compass direction<br>f. mmHg, mPa<br>g. ° C. or ° F.<br>h. km or miles | From ground level weather stations<br>a. Ground level<br>b. Ground level<br>c. Ground level<br>d. Ground level<br>e. Ground level<br>f. Ground level<br>g. Ground level<br>h. Ground level |
| Ground weather station processed data (622) | Ground weather station database (323) | Ground weather station database (323) | None | Collection: Ground weather station tile layer | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. ° C. or ° F.<br>c. % of saturation<br>d. km/hr. or miles/hour<br>e. Compass direction<br>f. mmHg, mPa<br>g. ° C. or ° F.<br>h. km or miles | a. Ground level<br>b. Ground level<br>c. Ground level<br>d. Ground level<br>e. Ground level<br>f. Ground level<br>g. Ground level<br>h. Ground level |
| NWP raw data (526) | NWP data collection program (515) | NWP ground weather database[1] (353)<br>NWP model atmospheric database (329) | NWP data processing program (616) | None | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. ° C. or ° F.<br>c. % of saturation<br>d. km/hr. or miles/hour<br>e. Compass direction<br>f. mmHg, mPa<br>g. ° C. or ° F.<br>h. km or miles | a. Ground level or atmospheric<br>b. Ground level or atmospheric<br>c. Ground level or atmospheric<br>d. Ground level or atmospheric<br>e. Ground level or atmospheric<br>f. Ground level or atmospheric |

TABLE 3-continued

Processing Programs and Associated Output Data Tile Layers

| Data type | Collection Program/ Data Source | Database | Post processing, estimate generation, or forecasting program | $M_i$ layer reference name | Parameters | Units | Notes |
|---|---|---|---|---|---|---|---|
| | | | | | | | g. Ground level or atmospheric<br>h. Ground level or atmospheric |
| NWP processed ground level weather data (626) | NWP ground weather database[1] (353) | NWP ground weather database[1] (353) | None | Collection: NWP ground weather tile layer | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. °C. or °F.<br>c. % of saturation<br>d. km/hr. or miles/hour<br>e. Compass direction<br>f. mmHg, mPa<br>g. °C. or °F.<br>h. km or miles | a. Ground level<br>b. 3 m above ground level<br>c. 3 m above ground level<br>d. 10 m above ground level<br>e. 10 m above ground level<br>f. at sea level<br>g. 10 m above ground level<br>h. 10 m above ground level |
| NWP model processed atmospheric data (629) | NWP model atmospheric database (329) | NWP model atmospheric database (329) | None | Collection: NWP atmospheric tile layer | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. °C. or °F.<br>c. % of saturation<br>d. km/hr. or miles/hour<br>e. Compass direction<br>f. mmHg, mPa<br>g. °C. or °F.<br>h. km or miles | a. Ground level or atmospheric<br>b. Ground level or atmospheric<br>c. Ground level or atmospheric<br>d. Ground level or atmospheric<br>e. Ground level or atmospheric<br>f. Ground level or atmospheric<br>g. Ground level or atmospheric<br>h. Ground level or atmospheric |
| Satellite image raw data (527) | Satellite image data collection program (516) | Satellite image database (326) | Satellite image data processing program (617) | None | Cloud images | | |
| Satellite image processed data (627) | Satellite image database (326) | Satellite image database (326) | None | Collection: Satellite image tile layer | Cloud images | | |
| Forecast precipitation data (902) | One or more of<br>a. Point-to-point microwave precipitation database (327); and<br>b. Cellular network precipitation database | Precipitation forecast database (325) | Precipitation forecasting program (915) | Forecast (j): Precipitation tile layers | a. Precipitation intensity<br>b. Precipitation type<br>c. Precipitation intensity accuracy at specified location<br>d. Precipitation intensity spatial resolution at specified location | a. mm/hr or in/hr<br>b. Hail, sleet, rain, snow<br>c. %.<br>d. m. km, ft, miles of specified number of link | a. At ground level<br>b. At ground level<br>c. accuracy of microwave vs. radar precipitation intensity accuracy; function of number of links per area for |

TABLE 3-continued

Processing Programs and Associated Output Data Tile Layers

Figure 8:
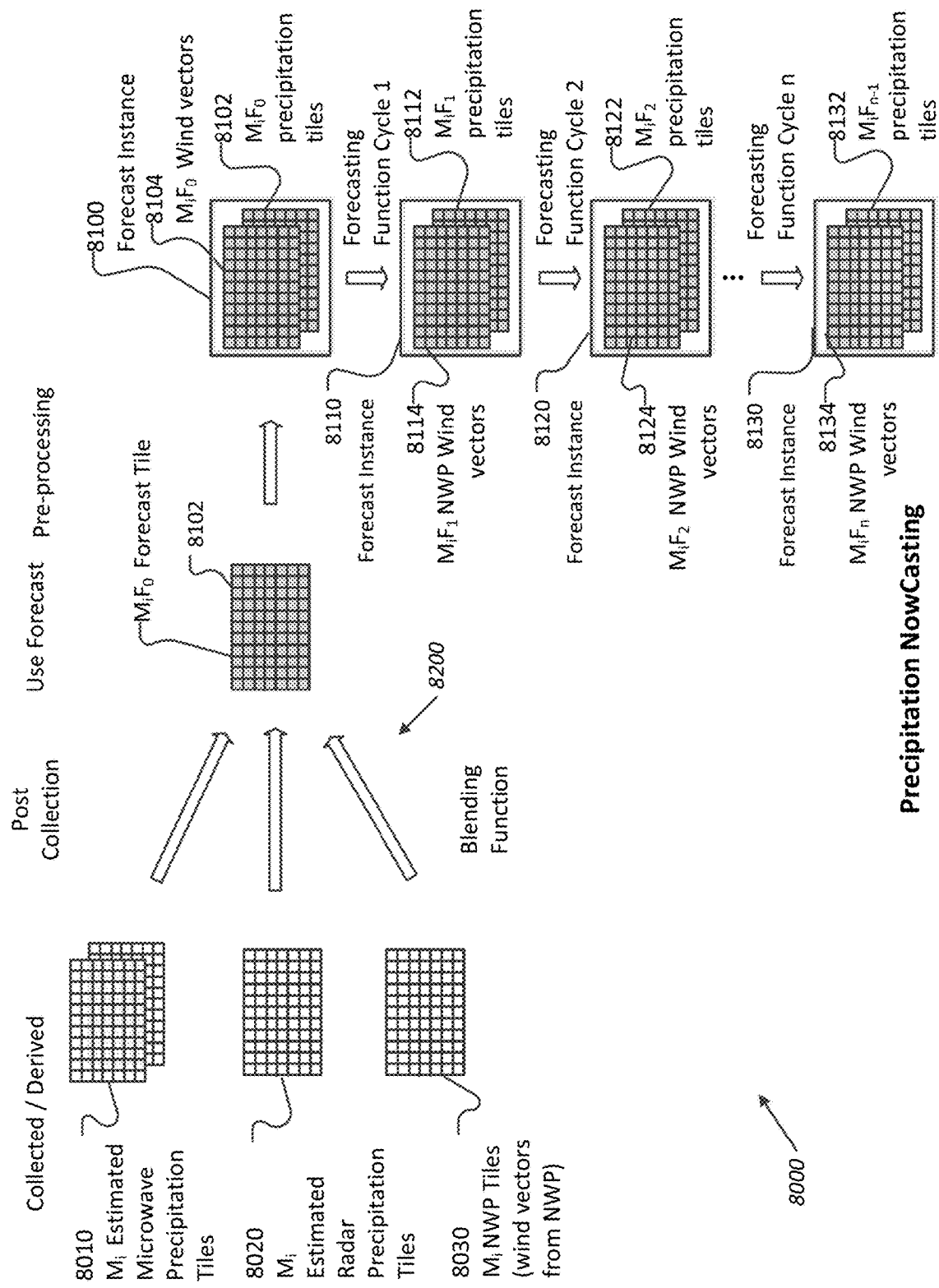
FIG. 8 illustrates exemplary information flows during nowcast forecasting, according to an illustrative embodiment.

| Data type | Collection Program/ Data Source | Database | Post processing, estimate generation, or forecasting program | $M_i$ layer reference name | Parameters | Units | Notes |
|---|---|---|---|---|---|---|---|
| | (354); AND One or more of: c. Radar database (322); d. NWP atmospheric database (329) | | | | | | microwave precipitation estimates d. Function of microwave link grid spacing Note: Referring to FIG. 8 and section 6.7, forecast precipitation includes blended precipitation intensity tile layer (8102) which can include precipitation estimates, combined using a blending function (8200), from one or more microwave precipitation estimate data sources (e.g. Data Sources b, c,) and can further include precipitation estimates from one or more radar or NWP data sources (e.g. Data Sources d, e) |
| Other info raw data (523) | Other info data collection program (514) | Other info database (324) | Other info processor (613) | Optional additional tile layer | | | |
| Accumulated precipitation (901) | One or more of: b. Point-to-point microwave precipitation database (327); and c. Cellular network precipitation database (354); AND One or more of: d. Radar database (322); | Accumulated precipitation database (903) OR Source Data database | | Accumulated precipitation data layer or Data Source data layer | Precipitation accumulated over a specified time period | mm, in, or volume per time period | a. Calculated based on precipitation intensity from forecast precipitation tile layer |

TABLE 3-continued

Processing Programs and Associated Output Data Tile Layers

| Data type | Collection Program/ Data Source | Database | Post processing, estimate generation, or forecasting program | $M_i$ layer reference name | Parameters | Units | Notes |
|---|---|---|---|---|---|---|---|
| | e. NWP model atmospheric database (329) f. Forecast precipitation data (902) | | | | | | |

[1] Ground level NWP data is extracted from full atmospheric NWP data set and stored in ground weather database Some collection processes do not organize the information collected by cadence. Often this data is configuration data that is used in the generation of pre-stored transforms. Examples are shown in the table below:

TABLE 4

Configuration Data

| Data type | Collection program | Database | Usage notes |
|---|---|---|---|
| Map data | Map data collection program (517) | Map database (880) | Generating base maps, determining geographic features (e.g. runway locations and size/shape), determining elevations of ground locations (e.g. elevations of microwave transmitter and receiver locations) |
| Point-to-point microwave network topology | Microwave data collection program (510a, 510b) | Point-to-point microwave link topology database (357) | Locations are used for creating point-to-point microwave precipitation grid |
| Point-to-point microwave tower and signal characteristics | Microwave data collection program (510a, 510b) | Point-to-point microwave link topology database (357) | Point-to-point microwave precipitation grid creation; Microwave precipitation link-to-grid and grid-to-tile transforms |
| Point-to-point microwave link status updates | Microwave data collection program (510a, 510b) | Point-to-point microwave link topology database (357) | Update point-to-point microwave precipitation grid and microwave precipitation link-to-grid and grid-to-tile transforms |
| Cellular network link endpoint information | Microwave data collection program (510a, 510b) | Cellular network link topology database (358) | Cellular microwave precipitation grid creation; cellular microwave precipitation link-to-grid and grid-to-tile transforms |
| Imaging satellite location and characteristics data | Satellite image data collection program (516) | Imaging satellite characteristics database (359) | Satellite image to tile transform |
| Location of interest definitions | HyperCast program (890) | Location of interest database (391) | Identify locations and areas for weather information reporting. Used to create weather parameter reporting and forecasting transforms. |
| Radar characteristics | Radar data collection program (512) | Radar characteristics database (392) | Radar data processing |
| Additional data | Other info data collection program (514) | Other info database (324) | |

Pre-stored filters and transforms, stored in transform and filter database (393) permit the efficient processing of collection data by pre-calculating aspects of the variable portions of the complex mapping and forecasting equations, which in turn simplifies the post-collection processing required. This has the effect of significantly speeding up the processing of the collected data. Some filters and transforms are provided with the system, others as calculated by information collection and normalization server (310 of FIG. 9) or offline/background processing server (330 of FIG. 9) in response to collected data, or are stored (cached) after they are computed (such as with radar transforms). Offline/background processing server (330) can periodically, for example in response to collected data, recalculate one or more filters or transforms and replace a pre-stored filter or transform with the recalculated filter or transform. The system suspends cadence post-collection processing and forecasting when offline/background processing server (330) is updating a filter or transform. A transform T can include a clipping transform, mapping transform, coordinate mapping transform, etc.

TABLE 5

Pre-Stored Filters and Transforms

| Type | Calculating program | Use program | Comments |
| --- | --- | --- | --- |
| Filter | | | |
| Point-to-point microwave link frequency filter | | Point-to-point microwave link attenuation data processing program (610) | Exclude non-microwave transmissions; exclude transmissions on frequencies below a specified frequency, for example below 5 GHz |
| Cellular network frequency filter | | Cellular link data processing program (614) | Exclude non-microwave transmissions; exclude transmissions on frequencies below a specified frequency, for example below 5 GHz |
| Point-to-point microwave link received signal strength filter | Point-to-point microwave link attenuation data processing program (610) or pre-configured | Point-to-point microwave link attenuation data processing program (610) | Exclude microwave link measurements with received signal strength below a specified threshold; removes inactive links and links for which signal strength was not accurately measured |
| Cellular network received signal strength filter | Cellular link data processing program (614) or pre-configured | Cellular link data processing program (614) | Exclude microwave link measurements with received signal strength below a specified threshold; removes inactive links and links for which signal strength was not accurately measured |
| Transform | | | |
| Point-to-point microwave link baseline transform | Point-to-point microwave link attenuation data processing program (610) | Point-to-point microwave link attenuation data processing program (610) | Transform raw attenuation to attenuation due to precipitation raw attenuation to attenuation due to precipitation. |
| Cellular network baseline transform | Cellular link data processing program (614) | Cellular link data processing program (614) | Transform raw attenuation to attenuation due to precipitation. |
| Point-to-point microwave link-to-grid transform | Point-to-point microwave link attenuation data processing program (610) | Point-to-point microwave link precipitation program (917) | Transform point-to-point microwave link measurements to microwave precipitation grid. |
| Point-to-point microwave grid-to-tile transform | Point-to-point microwave link attenuation data processing program (610) | Point-to-point microwave link precipitation program (917) | Transform microwave grid attenuation measurements to microwave precipitation tile precipitation intensity. |
| Cellular network link-to-grid transform | Cellular link attenuation data processing program (614) | Cellular network microwave precipitation program (914) | Transform cellular network link measurements to microwave precipitation grid. |
| Cellular network grid-to-tile transform | Cellular link data processing program (614) | Cellular network microwave precipitation program (914) | Transform cellular network grid attenuation measurements to microwave precipitation tile precipitation intensity. |
| NWP data transform | NWP data processing program (616) | NWP data processing program (616) | Transform NWP data from NWP data coordinates to tiles. |
| Satellite image transform | Satellite image data processing program (617) | Satellite image data processing program (617) | Transform satellite image data from satellite image coordinates to tiles. |
| Radar transform | Radar data processing program (611) | Radar data processing program (611) | Transform radar data from radar coordinates to tiles. |

Once the collected data is collected, filtered, pre-processed, and organized, the asynchronous collection cycle can repeat, possibly overwriting any previously collected data.

At the end of a collection cycle, the cadence index is incremented. Collection processes continue writing their newly collected data associated with the new cadence index. Processing of recently collected data will be completed using the previous (un-incremented) cadence index that it was assigned when collected. Subsequent data collected will be stored using the incremented cadence index. The time at which the cadence index was incremented is called the cadence timestamp, and is used in the forecasting process to adjust for collection delays.

Once a cadence instance has all of its data fully collected and written to the databases, collection post-processing programs are executed by one or more processors of the system. These post-processing programs are sequenced by the system configuration so that data dependencies are honored and parallel processing pipelines are correctly configured. Specifically, the system does not start of the execution of post-processing programs until the data that they need becomes available from other processes (collection or post-processing). As each piece of data is made available, the system starts any programs that can be run against that data. This has particular importance for parallel processing programs that break up a processing task into many tasks that are executed independently on a plurality of computer processors. The collection post processing programs operate on the collected data of the current cadence instance and upon the collected and forecast data of previous cadence instances. Post-processing operates by executing programs that read the data associated with one or more cadence instance tile layers, perform calculations on this data, and store the data in a data type specific database so as to create one or more tile layers in the $F_0$ data stack of the current cadence instance. A notification may be sent when a post-processing program (or parallel portion) completes or when the entire post-processing stage is completed. These notifications permit the system to start the next process in a processing pipeline, or to transition to a new processing stage (e.g. post-processing to forecast). An example of this type of post-processing is the program that computes the conversion of microwave link attenuation data into a microwave precipitation estimate layer by applying a pre-computed transform to the collected data.

Figure 7:
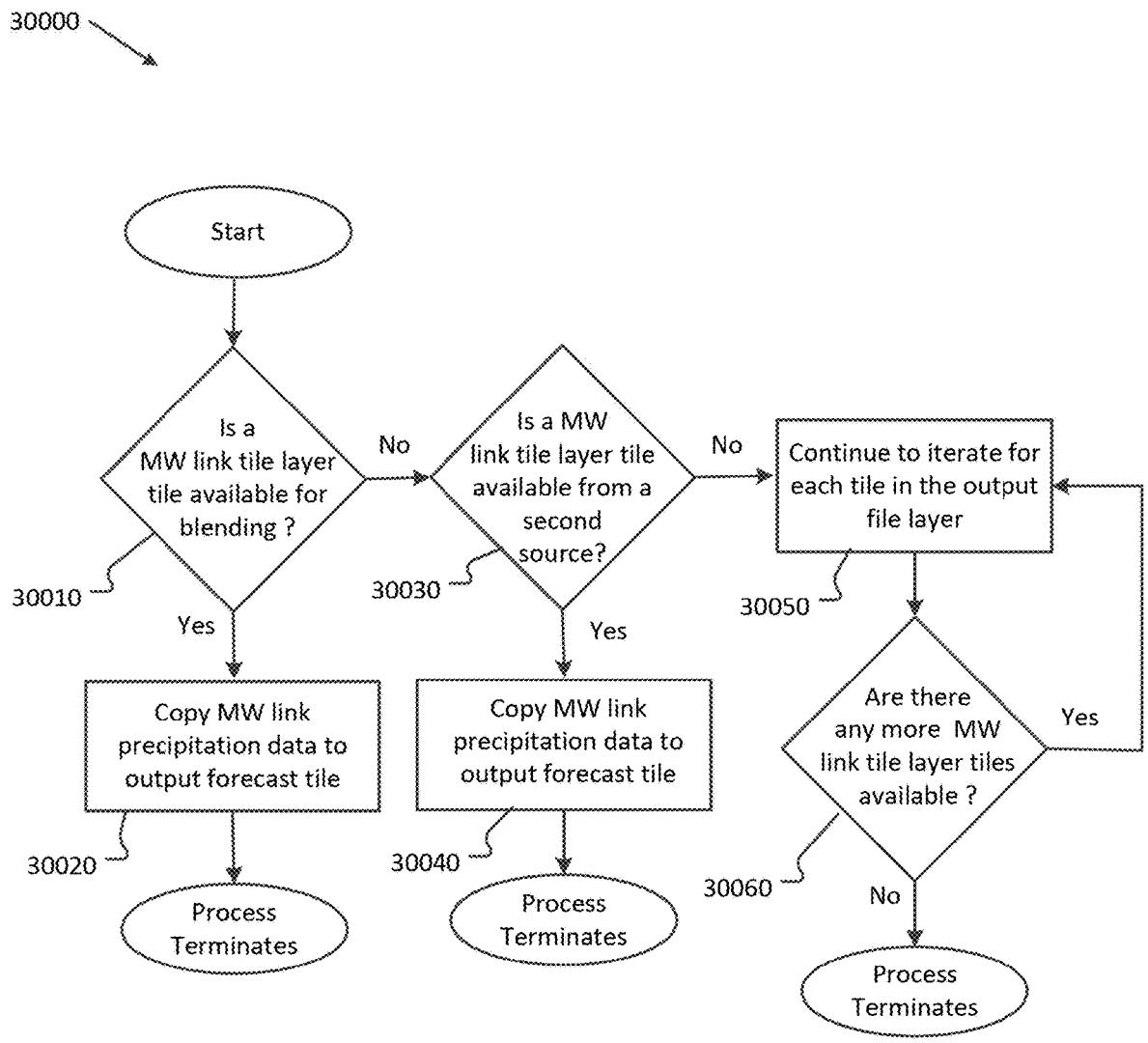
FIG. 7 depicts a process flowchart for an exemplary post-collection forecast blending function, according to an illustrative embodiment.

One notable post-collection processing program is the precipitation blending program (918). This program takes one or more precipitation estimate layers from the collection tile stack and blends them together to produce an initial forecast precipitation tile layer (e.g. the $M_iF_0$-forecast precipitation tile layer). An exemplary precipitation layer blending program operates as detailed in FIG. 7. In step 30010, the blending program determines if a microwave link precipitation tile layer tile is available for the tiles to be blended. If so, in step 30020, the microwave link precipitation data is copied to the output forecast tile and the process ends. In step 30030, if the program determines that the microwave link precipitation tile layer tile is not available, then the program checks if a second precipitation data source's tile layer is available. If so, in step 30040, the program copies the second tile to the output forecast tile and the process ends. As long as there are additional precipitation tile layers to check, the program checks each one in turn (step 30050), copying the tile when one is found. This process iterates for each tile in the output tile layer (step 30060).

An alternative exemplary blending process uses pre-computed accuracy improvement metrics from transform and filter database (393) to govern the blending operations. The program functions generally as described above, but accesses accuracy improvement data from the accuracy improvement database for the tile under consideration, and uses the accuracy improvement data for the current tile to select the source tile layer(s) based upon the highest available accuracy. Thus, if microwave link attenuation based precipitation estimates are more accurate than radar-based precipitation estimates for a particular location, the blending program will choose the microwave link attenuation-based precipitation estimate. Alternatively, if the radar-based precipitation estimate is more accurate for a particular location, the blending program will choose the radar-based precipitation estimate instead.

The precipitation layer blending program may optionally perform blending functions for wind vector forecasts.

Once the collection post processing stage is complete, the system then starts to process the forecasting stage, starting with the forecast pre-processing stage. The forecast pre-processing stage executes the configured forecast pre-processing programs in a configuration dependent order. These programs may be sequenced by system configuration so that dependencies are honored and parallel processing pipelines are correctly configured. The pre-processing stage reads information stored in the current cadence instance's $F_0$ tile stack and, optionally, collected information for the current cadence instances or collection or forecast data of prior cadence instances, performs calculations that produce new data as a result of those calculations, and writes the resulting data to a data type specific database in order to create a new data type tile layer of the $F_0$ tile stack. A notification may be sent when a post-processing program completes or when the entire post-processing stage is completed. These notifications permit the system to start the next process in a processing pipeline, or to transition to a new processing stage (forecast pre-processing to forecast cycle processing).

Once all of the forecast pre-processing is complete, the system begins an iterative process of calculating the forecasts for multiple points in future time. The first cycle, $F_0$, is associated with the cadence timestamp, as described above. The initial forecast index is set to zero (0).

The forecast cycle operates by selecting a forecasting program such as precipitation forecasting program (915) of the modeling and prediction server (360) and executing the program. The forecasting program operates upon one or more of the current cadence instance's forecast current cycle tile data (e.g $M_iF_{forecast\ index}$ forecast tile data (and optionally upon the current cadence instance collection data and/or past cadence instances collection and forecast data)), reading that data into the processor memory, performing calculations upon that data, creating new forecast data, and writing the resulting data to a data type specific database in order to create a new forecast data type tile layer associated with $M_iF_{forecast}$ index. A notification may be sent when a forecast program completes or when the entire forecast cycle stage is completed. These notifications permit the system to start the next process in a processing pipeline, or to transition to a new processing stage (forecast pre-processing to forecast cycle processing).

By appropriate sequencing of forecast program executions, the system can be configured, for example, to first process the current forecast precipitation, and then to execute additional extension programs calculate additional forecast or computed results, such as a post-processing extension program that provides hydrology forecasting based upon forecast precipitation rates as described herein.

After each forecast cycle completes, and forecast end count has not been reached, the system iterates to perform the next forecast cycle. Each iterative forecast cycle increments the forecast index by 1 and generates a new forecast cycle timestamp. Processing then proceeds as above, with the iterative generation of MiFforecast index data type specific tile layers.

The system can determine accumulation amounts by retrieving parameter values from tile stacks of multiple models $M_i$ and forecast layers $M_iF_j$ having time stamps covering a desired accumulation time span. The retrieved parameter values are summed to generate an accumulated amount. Thus, accumulated precipitation from a first time x to a second time y is the sum across model and forecast layers spanning time x to time y. To determine an accumulated parameter for an area for time x to time y, the server retrieves parameter values for the area from for the selected layers, calculates an average for the area for each layer, and sums the averages for all selected layer. The average for an area is the arithmetic sum of the data elements within the selected tiles, divided by the number of tiles.

6.3.2 Illustrative Computing Architecture

Figure 9:
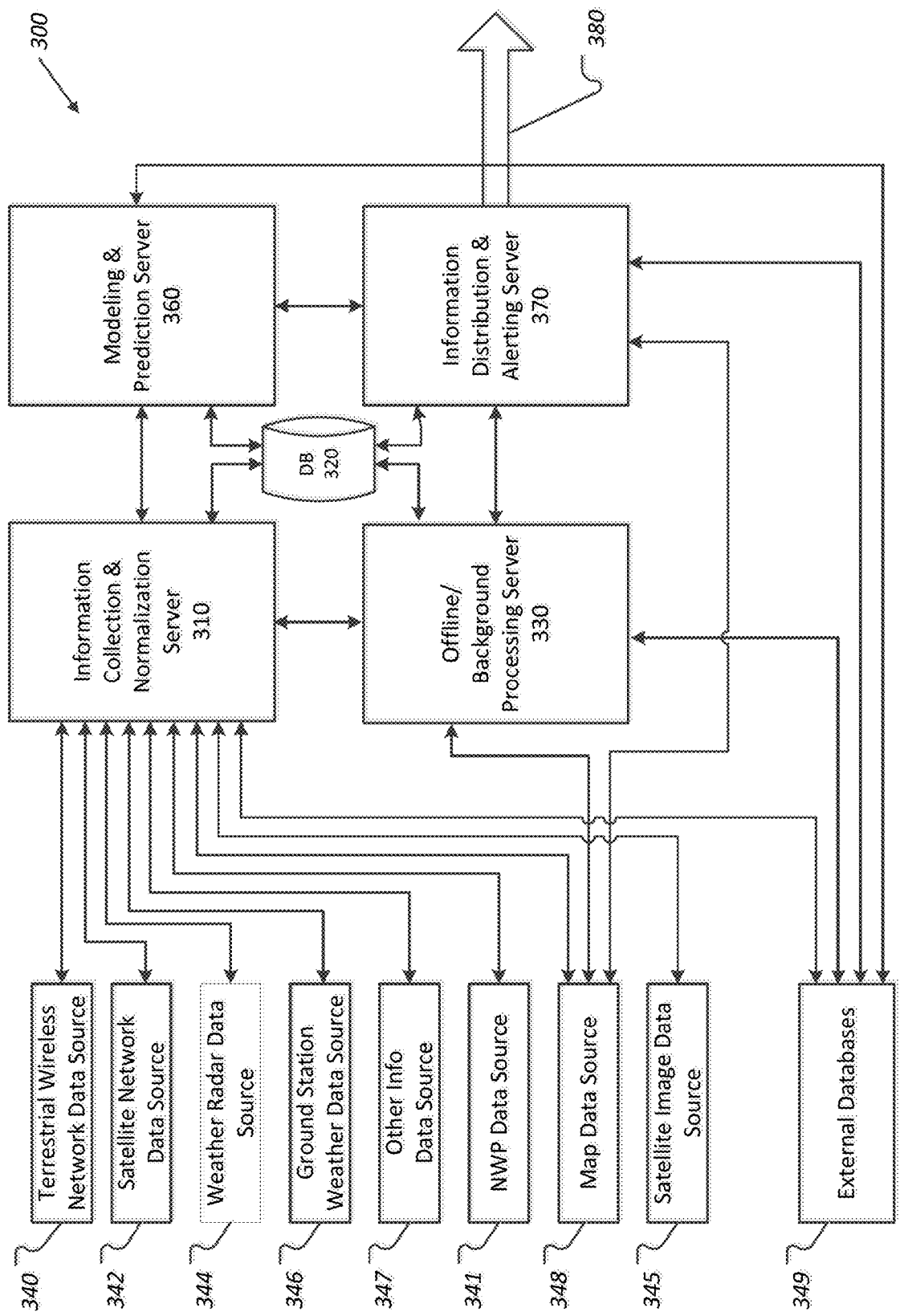
FIG. 9 depicts an exemplary systems diagram of a computing apparatus supporting aspects of the described system, according to an illustrative embodiment.

FIG. 9 illustrates, by example, a precipitation modeling and forecasting system (300) comprising four computing servers (310, 330, 360, and 370) performing the data processing tasks appropriate to the server architecture, with each server operating as a different one of the logical processing components described above. A plurality of data inputs or data sources (340-342, 344-349), having various origins, can be received by the precipitation modeling and forecasting system and a plurality of data and outputs produced and distributed by the precipitation modeling and forecasting system (300). The precipitation modeling and forecasting system receives the data inputs at various ones of the servers and distributes the data outputs from various ones of the servers in part according to the functionality of each server and in part according to how frequently the data is updated or collected. Accordingly, some data inputs are received and processed in real time, e.g. processing begins as soon as the data is received and pre-processed (e.g., formatted), while other data inputs are received and/or processed on a scheduled routine (e.g., stored for formatting and processing on a time delayed or batch mode processing schedule). All of the servers and databases are interconnected over a communications network, e.g., a digital network such as a private or public network which may be a local area network (LAN) or a wide area network (WAN).

The digital network may further include a system database (320) that includes one more data stores (e.g., a first data store, a second data store, a third data store, and/or a fourth data store) and is shared by some or all of the servers (310, 330, 360 and 370) using network communications and/or each server (310, 330, 360 and 370) may include its own database operating thereon. In any case the precipitation modeling and forecasting system provides each server with access to external data sources (340-342, 344-349) and internal or system data sources from the system database (320) or from databases operating on one or more of the four servers (310, 330, 360, and 370) as is required to perform the necessary data collecting, data clean up and pre-processing, precipitation modeling, forecast modeling, or the like. Accordingly, input and output data is processed and modeled in real time, in a time delayed mode, and in batch mode, respectively, either simultaneously or asynchronously, and shared between system components on various servers using network communications, notifications, messages, common storage, or other means in common use for such purposes. The described architecture segregates programs and processes that have different attributes, including the programs and processes that are periodically performed on a scheduled routine or basis, batch collection and loading of data, computation intensive and parallel processing modelling, and user interface, onto separate servers for purposes of clarity of presentation. Alternatively or in addition, other processing arrangements may be used to implement the system.

The information collection and normalization server (310) interacts with external data sources (340-342, 344-349) and collects relevant information from these sources for use by the precipitation modeling and forecasting system (300). Some exemplary sources are described in more detail below.

The Terrestrial Wireless Network data source (340) comprises a plurality of Terrestrial Wireless Network data sources each providing wireless network topology and infrastructure information and microwave link information relating to one or more microwave networks The wireless network data sources are typically provided by Terrestrial Wireless Network operators, such as Verizon, Sprint, or AT&T. For point-to-point networks, the wireless topology and link information at least includes for each microwave link, infrastructure and network topology information such as the geolocation and an end point identification of each end point, the microwave signal frequency used by the end points, a time stamp, and a link information comprising a data stream of microwave signal amplitude characteristics sampled over a known temporal period. The microwave signal amplitude characteristics are usable to determine signal attenuation degradation caused by weather related phenomena such as precipitation, (e.g. rain, snow, sleet or hail) and others such as fog, clouds, humidity, temperature, wind or the. Ideally, the microwave signal amplitude characteristics comprise adjusted signal amplitude values. An adjusted signal amplitude value is a value that represents the difference between an expected signal amplitude at a receiving end, under ideal weather conditions, vs. an actual signal amplitude at the receiving end, wherein ideal weather conditions are a clear day with no weather phenomena present that are known to cause signal attenuation at the particular microwave signal frequencies and signal amplitudes being employed by the point to point or cellular microwave links.

Other wireless topology and link information may include transmitted signal levels (TSL), received signal levels (RSL), signal polarization, baseline or expected RSL signal levels for given TSL under ideal weather conditions, the elevation and azimuth angles of the antenna at each end point, the altitude of each link end point, or the like. Wireless topology and link information may be received from a plurality of locations, a plurality of network providers over large geographic regions, such as from Terrestrial Wireless Networks operating a plurality of separate cellular network cells or regions (e.g. from a Terrestrial Wireless Network located in Chicago and operated by Verizon, a Terrestrial Wireless Network located in New York and operated by Verizon, Terrestrial Wireless Networks located in New York and in Chicago and operated by Sprint, and Terrestrial Wireless Networks located in New York and in Chicago and operated by AT&T). Each Terrestrial Wireless Network in each location can provide individual sets of data, and in some instances wireless topology and link information received may comprise a combination of data from several carriers operating between the same two end points using different microwave frequencies and signal strengths.

Data from Wireless Network data sources are typically acquired by communicating with a management server of one or more Terrestrial Wireless Networks or by communicating directly with one or more evolved Mode B (eNB) of these networks. An information collection and normalization server (310) can send requests for data or receive pushed data from one or more eNBs and network management servers. The information collection and normalization server (310) includes an alerting function wherein a Wireless Network data source is notified if data reporting errors occur; for example if an eNB or wireless network management server stops reporting data or if received data includes missing information, as compared to previous data, or zero value measurement reports.

The Terrestrial Wireless Network data can be provided in the form of one or more CSV files and may include static network topology information, such as the location and altitude of antenna masts and antenna(s) on those masts, along with orientation and polarization of the signals sent by the transmitter, the identity and type of eNB equipment (transmitters) attached to those antennas, identification of point-to-point microwave links, including point-to-point link endpoint locations, link length, power settings, and signal polarization. The data sources may also provide cellular link configuration and operating information related to cellular microwave communication signals transmitted between eNBs and UEs. The cellular link configuration data provided may optionally include identity and location of UEs and identify these connections as dynamic or static links each having a UE link ID and an activity indication, such as the last time the UE communicated with the eNB. The operating information included in the data may include information regarding both static and cellular links, including a link ID, whether the link is operating, its operating power, transmitted and received polarization characteristics, the signal propagation time, and the observed attenuation of the microwave link signal. The data source may also provide additional information related to the Terrestrial Wireless Network, its topology, and its operations. A non-limiting example of the types of information provided by a Terrestrial Wireless Network data source is provided in Table 6 below:

TABLE 6

| Information Types Provided by a Terrestrial Wireless Network Data Source | | |
|---|---|---|
| Antenna Masts | | |
| Mast ID | Unique ID of the antenna mast. | |
| Location | Latitude and Longitude of antenna or GPS coordinate (may include the base altitude of the mast). | |
| Antenna | | |
| Antenna ID | Unique ID of the antenna. | |
| Altitude | Altitude of the antenna. | |
| Azimuth | Compass azimuth of the antenna. | Cellular antennas |
| Elevation | Angle of elevation of the antenna. | Cellular antennas |
| eNB ID | Unique ID of the eNB the antenna is connected to. | Cellular antennas |
| Point-to-Point Microwave Links | | |
| Path Name/Link ID | | |
| Endpoint A antenna ID | | |
| Endpoint B antenna ID | | |
| Frequency | | In GHz |
| Polarization | | |
| Quantization | Quantization of link measurements. | e.g. 0.1, .5, 1 dB |
| TX Level | Transmission level (reported by link), 0 if not operating. | In dB |
| RX level | Received level (reported by link). | In dB |
| Signal attenuation | Signal attenuation (in dB). | Calculated from transmission characteristics |
| Adjusted signal attenuation | Signal attenuation adjusted for zero-value. | Calculated from Signal attenuation |
| Timestamp | Timestamp of last reading. | |
| Cellular Microwave Links | | |
| UE ID | User Equipment unique ID. | Often MEID |
| Antenna ID | Antenna ID for the eNB connected to. | |
| Timestamp | Timestamp of last reading. | |
| Frequency | Frequency of the link (may change regularly, depending upon signaling protocol). | In GHz |
| Quantization | Quantization of link measurements. | e.g. 0.1, .5, 1 dB |
| UE location | Latitude and Longitude of the UE. | Computed or read |
| Link Length | Length of the link (in meters). | Computed from UE and antenna locations |
| Distance from antenna | Distance of the UE from the antenna (in meters). | May be computed from signal propagation information or UE location and antenna location |

TABLE 6-continued

Information Types Provided by a Terrestrial Wireless Network Data Source

| | | |
|---|---|---|
| TX Level | Transmission level (reported by link), 0 if not operating. | In dB |
| RX level | Receive level (reported by link). | In dB |
| Attenuation | The amount a signal is reduced by transmission between two endpoints. | In dB |
| Adjusted signal attenuation | Signal attenuation adjusted for zero-value. | Calculated from Signal attenuation |

Weather satellite information data sources (345) include providers of data collected by weather satellite systems. Exemplary weather satellite systems include National Oceanic and Atmospheric Administration's (NOAA) Geostationary Operational Environmental Satellite (GOES) and Polar Operational Environmental Satellite (POES) systems as well as weather satellite systems operated by other organizations and countries. These weather satellites provide image data from visible light and infrared sensors associated with cloud coverage and cloud systems, pollution effects, dust storms, smoke from fires, snow and ice cover, ocean current boundaries, volcanic activity, ozone holes, and the like. Weather satellites can also provide other weather-related data such as humidity data generated by microwave humidity sounders and data gathered by other weather satellite mounted microwave sounders. Data from weather satellite information data sources (345) can be factored into how a precipitation map based on microwave attenuation data is constructed as well as how a precipitation map is forecast.

Weather Radio Detection And Ranging (RADAR) data sources (344) provide weather radar information, which may include static radar information such as the location, beam angle, radio frequencies used, and similar information, and dynamic information such as radar reflectivity under various conditions. The weather radar data sources may also provide pre-processed radar data sets. Available radar data sets include a variety of measurement data types, data presentation formats, and processed or partially processed data products.

Weather radar systems include a transmitter that emits pulses of microwave signals outward over a circular pattern; however, the microwave signals can be scattered by precipitation, with some of the energy reflected back, and the reflected microwave signals that are reflected back to a radar receiver are processed as radar data. The amplitude of the received radar signal as well as the round-trip time it takes to receive a radar echo are used to determine a type of precipitation, the location and boundaries of precipitation patterns and the precipitation intensity of precipitation patterns that resulted in the radar echo characteristics. Additionally, Velocity Azimuth Display (VAD) Wind Profile data is a type of radar information usable to estimate horizontal wind velocity at various vertical heights above the radar transmitter.

Exemplary weather radar systems that are network accessible and can be used as a weather radar data source include Next Generation Weather Radar (NEXRAD), which is a network of 159 high-resolution S-band Doppler weather radars operated by the National Weather Service (NWS) and Terminal Doppler Weather Radar (TDWR) operated by the Federal Aviation Administration (FAA) in the United States. NEXRAD and TDWR data sets can be retrieved from the National Oceanic and Atmospheric Association (NOAA) Radar Operations Center, NOAA's National Centers for Environmental Information (NCEI), and from the National Weather Service (NWS).

For example, NEXRAD data sets available from NCEI include Level-II data base data sets which include digital radial base data (Reflectivity, Mean Radial Velocity, and Spectrum Width) and Dual Polarization variables (Differential Reflectivity, Correlation Coefficient, and Differential Phase) output from the signal processor in Radar Data Acquisition units. The output also includes status information required to properly interpret the data (e.g., information on synchronization, calibration, date, time, antenna position, Nyquist velocity, and operational mode). Data collection and recording are generally provided as files, which typically each contain four, five, six, or ten minutes of base data depending on the volume coverage pattern. A data file consists of a 24-byte volume scan header record followed by numerous 2,432-byte base data and message records.

Records available from the weather radar data sources (344) also include Level-III data such as, for example, instantaneous precipitation intensity and one hour precipitation accumulation derived from radar data. The weather radar data source (344) can also provide data that includes Velocity Azimuth Display (VAD) Wind Profile data which provides an estimate of horizontal wind velocity at various vertical heights above the radar transmitter.

Ground station weather data sources (346) include individual weather sensors operating at or near ground level at various geolocations such at land and sea based weather stations, at airports and sea ports, on top of buildings and mountains at various altitudes. The ground weather data sources include rain or snow gauges for measuring actual rain and snow accumulation on the ground, barometers for measuring local atmospheric pressure, thermometers, wind speed and direction sensors, and hydrometers for measuring relative humidity or dew point. Ground weather data may be provided by one or more networks of weather stations and weather sensors such as those provided commercially by the Weather Company.

A partial list of weather sensors and related weather data that may be obtained from various external data sources is provided in Table 7 below.

TABLE 7

Weather Sensors and Related Weather Data

| # | Sensor Modality | Temporal Resolution | Spatial Resolution |
|---|---|---|---|
| 1 | Radar | 3-10 min | 1 km |
| 2 | Microwave Links | 1 min | 300 m |
| 3 | Satellite | 30 min-3 hr | |
| 4 | Rain Gauges and Meters | 60 min | |
| 5 | Barometers | 60 min | |
| 6 | Temperature | 60 min | |
| 7 | Humidity | 60 min | |

TABLE 7-continued

Weather Sensors and Related Weather Data

| # | Sensor Modality | Temporal Resolution | Spatial Resolution |
|---|---|---|---|
| 8 | Dew Point | 60 min | |
| 9 | Visibility | 60 min | |

Numerical Weather Prediction (NWP) model data sources (341) can include sources of data derived from numerical modeling, including numerical models maintained by the National Weather Service (NWS), and National Centers for Environmental Prediction (NCEP), which include assimilation and modelling using data inputs from multiple sources including commercial aircraft weather data, balloon data, radar data, surface observations, and satellite data. NCEP models include the Rapid Refresh (RAP) and High Resolution Rapid Refresh (HRRR) models which provide output data including gridded wind vectors and Convective Available Potential Energy (CAPE) data. Additional data available from NWP data sources (341) can include ground level and atmospheric data including temperature, humidity, dew point, total cloud cover, precipitation rate, and precipitation type.

Other Info data sources (347) are any sources of data that do not fall into any of the other data categories (e.g., 340, 341, 342, 344, 345, 346, and 348).

Map data sources (348) are providers of map and Geographic Information System (GIS) data, which includes geoinformation such as topographic and general reference map information related to the shape and geolocation of ground landmarks such as hills, mountains, shorelines, or the like, and may further provide data, e.g. geolocation of roadways, railways, airports, seaports, levies, retaining walls, dams, and any other manmade structures as may be required.

The system may also access and use external databases (349), including historical weather information and topographic maps or the like, which are accessed by the information collection and normalization server as appropriate. The information collected by the information collection and normalization server (310) may be processed further by the server, and then written to one or more system databases (e.g. system database 320), and the information is then shared with the other servers (330, 360, and 370) in the system, either directly or through the system database(s), for use in various weather related processing steps.

The system database (320) may include one or more individual databases (e.g. stored on each of the servers of the precipitation modeling and forecasting system (300)), and/or may include a centralized database server, including one or more logical databases, used to store data used to generate precipitation and precipitation forecast models and or maps. System database (320) may also include an external database server or database service such as a cloud-based data storage service. Individual databases of the system identified throughout this document are part of the system database (320) shown in FIG. 9.

The Offline/Background processing server (330) retrieves updates from the information collection and normalization server (310), from the system database (320), and from external databases (349). The offline/background processing server executes a series of background and scheduled programs that recalculate and/or update information related to the precipitation models and the underlying reference tables that these models rely upon. The processes performed by this server are characterized by their operation not being as time constrained as other processes used to generate a precipitation model. The data generated by these executing programs are written back to the systems database (320) and are shared with the other servers in the system either directly or through the database. Some examples of these programs include parsing data to identify potential data errors, such as missing information or data that is not usable for the intended purpose, e.g. data that is improperly formatted or that needs further processing such as normalizing, adding or removing metadata, scale conversion, changing quantization intervals, or generating a required data transform prior to being stored in the system database (320).

The modeling and prediction server (360) retrieves information from the system database (320), from the information collection and normalization server (310), and from other sources of prepared data provided by the other servers of the precipitation modeling and forecasting system (300) and executes programs to perform various complex and processor intensive modelling and prediction algorithms and data manipulations used to prepare a one or more precipitation forecasts which may be projected onto geographic maps. Information is obtained from the systems database (320), including any forecast data that was previously processed. The resulting forecast data are written back to the systems databases for later use and for sharing with the other servers of the precipitation modeling and forecasting system (300). Alternatively, one or more of the newly generated forecast data are sent directly to the information distribution and alerting server (370) for use in notifying a user.

The information distribution and alerting server (370) retrieves information from the system database (320), or from the modelling and prediction server (360) and processes the data received therefrom in order to merge forecast data with one or more customized mapping and or information templates e.g. also retrieved from the system database (320) or from public map sources and data sources (e.g. map data sources (348) and external databases (349)) in order to produce data outputs (380), e.g., used for weather-based information products that are distributed to end users. These weather-based information products may be produced on demand or on a scheduled basis.

Each exemplary server may be implemented as an individual computer system, a collection of computer systems, a collection of processors, or the like, either tightly or loosely clustered, a set of interacting computer systems that are not clustered, or other arrangement as deemed appropriate by those with skill in the art. Computer systems can be implemented using virtual or physical deployments, or by using a combination of these means. In some implementations, the servers may be physically located together, or they may be distributed in remote locations, such as in shared hosting facilities or in virtualized facilities (e.g. "the cloud"). Examples of this type of distributed shared hosting include Amazon's AWS services and Rackspace's Managed Cloud.

Figure 10:
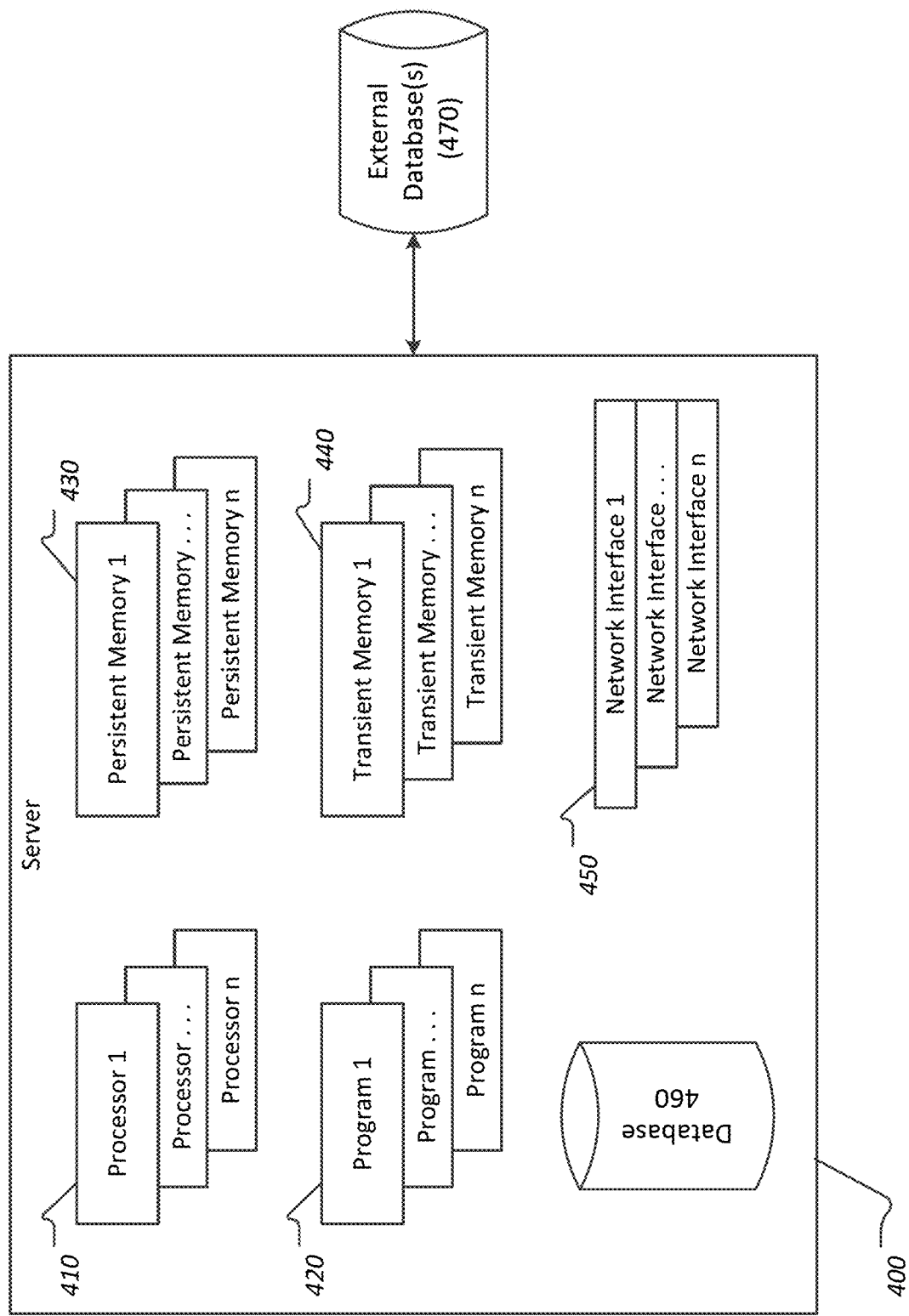
FIG. 10 depicts an illustrative exemplary computer server that supports the described system, according to an illustrative embodiment.

An exemplary computer server (400) is illustrated in FIG. 10. Each exemplary server (400) comprises one or more processors or data processing components (410), such as general purpose CPU type or specialty processors such as FPGA or GPU, operably connected to memories of both persistent (430) and/or transient (440) nature that are used to store information being processed by the system and to additionally store various program instructions (collectively referred to herein as "programs") (420) that are loaded and executed by the processors (410) in order to perform the process operations described herein. In some cases, such as FPGAs, programs comprise configuration information used to adapt the processor for particular purposes. Each of the processors is further operably connected to networking and communications interfaces (450) appropriate to the deployed configuration. Stored within persistent memories of the system may be one or more databases (460) used for the storage of information collected and/or calculated by the servers and read, processed, and written by the processors (410) under control of the program(s) (420). Database 460 is an internal instance of at least a portion of system database 320. A server may also be operably connected to an external database (470) via one or more network or other interfaces. Database 470 may be an instance of the system database (320) that is provided on another server, or may be a network connected database that is a commercial or other external source (349).

Persistent memories may include disk, PROM, EEPROM, flash storage, and similar technologies characterized by their ability to retain their contents between on/off power cycling of the system. Some persistent memories may take the form of a file system for the server, and may be used to store control and operating programs and information that defines the manner in which the server operates, including scheduling of background and foreground processes, as well as periodically performed processes. Persistent memories in the form of network attached storage (NAS) (storage that is accessible over a network interface) may also be used without departing from the scope of the disclosure. Transient memories may include Random Access Memory (RAM) and similar technologies characterized by the contents of the storage not being retained between on/off power cycling of the system.

One or more databases are stored within at least one persistent memory of the system and are considered as logical parts of the system database (320 of FIG. 9). These databases may include local file storage, where the file system comprises the data storage and indexing scheme, a relational database, such as those produced commercially by the Oracle Corporation, or MySQL, an object database, an object relational database, a NOSQL database such as the commercially provided MongoDB, or other database structures such as indexed record structures. The databases may be stored solely within a single persistent memory, or may be stored across one or more persistent memories, or may even be stored in persistent memories on different computers.

The system is illustrated with multiple logical databases for clarity. The system may be deployed using one or more physical databases implemented on one or more servers, for example, server 310, 330, 360, or 370, or may be implemented using clustering techniques so that parts of the data stored in the database is physically stored on two or more servers. In some implementations, the system database or one or more of the logical databases may be implemented on a remote device and accessed over a communications network.

Within system database 320, there are logical databases as listed in Table 8. These logical databases are omitted from the drawings for clarity.

TABLE 8

| | Logical Databases (within System Database) | |
|---|---|---|
| Number | Name | Description |
| 321 | Point-to-point microwave link attenuation database | Contains point-to-point microwave link raw attenuation data (520) and point-to-point microwave link processed attenuation data (620) |
| 351 | Cellular network link attenuation database | Contains cellular network raw attenuation data (351) and cellular network processed attenuation data (624) |
| 322 | Radar database | Contains radar raw data (521) and radar processed data (621) |
| 353 | NWP ground weather database | Contains NWP raw data (526) and NWP processed ground level data (626) |
| 329 | NWP atmospheric database | Contains NWP raw data (526) and NWP processed atmospheric data (629) |
| 323 | Ground weather station database | Contains ground weather station raw data (522) and ground weather station processed data (622) |
| 326 | Satellite image database | Contains satellite image raw data (527) and satellite image processed data (627) |
| 880 | Map database | Contains map raw data (528) and map processed data (628) |
| 324 | Other info database | Contains other info raw data (523) and other info processed data (623) |
| 327 | Point-to-point microwave precipitation database | Contains generated by point-to-point microwave link precipitation program (917) generated by point-to-point microwave precipitation program (917) |
| 354 | Cellular network precipitation database | Contains cellular network microwave precipitation intensity estimates (624) generated by cellular network microwave precipitation program (914) |
| 325 | Precipitation forecast database | Contains forecast precipitation estimates (628) generated by precipitation forecasting program (915) |
| 357 | Point-to-point microwave link topology database | Contains point-to-point network link endpoint locations, Tower ID's, transmitter and receiver characteristics, etc. |
| 358 | Cellular network link topology database | Contains cellular network link endpoint locations, endpoint IDs, transmitter and receiver characteristics, etc. |
| 359 | Imaging satellite characteristics database | Contains imaging satellite locations, equipment characteristics, etc. |

TABLE 8-continued

Logical Databases (within System Database)

| Number | Name | Description |
| --- | --- | --- |
| 391 | Location of interest database | Contains locations of interest information, e.g. flag locations, polygon location and boundary definitions, and configuration information associated with locations of interest. |
| 392 | Radar characteristics database | Contains ground weather data source location, elevation, signal characteristics, etc. |
| 393 | Transform and filter Accuracy Improvement database | Contains stored transforms and filters such as those listed in Table 5. Accuracy improvement details for precipitation sources by location. |

The network interfaces (450) are operated under control of the processor that they are connected to and the processing instructions contained within the control and operating programs associated with that processor as mentioned above. These interfaces provide a connection to wired and wireless networking products that operably connect the servers, data sources, and network services described herein.

The server supports one or more programs for providing server management information utilizing a web services interface or other dedicated management information reporting systems such as Simple Network Management Protocol (SNMP) for purposes of providing management information useful to report on the operation of the server. For purposes of clarity, each network interface (450) is illustrated as a separate interface, but may be implemented as one or more interfaces if desired.

6.3.3 Information Collection and Normalization Server

Figure 11:
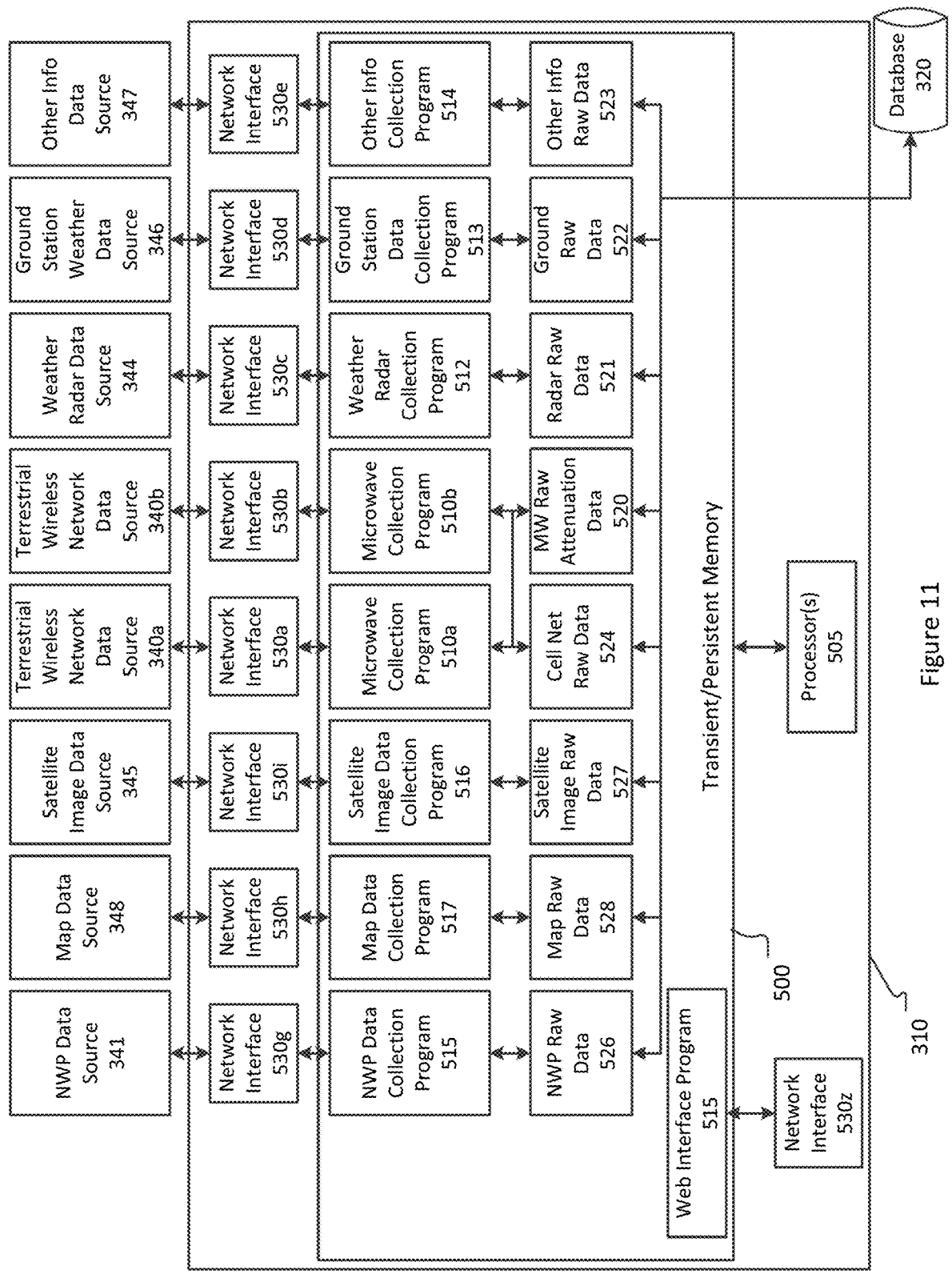
FIG. 11 depicts an illustrative Information Collection and Normalization Server of the described system, according to an illustrative embodiment.

An exemplary Information collection and normalization server (310), as illustrated in FIG. 11, comprises one or more computer systems similar in construction to the exemplary server illustrated in FIG. 10. This server collects, validates, sanitizes, normalizes, and stores information collected from a plurality of sensors and data sources, such as Terrestrial Wireless Network data sources (340*a*, 340*b*), Weather Radar data sources (344), ground weather data sources (346) such as rain gauges and local weather stations, or other providers of at least one aspect of weather information, into one or more logical databases (systems database 320, 321-329, 351-359, 880, 391-393) each logical database comprising specific types of collected information. The databases are represented as logically separate for clarity, but may be combined in physical implementations if desired. Information is processed by one or more processors (e.g. 505, processor 410 of FIG. 10) using information processing programs specific to the type of information being processed (510-517, 420 of FIG. 10) that are stored in or executed within one or more transient or persistent memory(ies) of the system (500, 430 and 440 of FIG. 10). These programs read externally-provided information over a network interface into the system (530*a*-530*i*, 530*z*), error check the data collected, transform the data by normalizing values and computing missing or dynamically determined values, and making the data (520-528) ready for use by other programs or servers of the system by storing the resulting data into one or more databases (systems database 320, 321-329, 351-359, 880, 391-393). Processes for ingesting a first type of information can be performed independently of other processes for ingesting other types of information. Alternatively, these processes may be performed at the same time without loss of functionality. Either approach may involve reading additional data that is simultaneously or previously acquired from the same or other sources, or may include other data stored in one or more databases of the system. Such simultaneously or previously acquired data (520-528) can be held in and accessed from transient or persistent memory (500, 430 and 440 of FIG. 10), external storage (e.g. systems database 320, 321-329, 351-359, 880, 391-393, database(s) 470 of FIG. 10), or any combination of these or other locations as deemed proper by those with skill in the art.

The information collection and normalization server supports one or more programs for providing server management information utilizing a web services interface or other dedicated management information reporting systems such as SNMP for purposes of providing management information useful to report on the operation of the server. For purposes of clarity, each network interface (e.g. 530*a*, 530*b* . . . 530*z*) is illustrated as a separate interface, but may be implemented as one or more interfaces if desired.

Each information source that is utilized by the information collection and normalization server typically has a dedicated interface program present on the information collection and normalization server that operates to (a) connect to the information sources over a network, (b) interact with the information source using well defined interfaces, and (c) retrieve selected data from the information source, (d) process that retrieved data in accordance with information source specific algorithms, and (e) write the processed data to one or more persistent memories of the system. Different programs are used depending upon the type of information source accessed, its defined interface, and the nature of the processing required. Details of the processing are covered later.

Generally, information sources may be classified on the type of the interfaces they provide. Some information sources may provide a plurality of interface types. In some implementations, the information source provides synchronous or asynchronous "push" notifications to the information collection and normalization server. In some implementations the information source batches and pushes data to information collection and normalization server. In either case, information is "pushed" to the information collection and normalization server as it becomes available at the information source, which then uses the interface program and, optionally, information contained in the notification to connect to the information source to obtain the updated information from it. The information is copied to the information collection and normalization server, where it is stored in a database and then pre-processed in accordance with the pre-processing appropriate to its data type.

In other implementations, the information source is periodically polled by the information collection and normalization server, which connects to the information source over the network in order to determine if new or updated information is available. A number of polling schemes are anticipated, common schemes include checking for a file in a specific directory, checking the date/time stamp on a status file, querying a service to determine status, etc. If updated information is identified, that information is copied to the information collection and normalization server, where it is stored in a database and then pre-processed in accordance with the pre-processing appropriate to its data type.

In still other implementations, the interface program connects to the information source and receives a network stream of information, typically sent to an open socket on a periodic basis. Types of data streams utilized may vary, and may include uni- and multi-cast streams, RSS feeds, and the like. In each case, as information is received by the information collection and normalization server, the information is stored in a database and then pre-processed in accordance with the pre-processing appropriate to its data type.

In yet other implementations, the information source is a query-based service such as a web service, and the interface program connects to that service and issues a query for information. The query results are returned to the interface program, where the results are stored in a database and then pre-processed in accordance with the pre-processing appropriate to its data type.

Some interface programs may use a combination or mixture of these techniques when interfacing to an information source. For example, an interface program may receive push notifications for a first type of information that is infrequently updated by an information source, while receiving a stream of data for frequently updated information.

Some anticipated interface programs include those that interface to one or more Terrestrial Wireless Network data sources and collect and return wireless network microwave link information, those programs that interface to one or more weather services such as weather radar information provided by NOAA, and interface programs that connect to weather data providers that provide current temperature, humidity, and wind speed information. Other interface programs may be provided as needed to access specific types of information needed by the system without departing from the scope of the disclosure.

6.3.4 Offline/Background Processing Server

Figure 12:
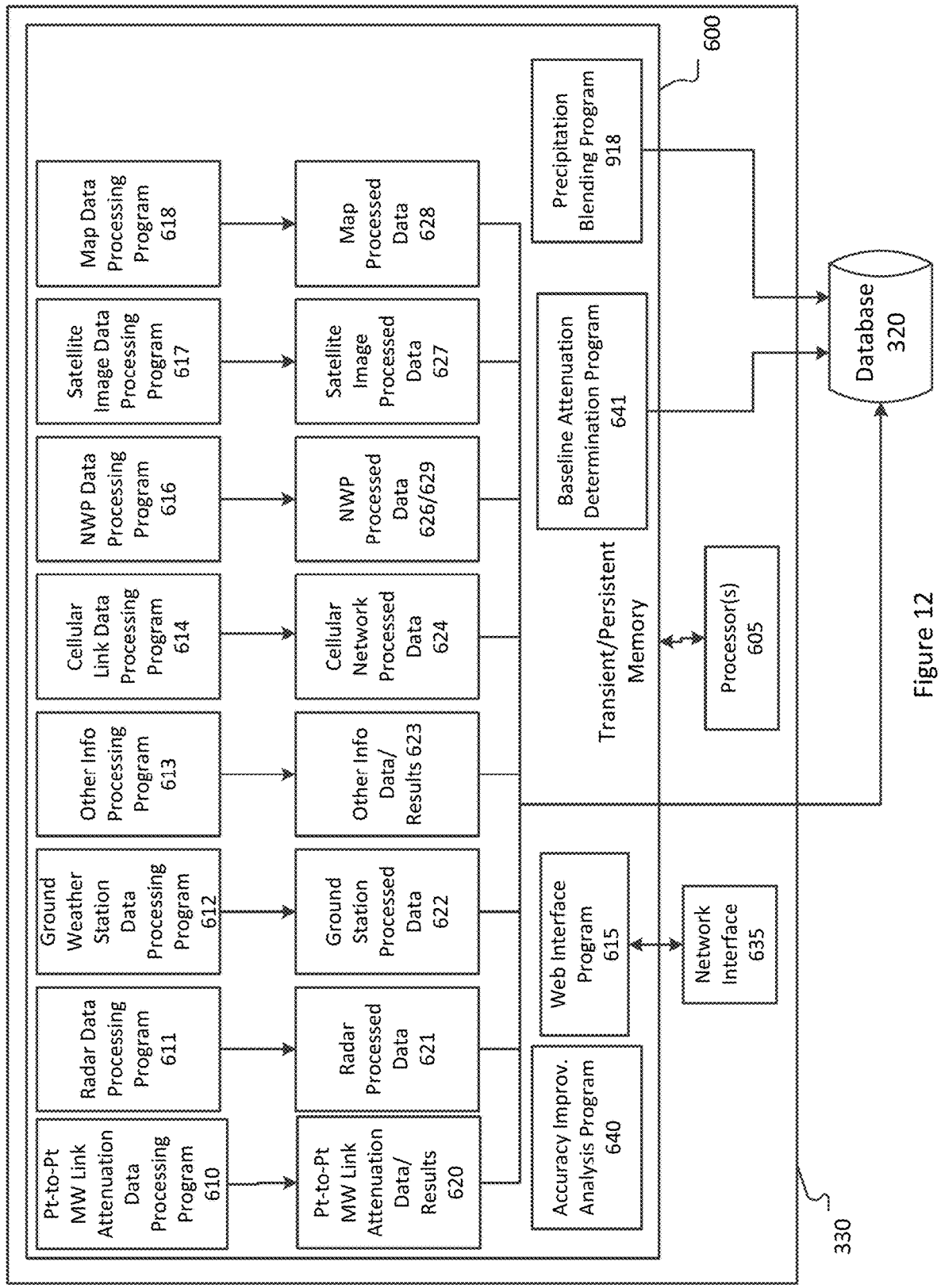
FIG. 12 depicts an illustrative Offline/Background Processing Server of the described system, according to an illustrative embodiment.

The Offline/background processing server (330) as illustrated in FIG. 12, comprises one or more computer systems similar to the exemplary server illustrated in FIG. 10. This server performs non-time-sensitive data processing on collected information, and periodic processing to update longer term models. Offline/background processing server (330) also pre-calculates and updates pre-calculated transforms for translating collected information into formats usable by other servers and programs of the system. Processing is carried out by one or more processors (605, 410 of FIG. 10) using programs, filters, and transforms specific to the type of information being processed (610-613, 420 of FIG. 10). The programs are stored in or executed in transient or persistent memory (600, 430 and 440 of FIG. 10), and carry out processing required on data stored in or executed in transient or persistent memory (430 and 440 of FIG. 10, also 500, 600, 700, and 800 of FIGS. 11-14) and/or system database (320).

The offline/background processing server (330) supports one or more programs for providing server management information utilizing a web services interface or other dedicated management information reporting systems such as SNMP for purposes of providing management information useful to report on the operation of the server. For purposes of clarity, each network interface is illustrated as a separate network interface (635), but may be implemented as one or more interfaces if desired.

The point-to-point microwave link attenuation data processing program (610) provides a series of non-time critical processing related to the microwave link information collected by the system and updates the underlying model maps for the microwave link coverage. These calculations are performed by several programs that are executed independently on the server on an as needed basis.

A first such independent process is the Accuracy Improvement Analysis Program (640). As previously noted, radar precipitation estimates have known limitations and often predict precipitation that does not reach the ground. Typical radar precipitation estimate accuracy can be as low as 50% when compared to ground truth precipitation measurements from rain gauges. Precipitation estimates based upon microwave link attenuation measurements from terrestrial microwave links have an accuracy of approximately 90%. Microwave links are close to the ground and provide diverse (spatially and temporally) measurement data but do not have complete coverage. The accuracy of precipitation forecasts is improved when microwave link attenuation precipitation estimates are combined with other precipitation estimates from different precipitation estimating systems using different data sources (and in particular, weather radar). Accuracy improvements in precipitation estimates can be estimated by correlating the estimates made using remote sensing systems (such as radar estimated precipitation rates) with the estimated precipitation data based upon terrestrial microwave link attenuation data. Combining microwave link precipitation estimates with radar precipitation estimates can improve the accuracy of the combined estimates by 40% as compared to radar precipitation estimates alone. The accuracy improvement estimates may be used to improve the accuracy of the subsequent precipitation modelling.

Known limiting factors for weather radar technologies are geographical (e.g. topography, urban coverage, climate); the accuracy improvement is attained by using precipitation intensity estimates from multiple input sources, e.g. using inputs from both point-to-point microwave link attenuation and radar data together. Besides a program that estimates the accuracy improvement from a variety of input sources and tracking the accuracy improvement as part of the forecast data, which is a function of the characteristics of the collected radar information (type of radar, distance from the location of interest, etc.), the following categories of terrain are of a specific interest:

Urban area

Mountains (slopes)

Dry weather (deserts)

In these types of areas, weather radar precipitation estimates have well known accuracy limitations, and there is a gap between the precipitation amounts estimated by the radar and the amount of precipitation amounts measured at ground level. In an embodiment, the accuracy improvement calculations of the present technology is based using terrain-type information collected by the system, radar-based precipitation estimates, and terrestrial microwave link coverage and identifying a pre-set improvement metric based upon the available precipitation estimates and their inherent accuracy under the data collection conditions (e.g. distance from the radar site, number of microwave links in the area) and the terrain types. The accuracy estimating program is executed on a periodic basis to update a database of accuracy improvement scores associated with specific blending techniques.

A second such independent process is the baseline attenuation determination program (641), which determines "clear air" attenuation adjustments for microwave links in order to calibrate the attenuation for each link based upon the power law equation and general weather conditions. The process obtains each link's attributes and then calculates the amount of attenuation that would normally be expected if there were no precipitation attenuation. These baseline attenuation may be determined, for example, by using link and local weather information such as link length, frequency, polarization, bandwidth, terrain characteristics and other potential effectors of multipath, and slowly changing weather phenomena such as temperature and humidity. Alternatively, the baseline attenuation may be based upon historical information about the link or by a combination of current and historic measurements. A baseline attenuation can be determined for each microwave link known to the system, written to one or more baseline attenuation transforms, and stored in a transform database. The baseline attenuation transforms can be applied to attenuation measurements, and the baseline attenuation subtracted from the reported measured attenuation, to isolate the measured attenuation due to precipitation. The result of this adjustment is that, before calibration, precipitation intensity values calculated based on the link's measured attenuation, and thus the precipitation accumulations calculated from these precipitation intensity values, may be different than those recorded by rain gauges. They have the same trends, but the amplitudes are different, and the zero level may vary. There are many reasons for this phenomenon, such as changes in the environmental conditions (humidity, fog, water vapor, and atmospheric gasses), steady water bodies (rivers and lakes) in the space between the antennas, and more, such as for example changing the modulation state of the system. The baseline calibration is performed periodically. Adjusting the reported attenuation for microwave links by the baseline amount reduces the effects of these non-precipitation factors, and helps the system to more accurately measure precipitation.

For example, the baseline attenuation value for one or more microwave links may be calculated using the following process:

A) Determine baseline "clear" weather conditions in the area of the microwave link by obtaining humidity data from one or more ground weather sources. This data may be current and/or historical in nature. Optionally, several relevant humidity readings may be obtained and averaged.

B) Calculate the baseline attenuation per unit distance (e.g. dB of attenuation per kilometer) in the area of the microwave link. Store this value in the system database as a baseline adjustment to be applied to new microwave link readings.

C) Repeat the calculation of baseline amounts for other microwave links identified by the system until a zero value is determined for each area near a microwave link.

The point-to-point microwave link attenuation data processing program (610) also performs consistency checking of microwave link information in the databases. For example, if a microwave link is added or removed from the database, but the precipitation models rely on microwave link information from that link, the link coverage models need to be updated for the new link topology. The consistency checking component performs these updates. Similarly, if a microwave link is not reporting link attenuation information for a period of time, the microwave link data processing program identifies this link for investigation, and optionally removes the link from the link topology models until the problem can be identified and fixed. Similarly, if a microwave link frequency or polarization changes, the link topology models are updated as necessary. These changes to the underlying link topology models are made on an as-needed basis.

The radar data processing program (611) reads radar information collected by the information collection and normalization server (310) and performs further processing on the radar information in order to make the information usable by the modelling programs. One example of this processing is the extraction of wind vectors from the collected radar data and the storing of these wind vectors in the system database for subsequent use by the modelling programs.

The ground weather processing program (612) reads information collected from external ground weather sources and makes this information available for modelling programs after performing data cleanup steps by storing the ground weather data in the system database.

6.3.5 Modeling and Prediction Server

Figure 13:
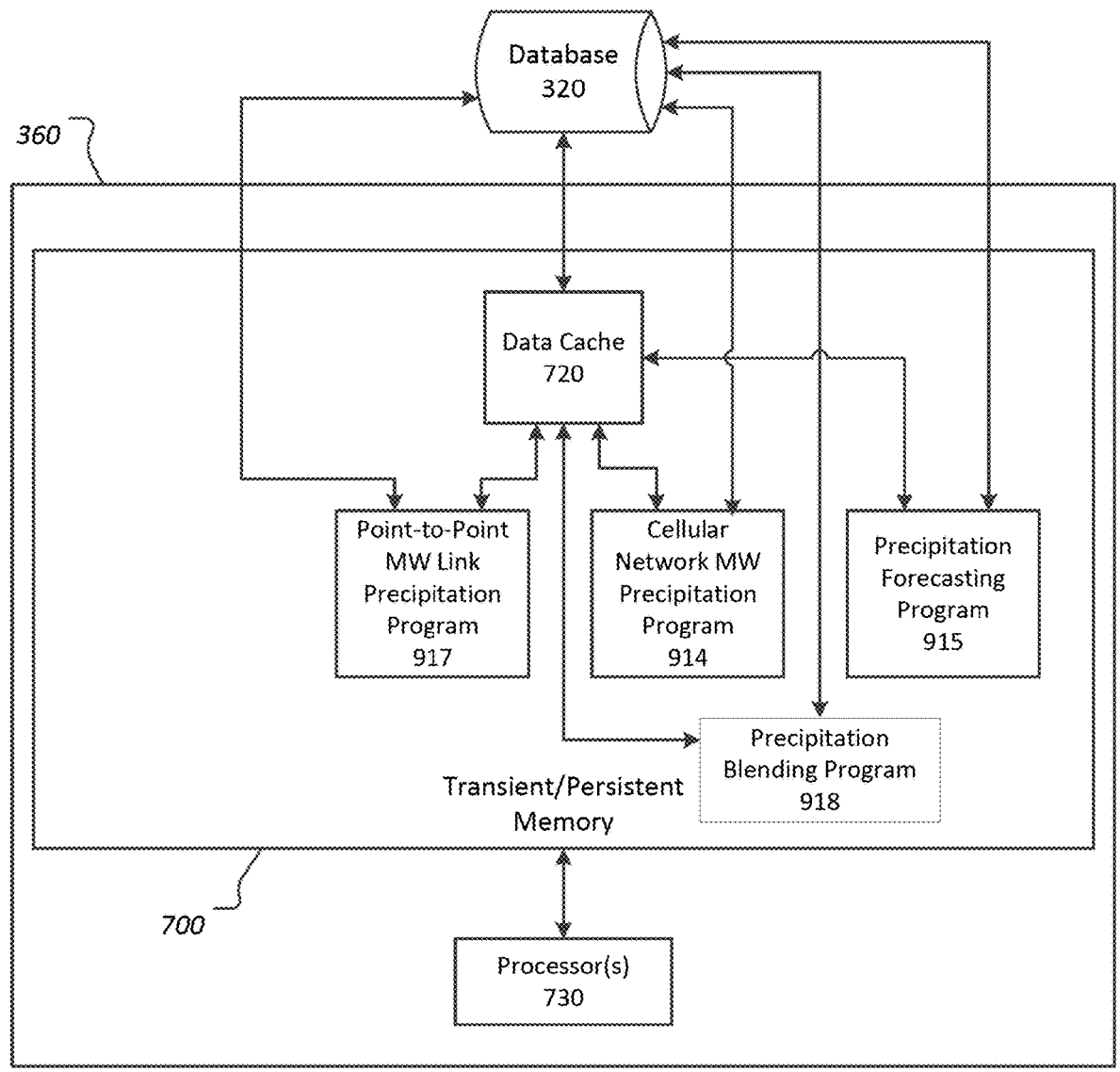
FIG. 13 depicts an illustrative Modelling and Prediction Server of the described system, according to an illustrative embodiment.

The Modeling and prediction server (360) as illustrated in FIG. 13, comprises one or more computer systems similar to the exemplary server illustrated in FIG. 10. This server performs calculations and modelling for real-time processing of information, calculations of weather models, and production of weather predictions using one or more processors (730) and programs including real time precipitation estimation programs (e.g. point-to-point MW link precipitation program (917), cellular network MW precipitation program (914) and prediction processing programs (e.g., precipitation forecasting program (915)) stored and executed from transient or persistent memory (700). The server programs read information from system database (320) including one or more databases listed in Table 8, for example processed microwave link measurements from attenuation databases (e.g., 321, 351), databases containing precipitation estimates (e.g., 327, 354, 356, 329, 322) and wind vector data source databases (e.g., 322) as required, and can cache (720) data in one or more transient or persistent memories (700) for use by programs that carry out real-time modeling and/or prediction processing. Processing results are written as updates to, or new information for one or more databases containing precipitation estimates (e.g., 327, 354, 356) and precipitation or other parameter forecasts (e.g., 325).

The modeling and prediction server supports one or more programs for providing server management information using a web services interface or other dedicated management information reporting system, such as SNMP, for purposes of providing management information useful to report on the operation of the server. The real time modelling program collects information previously stored in one or more of the system databases and calculates the current precipitation intensity values based upon the precipitation models. The current precipitation intensity values are stored back into a database for later use. Details on this program's operations are provided below.

The prediction processing program collects information previously stored in one or more of the system databases and calculates the prediction forecasts produced by the system. Details on this programs operation are provided below.

6.3.6 Information Distribution and Alerting Server

Figure 14:
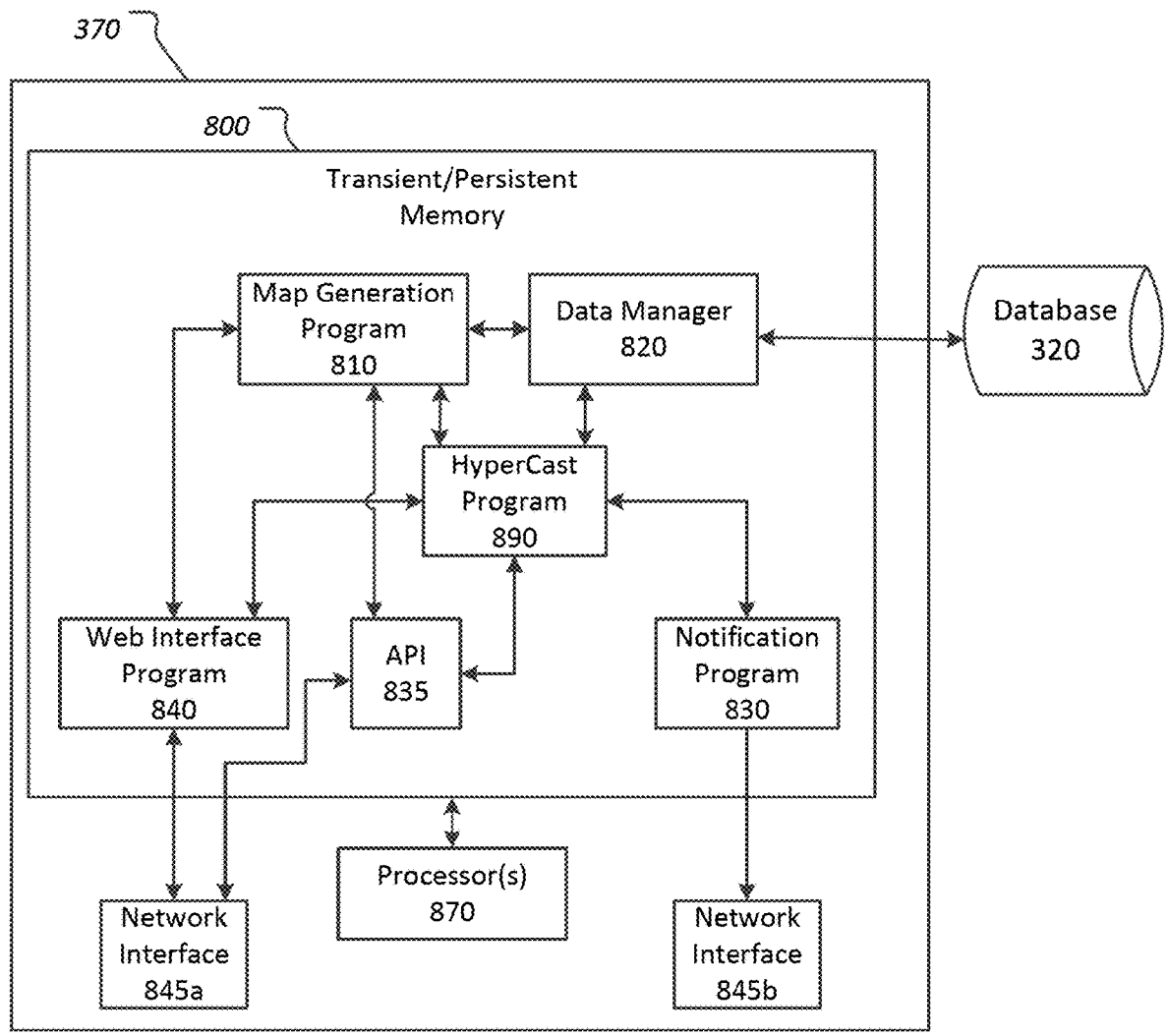
FIG. 14 depicts an illustrative Information Distribution and Alerting Server of the described system, according to an illustrative embodiment.

The information distribution and alerting server (370), as illustrated in FIG. 14, comprises one or more computer systems similar to the exemplary server illustrated in FIG.

10. This server employs one or more processors (870) using specialized programs (810, 820, 830, and 840) to package collected information together with calculated information generated by the system into information products and distribute them to users. Typically, this information is provided to users via a web service (840), a notification provider (830) or by other means (not shown). Packaging collected information into information products is performed by a map generation program (810) using data from map data sources (348) and map databases (880) and the results of forecast processing by other servers stored in one or more system databases (e.g. 325). In at least some implementations, data required by the map generation program (810) can be read from system database (320) including one or more databases listed in Table 8, and process the data to make its format usable with the map information as an independent layer of the map, such as for merging, normalizing, or reformatting, by a data manager program (820). Programs (810 and 820) can be stored in and executed from transient or persistent memory (800). This server is connected to the other servers, data sources, and services using traditional networking techniques and interfaces (845*a*, 845*b*).

The map database (880) can be a local database that stores map information used by the server to produce the information products. In an embodiment, the map database (880) may be an external database that is not part of the system database (320).

The information distribution and alerting server supports one or more programs for providing server management information utilizing a web services interface or other dedicated management information reporting systems such as SNMP for purposes of providing management information useful to report on the operation of the server. For purposes of clarity, each network interface is illustrated as a separate network interface (845*a*, 845*b*), but may be implemented as one or more interfaces if desired.

6.3.6.1 HyperCast Program

Referring again to FIG. 14, the information distribution and alerting server (370) includes a HyperCast program (890) which communicates with network interface programs such as web interface program (840) and API (835) in order to receive requests for data products from users and to produce displays and reports for delivery to users. User requests include time and weather parameter requests at specific locations of interest, and requests for notification or alerts based upon specific user-specified thresholds. User responses may include data sets comprising data from one or more system databases matching the request time and weather parameter request, screen displays, reports, and/or alerts and notifications based upon request parameters.

In an illustrative exemplary usage of the HyperCast program (890), a user connects to the web interface of the information distribution and alerting server (370) and is connected to an executing HyperCast program (890) instance. The user selects a first particular location of interest on the overview map. The HyperCast program (890) first displays a first set of user configured weather parameter data corresponding to the selected location on the timeline. The HyperCast program (890) then populates the timeline element with a second set of user configured weather parameter data, and places the timeline slider element at time slot zero (i.e. current time) and displays third set of user configured weather parameter data corresponding to the selected location of interest and time slot in the details display bar. If a user moves the timeline slider along the timeline to select a historic or future time slot, the HyperCast program (890) then updates the overview map display and the details display bar to display weather parameter data corresponding to the selected time slot. If a user selects, on the timeline, a first and a second time slot in order to select a time span for determining accumulated weather parameter data, such as precipitation amounts, the HyperCast program (890) retrieves precipitation data from one or more system databases corresponding to the data identified using the selected time span and cadence instance tile layers, and calculates a total precipitation for the selected time span as described below. The retrieved precipitation estimates can include weather parameter data associated with one or more cadence instance tile layers such as precipitation accuracy estimates. If a user toggles from overview map display to dashboard display, the system retrieves the user configured weather parameter data corresponding to each location of interest defined on the overview map and displays the configured weather parameter data corresponding to each location of interest in a separate mini status window.

The HyperCast program (890) operates by translating the user requests into database requests by mapping the user request to one or more elements in a systems database by referencing the logical data model described above that organizes the data in the database into cadence instances and tile layers as described above. This mapping is done by or in conjunction with the data manager program (820) to determine the appropriate sources of the data. The data manager program associates time-based requests to specific cadence instances, weather parameter requests to specific tile layers within the associated cadence instances, and location requests to specific tiles within the tile stacks of the associated tile layers of the selected cadence instances. The HyperCast program (890) further communicates with map generation program (810) or external mapping services in order to translate and display the responsive data on one or more maps. The HyperCast program (890) further communicates with notification program (830) and API (835) in order to provide data products generated by the HyperCast program (890) to users via network interface (845*b*).

A user interacts with the user interface overview map to select locations of interest by indicating points of interest by placing flag markers and drawing polygons in order to specify an area that is a location of interest. If the user request arrives from the API (835), the locations of interest are specified using either geospatial coordinates (e.g. latitude/longitude pair) or a polygon specification comprising a list of geospatial coordinates.

To generate an overview map, information distribution and alerting server (370) receives a user request, then associates the request with geographic map data from map database (880) and with the responsive data corresponding to the user-provided weather parameters from one or more cadence instance collection and forecast layer tile stacks. For example, the user-provided weather parameters may specify satellite image data from satellite database (326), radar data from radar database (322), and precipitation intensity estimates that were blended (calculated) from a combination of radar and microwave link-derived precipitation forecast estimates from the precipitation forecast database (325).

The data manager identifies data elements in the database that correspond to the user request by first determining which data elements to retrieve for each selected location of interest, requested parameters, and the time line element settings, and then retrieves that identified data from the system databases (collectively). This data is returned to the HyperCast program (890), which then calls a map generation program to map the retrieved data.

The map generation program or an external map generation service then creates a map display that includes the map data along with the currently configured user-defined parameters, such as current time precipitation intensity estimates, satellite data, and radar data. The map display can include color coding indicating parameters such as types of precipitation (rain, hail, sleet, snow) including precipitation intensity from blended precipitation tile layers, and accumulated water at every location on the map. The displayed accumulation can include real time, retrospect, and forecast accumulation. The map display can include fog, temperature, and humidity maps, precipitation intensity estimates, satellite data, and radar data.

Referring now to FIG. 15, a first exemplary illustrative graphic user interface (1000) of the HyperCast program (890) is shown. The user interface includes an overview map display (1110) of a user-selectable geographical region which can be scrolled by a user to a desired map location, and zoomed in or out by a user to a desired degree of display resolution. The overview map display initially displays one of: the user's default location, the user's current GPS or locator-technology-defined location, the last location the user selected, or another location selected on the map by the user.

FIG. 15 shows an exemplary timeline display element (1120), described in detail below, along with a plurality of points of interest, with two locations of interest magnified for illustrative effect. A first location of interest (1410) is a point represented by a flag icon, and a second location of interest (1520) is represented by a flag icon and defined by a location of interest, e.g. polygon surrounding an area of interest (1510). The exemplary overview map display also includes a details display bar (1130) that displays additional user-selected weather data corresponding to a location of interest at the time of the current selected time slot on the timeline element. One or more of the weather parameters, or information derived from the weather parameters listed in Table 4, can be configured to display in the details display bar (1130).

In an alternative embodiment (not shown), in addition to specifying locations of interest with a flag or a polygon, the user may enter a named place such as AT&T Stadium, a well-known place such as an airport, for example, Manchester Airport (MHT) in New Hampshire, a town name, a street address, geographic latitude/longitude (point or polygon corners), establishment name, or a previously stored location specification, and the system will determine the point(s) and/or polygon(s) associated with the identified location or locations. Once selected, the user may save, restore, and edit these location definitions using the HyperCast user interface (1000).

The user interface further permits a user to specify one or more data parameters to be displayed on the overview map or to be displayed associated with one or more specific location(s) of interest. Any cadence instance tile layer or set of cadence instances may be accessed by the HyperCast program (890).

In some embodiments, the user may use the user interface to define one or more additional layers of information that may be displayed, which may further configure aspects of the cadence instance and modelling and forecast server in order to cause the service to generate additional optional tile layers as part of pre- and post-processing stage operations.

6.3.6.2 Parameter Data Visualization and Display

When selecting one or more weather parameter data, the user may further select the manner in which the data is displayed from a list of preconfigured visualization and display techniques or they may configure the system to create a custom display element. The user may select from one or more of these preconfigured display techniques such as a graphical map overlay, as an icon, a bar graph, or other data representation. Additionally, any of these techniques may be colorized in accordance to the magnitude of the displayed value(s) or to the value's relationship to a predefined threshold. In some embodiments, a lookup table of parameter values to display colors may be used to determine the colors to be displayed.

Some data parameters are displayed on the map itself, either directly integrated as part of the map, or a map layer that is integrated with the map by the user interface. This technique is particularly appropriate for parameters that are not selected for a particular location of interest. Traditional map layers include cloud and satellite image data, or forecast data over a large area. With this method, a cadence instance tile layer is associated with the map and the tile data is directly displayed on the map. A second example is the mapping of a cadence instance tile layer to the map display where the data is transformed for visual representation. These techniques are particularly useful for parameters that comprise an entire cadence instance tile layer (e.g. are not selected for location of interest).

One example transform is the colorization of the data in respect to its data values. For example, each tile of a tile layer being mapped may be displayed as a color in accordance to its value, for example, a precipitation intensity of 0.0-0.1 in./hr. may be colored light green, 0.1-0.2 in./hr. can be colored dark green, 0.2-0.3 in./hr. colored yellow, 0.4-0.4 in./hr. colored orange, and a precipitation intensity of 0.4 and greater in./hr. is colored red.

In some exemplary embodiments, the user may select to display the selected weather parameter data as a pictogram which represents specific weather data. In the simplest form, the selected weather data is transformed to a particular pictogram image based upon its value. For example, precipitation type may be translated to a pictogram of the precipitation type (for example, a snow precipitation type is represented as a snowflake pictogram). A lookup table of permitted values to pictograms is used to map parameter values to the pictograms displayed. An example of this is illustrated as element (1128) of FIG. 16.

In other exemplary embodiments, an icon may be constructed as a bar graph made up of stacked blocks, each stacked block representing a magnitude value of a configured parameter. For example, one bar can represent precipitation intensity of 0.0-0.1 in./hr., 2 bars can represent 0.1-0.2 in./hr., 3 bars 0.2-0.3 in./hr., 4 bars 0.4-0.4 in./hr, and 5 bars can represent a precipitation intensity of 0.4 and greater in./hr. An example of this technique is illustrated as element 1124 of FIG. 16.

Other well-known information visualization techniques may be used in the construction of display icons in order to represent the configured parameter data as is understood in the art.

If an area-based location of interest is selected that is mapped to a plurality of tiles in a cadence instance tile layer, and the data representation is a single point or value, the weather parameter data is aggregated to a single value that can be displayed (or translated for display as described above). Multiple tiles in a single layer (and/or multiple tiles across layers) may be aggregated, for example, by averaging or selecting a maximum or minimum value from the tiles, or by summing the tile values. Thus, a location of interest may be represented by a maximum of the forecast precipitation rate, while a temperature may be represented by either the average of all of the forecast temperatures, and the accumulated precipitation is the precipitation intensity*the length of time associated with each aggregated tile layer (thus, if the cadence interval is 15 minutes, the accumulated precipitation amount for a tile is the precipitation intensity (in mm/hr)*0.25 hrs. Similarly, weather parameter data may be aggregated across a set of tile layers representing the same location of interest at different times.

For example, referring to the cadences described in FIG. 5, if the most recent cadence instance is $M_2$ and a user selects a total precipitation accumulation including 40 minutes in the future and 20 minutes in the past, data manager (820 of FIG. 14) retrieves precipitation estimates from $M_0F_0$, $M_1F_0$, $M_2F_0$, and from $M_2F_1$, and $M_2F_2$ forecast data. For each time slot, the system calculates a precipitation accumulation by multiplying each retrieved precipitation intensity by a corresponding time slot interval. If the time slot crosses one or more cadence instance tile layers (either across forecast cycle tile layers, or across cadence instances), the accumulation process calculates a total based upon the time-proportional weight of the data for each cadence instance. Thus, if a time slot is 25 minutes starting at T+10 minutes, and cadences are 15 minutes long, the calculation would use 5 minutes*the precipitation intensity from a first cadence tile layer, 10 minutes*the precipitation intensity from a second cadence instance's tile layer, and 10 minutes*the precipitation intensity from a third cadence instance's tile layer. The system then adds together the precipitation accumulations from each time slot to determine a total precipitation accumulation.

A combination of these techniques may also be used, for example, to produce bar graph icons that are also colorized on the basis of the data represented (or on the basis of other, related data).

When an area-based location of interest is selected, the displayed parameter data includes the most severe precipitation within the polygon (strongest intensity and type) and the average for the rest of the parameters (temperature, humidity, etc.).

The exemplary overview interface also includes a timeline display element (1120) that permits the user to select time-based aspects of the user interface. The timeline display element is shown in more detail in FIG. 16.

The timeline display element (1120) displays a time-ordered set of user-configured weather parameter representations corresponding to the currently selected location of interest. Each position in the ordered set is called a time slot. The timeline display element permits the user to interact with it to select a time slot. Each time slot corresponds to a point in time, for which it displays one or more representations of user-configured weather parameters. Time slots may be configured to include one or more types of parameter data and presentation mechanisms.

In an exemplary embodiment, a set of user-configured weather parameter representations are arranged plotted on a Y axis, one set of parameter representations per time slot, and the time slots are plotted in ascending time order along an X axis. Each time slot on the X axis represents a unit of time represented by the icons arranged on the Y axis. Other arrangements may be considered without deviating from the intent of the interface.

In a particular exemplary embodiment illustrated in FIG. 16, each time slot is configured to have two parameter representations arranged vertically, a precipitation type pictogram 1128), and a stacked bar graph of precipitation intensity (1124). Each time slot can be colored to represent time, for example red representing current time, orange representing a historic time point, and purple representing a future time point. In another example, each time slot can be colored to represent a precipitation type, category or intensity The timeline display element (1120) may further include a time selection element (1122). This time selection element (1122) may be any known selection mechanism, ranging from a UI "click", a slider, or a check box. In the example embodiment depicted in FIG. 16, the selection element used is a slider. The time selection component is used to select a point in time for which to display weather parameter data. The selected point in time corresponding to the selected time slot is associated with one or more cadence instance(s) and the selected weather parameter(s) are obtained from one of the system databases corresponding to the tile layers of those cadence instances and is displayed in the user interface. When the time selection component changes the selection from a first time slot to a second time slot, the weather display elements, such as the overview map and detail display bar are updated to change the currently displayed weather parameter data to new weather parameter data corresponding to the newly selected time slot.

The timeline display element (1120) also includes an optional play button (1126). When the play button is selected, the system automatically sequentially selects each time slot of the selected time range. This has the effect of displaying the weather parameter data for each of the sequentially selected time slot in succession. The system may use well known graphical techniques to smoothly "morph" subsequent sets of parameter data.

The time slots presented on the timeline are user-configurable, both with respect to the presentation method (e.g. bar graph, pictogram) and to the parameters being represented. The user-configurable icons can represent any parameter available in a cadence instance, and specifically may include a mix of real time, historic, and forecast data associated with a selected timeframe and location.

In an exemplary method of configuring the timeline, a user selects the one or more weather parameters to be displayed on the time line from a list of weather parameters present in one or more associated cadence instances, and any of the visualization techniques described above. For example, a user can select, for display on the timeline, a weather parameter such as precipitation rate, precipitation type, or even extended weather parameter fields generated by collection and forecast extensions. The user may further select the desired display representation, including, for example, stacked bar graphs, pictograms, and colorized versions of these representations.

A user can also select a temporal zoom level (e.g. temporal display range) for display on the timeline display element (1120). For example, a user can select a temporal display range that includes data covering a time period spanning 6 hours in the past and 6 hours in the future from a specified point in time. The specified point in time defaults to the current time, but may be set by the user to any desired time. The user may configure the display to select a different time period, for example, +/−3 hour or +/−90 minutes. Alternatively, a user can select an asymmetric time display, for example 3 hours in the past and 6 hours in the future or 90 minutes in the past and 180 minutes in the future. The time limits of the display range selected by the user are associated with a starting and ending cadence instance.

The temporal display range defines the amount of time each slot on the timeline display element represents. For example, if a user selects a temporal zoom level of +/−90 minutes, each time slot represents an average of 3.6 minutes, an average of 7.2 minutes if a user selects a temporal zoom level of +/−3 hours, and an average of 14.4 minutes if a user selects a temporal zoom level of +/−6 hours.

If the time slot temporal range does not align precisely to the cadence instance tile stack time intervals, the presented data corresponding to the tile stacks spanned by the time slot temporal range is taken and combined to produce the presented parameter value. This combination may be performed, for example, by selecting min/max values across the corresponding tile stacks, averaging or weighted averaging the parameter values from the corresponding tile stacks, or by summing or weighted summing the parameter values from the corresponding tile stacks.

Referring now to FIG. 17, the figure illustrates how a user can specify a start time slot (1610) and an end time slot (1620) on the timeline in order to calculate an accumulated weather parameter. Using the timestamps of the start and end points selected, the system calculates the accumulated weather parameter data as described above. The accumulated precipitation is displayed in any location that any other weather parameter may be displayed.

The HyperCast program (890) includes an alerts and notifications module which allows a user to define and enable alerts corresponding to one or more selected locations. A user can create an alert by selecting one or more locations of interest and creating an alert rule that includes conditions that will trigger the alert. An alert rule can include one or more weather parameters and one or more threshold values that when reached will trigger the alert and a resultant notification to the user. An accumulation alert can include, for example, a specification of a threshold magnitude of snow accumulation or total water accumulation at a location of interest. The accumulation alert will be triggered when the total accumulation at a selected location exceeds the threshold amount. When the alert is triggered one or more notification actions, examples of which are listed in Table 9, are initiated. An alert can be configured to notify a user that a threshold is forecast to be reached or exceeded before the specified threshold is reached. For example, an alert can be configured to notify a user that, based on forecast data, a threshold will be crossed in one, two, or three hours. Alerts can be displayed on a HyperCast display and can be sent to a user using a message delivery format such as SMS or email.

TABLE 9

Alert Notifications

| Notification action | Notes |
|---|---|
| Notification email | Can include email to a specified individual or group and a broadcast email to multiple recipients |
| Notification SMS | Can include SMS to a specified individual or group and a broadcast SMS to multiple recipients |
| Display on User Interface | Notification can be displayed at a location of interest on or over a map (1110), on details display bar (1130), in a popup window (not shown), or on a timeline display element (1120) |
| Execute a specified program or report generation | |
| Perform a user specified action | |

If a user creates an alert, the information distribution and alerting server (370) initiates a monitoring function that retrieves parameter values defined by the alert and periodically checks parameter values against thresholds and conditional statements defined by the alert. If the information distribution and alerting server (370) determines a condition for triggering an alert, the information distribution and alerting server (370) issues a notification to a notified entity such as a user or service (e.g. airport, shipping service, emergency service, smart city planning service) defined by the alert.

The HyperCast program (890) includes a My Places Dashboard display (2000), as depicted in FIG. 18, which can be configured to display individual mini status windows (1710, 1720, 1730, and 1740) for each of or for a subset of selected locations of interest. Each mini status window corresponds to a user-selected single location of interest (1711). The user can select weather parameters determining the type of display, as depicted in (1712) such as, for example, accumulated precipitation or precipitation intensity. A mini status window includes a display of numerical values of measurement data for user selected weather parameters (1713) such as, for example, forecast precipitation intensity. The mini status window includes a plot of the selected weather parameter magnitude on a timeline (1714). A user can configure the weather parameters of the timeline (1718) such as, for example, whether the display depicts 60 minutes, 3 hours, or 6 hours of the timeline. The mini status window includes display of additional weather parameters as numerical data and/or represented by graphic icons (1715) such as, for example, temperature, humidity, wind speed, barometric pressure, etc. The mini status window includes a display of alerts (1716) and National Weather Service Warnings (1717) corresponding to one or more locations of interest.

As mentioned above, the HyperCast program (890) interfaces to an application program interface (API) (835) which is configured to enable a user to request and receive weather parameter data, such as for example precipitation intensity data, in raw numerical, non-visualized, format. Data can include historic data based to an earliest point in time stored in a system database (320), real-time (e.g. current collection data), and forecast data. A user can use the API (835) to request, for example, data files that include historic and forecast precipitation accumulation data for a specified location of interest. The data can be used in external applications and integrated into other datasets. The API (835) enables users to "call" the information distribution and alerting server (370) of the disclosed technology and ask for specific data outputs according to their needs. The API (835) formats the retrieved data using a default format or a format specified by an API data request, for example in a CSV or XML format, and delivers the data to the requesting user or to another entity that may be specified by the request.

6.3.7 Microwave Link Data Processing

FIGS. 19A and 19B are high level process flowcharts for an exemplary information flow through the system. Microwave link data obtained from terrestrial wireless network data sources (340a, 340b) and weather-related data obtained from other sources such as a weather radar data source (344), ground weather data source (346), and NWP data source (341) are processed differently. FIGS. 19A and 19B illustrate how information can come into the system from different sources, go through different handling processes, and then be combined as part of a model in order to produce one or more information sets.

Microwave link data is acquired by the Information Collection and Normalization Server (310) from at least one Terrestrial Wireless Network data source (340a, 340b) (step 9005). Microwave link data can include point-to-point microwave link data, as described in section 6.4.1, and static and dynamic link data, as described in section 6.4.2. There can be a plurality of Terrestrial Wireless Network data sources, each providing information asynchronously to the system. The microwave link data is aggregated and stored (step 9010), into a database as part of the data collection process The processes are described in Section 6.4, 6.4.1, 6.4.2 and for FIGS. 20, 21, and 22.

The resulting set of microwave link data is processed by the Information Collection and Normalization Server (310), where the information is normalized, error checked, and made available to the system (step 9015). The processes are described in Section 6.4.1, FIG. 21 and Section 6.4.2, FIG. 22.

The resulting "clean" microwave link data from step 9015 is then further processed by the Offline/Background Processing Server (330) through the steps of Resolution Analysis (step 9025), Accuracy Analysis (step 9030) (as described in section 6.5.1.1 and 6.3.4), and production of a Coverage Map (step 9035) (as described in Section 6.5.1.2 and 6.6).

The resulting data from steps 9025, 9030, and 9035 is saved to the system database 320 (as described in Section 4.5) and made available for use by the Real Time Mapping process of the Modeling and Prediction Server (360) (step 9040). The microwave link data is further pre-processed to make it ready for mapping (step 9045). The microwave link data is then calibrated (step 9080), and used to produce a 2D map (for microwave links only) (step 9085).

The real-time mapping process of the Modeling and Prediction Server (360) may also produce an integrated 3D map (step 9075) using both the pre-processed results from steps 9045, 9060, and the 2D map of microwave links produced in step 9085. The 2D Map Link data (step 9085) and the Integrated 3D Map data (step 9075) are made available for further processing by storing them in the system database (step 9090).

The 2D Map Link data (step 9085) is also made available for use by the Nowcasting process (step 9095) (described in sections 6.7, 6.7.1; FIG. 34) of the Modeling and Prediction Server (360), where the data is used to produce the Nowcasting Model (step 9096). The Nowcasting Model results (step 9096) are also made available for further use and distribution by storing the calculated model data in the system database (step 9097) (as described in Section 4.3.3, FIG. 13). The Information Distribution and Alerting Server (370) uses the results of steps 9090 and 9097 by obtaining the current data from the system database and using that information to produce one or more data outputs (380) (step 9099), e.g., used in one or more Forecast-Based Information Products.

Weather Data Process

Weather data, including sensor and radar information, is obtained by the Information Collection and Normalization Server (310) from one or more data sources (step 9050) (as described in sections 6.4.3 and 6.4.4, FIGS. 23 and 24). The collected data is then cleaned to remove erroneous values, aggregated and stored in the system database (320) using data type dependent processes (step 9055) (also as described in sections 6.4.3 and 6.4.4, FIGS. 23 and 24), and the resulting information is further error checked, adjusted (e.g. zero-level adjustments) and enhanced by the Offline/Background Processing Server (330), and made available to the system by saving the adjusted data into the system database (step 9060) (as described in Section 6.3.2, FIG. 12).

The resulting data is thus made available for use by the Nowcasting process (step 9065) (as described in sections 6.7 and 6.7.1, FIG. 34) and the Real-Time Mapping process (step 9070).

6.4 Information Collection and Preprocessing Processes

Referring to FIG. 20, an exemplary method (10000) for receiving, pre-processing, and storing data begins with a collection program receiving data (10010) from a data source. The information collection and normalization server (310) receives data from multiple sources, including point-to-point and cellular microwave link measurement data from Terrestrial Wireless Network data sources (340), data from weather radar data sources (344), topographical map data from map data source (348), ground weather data sources (346), and other data sources including a map data source (348). The information collection and normalization server (310) programs pre-process the received data, adding missing information from reference information stored in the system databases, and performing calculations that augment the collected information with additional data derived from the collected data (e.g. link endpoint and length data) and then stores the pre-processed data in one or more databases, for example in one or more of system databases (320).

The information collection and normalization server (310) maintains microwave link data from each data source and can receive data from each source continuously or periodically by one or more methods by collecting and pre-processing the information asynchronously from the primary forecasting calculations. For example, the information collection and normalization-server (310) receives a data file containing measurement data from a data source using a push service wherein the data source sends data periodically or when a threshold amount of data has been collected. Alternatively or in addition to receiving pushed data, the information collection and normalization server (310) issues a pull command to a data source, for example periodically or when measurement data is required and receive a data file from the data source in response to the pull command. In another example, the information collection and normalization server (310) receives, from a data source, a notification that a file containing data is ready or a notification that data has changed and, in response, issues a pull command to retrieve the data. In a further example, the information collection and normalization server (310) includes or has access to an application programming interface (API (835)) that enables the information collection and normalization server (310) to interact with and receive data from a data source.

Data received by the information collection and normalization server (310) from data sources includes measurement data, for example, microwave or radio frequency send and receive signal strength data, weather radar data, rain gauge measurement data, etc. Data received by the information collection and normalization server (310) can further include ancillary data and metadata such as, for example, data source location, signal polarization, etc. useful for pre-processing measurement data, as will be discussed in further detail below. The information collection and normalization server (310) can employ a plurality of methods to receive data from data sources, for a file containing measurement is received from a data source using a push server and the information collection and normalization server (310) issues a pull command to retrieve ancillary data from the data source.

The information collection and normalization server (310) parses (10020) received data in order to extract measurement data, metadata, and ancillary data. Parsed data from multiple data suppliers, for example wireless link data from two or more Terrestrial Wireless Network data sources (e.g., 340a, 340b), is assigned to the current cadence instance Mi (10030). Data received from multiple sources may be sampled at different periodicity. All data collected from a source within a cadence collection interval of a cadence instance Mi is assigned to the cadence instance and stored with other data of the same type collected during the collection interval.

In an exemplary implementation of standardization, the information collection and normalization server (310) collects information from a first Terrestrial Wireless Network data source that saves the data every 1 min and a second Terrestrial Wireless Network data source that saves the data every 5 mins. If a collection interval equals 10 minutes, a cadence instance Mi will collect up to 10 data sets from the first Terrestrial Wireless Network data source and up to 2 data sets from the second Terrestrial Wireless Network data source. At the end of the collection interval, the information collection and normalization server (310) standardizes measurement data from the two Terrestrial Wireless Network data sources to the length of the collection interval. At step (10032), collected data is stored to as raw data to one or more system databases (320) of appropriate type for the data being stored.

An information collection and normalization server (310) performs pre-processing (10035) of raw data, including associating ancillary and metadata with measurement data and performs calculations to determine additional ancillary data. For example, microwave link endpoint locations and link length data can be retrieved (if previously calculated) or calculated by the program based upon collected link data, and the retrieved or calculated information associated with measured link data prior to storing in the system database. Pre-processing (10035) can also include further data normalization such as reconciling disparate data reporting formats from different data providers. For example a first data supplier reports measurement data as a calculated average value over a time period, a second data supplier reports minimum and maximum values over the time period, and a third data provider reports instantaneous measurement values that are recorded periodically over the time period. At step (10040), the information collection and normalization server (310) stores parsed, standardized, and pre-processed data to one or more system databases (320) of appropriate type for the data being stored.

The information collection and normalization server (310) optionally performs additional pre-processing calculations on data to adjust the retrieved data to account for baseline conditions (10050). For example, pre-computed baseline adjustments related to microwave link attenuation may be applied to the collected microwave link data prior to storing in the system database.

The above general process differs slightly depending upon whether the microwave links are part of a point-to-point microwave network (which is characterized by having all of its microwave links having location-fixed endpoints, sometimes called backhaul networks), or if the microwave links are between an eNB and user equipment (UE) of a cellular wireless network, which is characterized having microwave links for which at least one endpoint is not static (e.g. the endpoint is mobile). At step (10050) preprocessed and baselined data is stored as processed data to one or more system databases (320) of appropriate type for the data being stored.

6.4.1 Point-To-Point Microwave Link Data Collection Process

FIG. 21 illustrates an exemplary method (11000) for receiving and storing point-to-point microwave link data from Terrestrial Wireless Network data sources (340a, 340b). Information collection and normalization server (310) receives data which include point-to-point microwave link data (11010) from multiple point-to-point microwave links. Alternatively, the information collection and normalization server (310) can receive continuously updated reports of microwave link measurements. In some embodiments, the information collection and normalization server (310) may receive reports that include link status changes and wireless network topology changes, or may receive reports that include aggregate measurements over a period of time, for example over 15 minute, 30 minute, or one hour intervals. Data is typically received as a CSV file from each Terrestrial Wireless Network Data source. Received data includes TSL and RSL measurements for each of the multiple microwave links. These microwave links represent point-to-point microwave links that are not managed by an eNB, such as, for example, the point-to-point microwave link of wireless network (200) shown in FIG. 2 (links 220a-b, 220b-a, 220b-c, 220a-c, 282a, 282b, and 282c).

Microwave data collection program (510a or 510b) parses (11020) received data to extract TSL and RSL measurement data, metadata, and ancillary data. Parsed data includes at least TSL and RSL measurements indexed with link endpoint identification. Parsed data from Terrestrial Wireless Network data sources (e.g., 340a, 340b) is then associated with the current cadence instance Mi (11030), as previously discussed. Parsed microwave link data is stored as point-to-point microwave link raw attenuation data (520) in point-to-point microwave link attenuation database (321)

Received data is pre-processed (11035) by point-to-point microwave link attenuation data processing program (610) to produce pre-processed microwave link data to associate the measurement data with any missing metadata and/or ancillary data including antenna mast IDs, antenna IDs, antenna mast locations including latitude and longitude, and microwave signal transmit frequency, bandwidth, and polarization. During pre-processing, any required ancillary data or metadata that was not included in data received from Terrestrial Wireless Network data sources (340a, 340b) is requested from the providers by the information collection and normalization server (310), or is obtained from one or more system databases (320). During pre-processing (11035), point-to-point microwave link attenuation data processing program (610) calculates any missing link lengths using tower location information and associates the calculated link lengths with link measurement data. Point-to-point microwave link attenuation data processing program (610) also normalizes measurement data to reconcile disparate TSL and RSL measurement reporting formats used by the data suppliers, as previously discussed.

At step (11040) the received data is also error checked by point-to-point microwave link attenuation data processing program (610) to remove invalid or inconsistent information, and to filter link information that is not usable in subsequent processing. For example, point-to-point microwave link attenuation data processing program (610) retrieves point-to-point microwave link frequency filter from the transform and filter database (393) and uses the filter to filter out measurements from links that are transmitting on a frequency channel that is not a microwave channel, for example the point-to-point microwave link frequency filter is used to filter out links that use a transmit frequency less than 5 GHz. The received link data is checked for received signal strength being below a specified threshold, and if the received link data is below this threshold, the received link data is discarded. Point-to-point microwave link attenuation data processing program (610) retrieves point-to-point microwave link received signal strength filter from the transform and filter database (393) and uses the filter to filter out measurements with RSL measurements below a specified signal strength. This filter removes inactive links and links for which the signal strength was not properly measured. In another example, missing data or data including received signal strength below the specified threshold can be replaced with historical data. An expiration time period is associated with historical data and data that is older than a specified time interval, for example, data that is older than 5 minutes or data that is older than ten minutes, is considered expired and is not used to substitute missing data.

Point-to-point microwave link attenuation data processing program (610) optionally performs additional pre-processing to isolate non-baseline attenuation in link measurement data. At step (11050) point-to-point microwave link attenuation data processing program (610) loads a point-to-point microwave link baseline transform associated with each link and precomputed by Offline/background processing server (330), as described in section 6.3.2. Point-to-point microwave link attenuation data processing program (610) then adjusts each link's measured attenuation by this baseline value (11060) to determine non-baseline attenuation which is a measure of attenuation caused by precipitation or other interference. Non-baseline attenuation link data is compared to an attenuation threshold and non-baseline attenuation data is below this attenuation threshold, the received link data is discarded. The point-to-point microwave link baseline transform removes inactive links with insufficient attenuation to be useful for predicting precipitation intensity values. Filtered and transformed data is stored as point-to-point microwave link processed attenuation data (620) in point-to-point microwave link attenuation database (321).

The parsed and pre-processed microwave link data and associated metadata and ancillary data are stored (11060) by point-to-point microwave link attenuation data processing program (610) to a database such as point-to-point microwave link attenuation database (321). Network topology information can be stored in point-to-point microwave link topology database (357).

6.4.2 Cellular Microwave Link Data Provider Data Collection Process

FIG. 22 illustrates an exemplary method (12000) for receiving and storing cellular microwave link measurement data from cellular Terrestrial Wireless Network data sources (e.g. 340a, 340b). Microwave data collection program (510a, or 510b) receives cellular network dynamic microwave link data (12010) which can include batch information provided as one or more data files, streaming wireless link information, or other forms of continuously or periodically updated link measurement data. Unlike the point-to-point microwave links described in FIG. 22, the wireless links of a cellular Terrestrial Wireless Network typically do not have both link endpoints fixed geographically, which means that both the link length and associated length-based baseline attenuation are not known and must be computed for each data sample with useful attenuation data. Link lengths and baseline attenuation can be calculated by offline/background processing server (330) after filtering out non-useful measurements or, alternatively, as described in section 6.6.1, below, link length and other link characteristics for many common link endpoints can be precomputed, saved to a transform, which is applied to UEs located near the common link endpoints. Data is typically received as a CSV file from each Terrestrial Wireless Network Data source. The received data each include one or more reports of data collected about a wireless radio network (e.g. 200) which can include measurements corresponding to data and non-data signaling within the network and measurements of non-network signals. Received data can include signal strength measurement such as reference signal received strength (RSRP) measurements made by user equipment (UE) devices. Measurement data can also include RSSI measurements made by UEs and base stations (210a, 210b, 210c). RSRP and RSSI measurements can each correspond to an active cellular microwave link (240a-240h, 255a, and 255b). RSRP measurement can include measurements made by UEs of reference signals from non-serving eNB antennas and from serving eNB antennas when an active data link is not in place between the UE and the serving antenna of the eNB.

Microwave data collection program (510a or 510b) parses (12020) the received data to extract measurement data including RSRP and RSSI measurements, metadata, and ancillary data. The parsed data includes at least RSRP and RSSI measurements indexed with link endpoints (e.g. a specific eNB antenna and a UE identifier). Parsed data from Terrestrial Wireless Network data sources (e.g., 340a, 340b) is associated with the current cadence instance Mi (12030), as previously discussed, and stored as cellular network raw attenuation data (524) in cellular network link attenuation database (351).

The cellular link raw attenuation data (524) is then pre-processed (12035) by cellular link attenuation data processing program (614) to associate the measurement data with any missing metadata and ancillary data. Metadata and ancillary data related to antennas, antenna masts (210a, 210b, 210c), and eNBs includes eNB IDs, antenna IDs, antenna mast locations including latitude and longitude and antenna height, and reference and data signal transmit parameters including antenna configuration, signal strength, frequency, bandwidth, and modulation. Metadata and ancillary data related to UEs includes device ID, location, for example GPS coordinates, associated with each measurement or transmission data point, and transmit parameters including signal strength, frequency, and bandwidth. Data associated with UEs can also include location-related details such as indoors versus outdoors, urban versus rural setting, ground cover, proximity to water bodies, and height. During pre-processing, any required ancillary data or metadata that was not included in data received by the information collection and normalization server (310) is retrieved, either by separately querying the data source, or by looking the missing data up in a system database.

During pre-processing (12035), cellular link attenuation data processing program (614) calculates link lengths using tower and UE location at time of measurement and associates the calculated link lengths with link measurement data. UE location information can be calculated or refined using known techniques such as triangulation using signaling between the UE and multiple eNB antennas, or by obtaining the GPS coordinates of the UE. An alternative method for estimating UE location and link characteristics by mapping cellular links to pre-calculated pro-forma links is described in section 6.6.1, below.

Cellular link attenuation data processing program (614) also normalizes measurement data to reconcile disparate RSSI and RSRP measurement reporting formats used by the data suppliers, as previously discussed. For example, in LTE networking RSRP measurement data is reported as an integer value representing a range of measurement values (e.g. $1=-140<=RSRP<-139$) which the information collection and normalization server (310) updates with dB signal level values for use in subsequent calculations.

At step (12040) the received data is also error checked to remove invalid or inconsistent information, and to filter link information that is not usable in subsequent processing. Cellular link attenuation data processing program (614) retrieves cellular network frequency filter and used the frequency filter to compare the wireless frequency of each link is compared against a pre-determined threshold, and if the link's frequency is below that specified threshold, the link information is discarded. The threshold is typically one of 1 GHz, 2.5 Ghz, or 5 GHz, but may be chosen to be any value desired. This removes eNB to UE links that use wireless frequencies that are not attenuated by weather conditions (and are thus not useful). The removal of these non-useful links reduces the computing complexity in subsequent modeling steps.

In another example, cellular link attenuation data processing program (614) retrieves cellular network received signal strength filter and uses the filter to filter out measurement data with attenuation data magnitude below a specified threshold. If the received link data is below this threshold, the received link data is discarded. This filter removes inactive links and links for which the signal strength was not properly measured.

Missing data or data including received signal strength below the specified threshold can be replaced with historical data. An expiration time period is associated with historical data and data that is older than a specified time interval, for example data that is older than five minutes or data that is older than ten minutes, is considered expired and is not used to substitute missing data.

The received data can be further processed to categorize links based on link properties including polarization, indoor versus outdoor location, terrain shape of propagation, multipath environment, line of sight (LOS) versus non-line of sight (n-LOS), and speed of movement of the link or link endpoint relative to speed of movement of a storm system. Link information from links that may not be attenuated by weather or that have attenuation characteristics that could mask weather-caused attenuation are discarded.

Cellular link attenuation data processing program (614) optionally performs additional pre-processing to isolate non-baseline attenuation in measurement data or to calculate precipitation attenuation. Cellular link attenuation data processing program (614) loads cellular network baseline transform associated with each link and precomputed by Offline/background processing server (330), as described in section 6.3.2. Cellular link attenuation data processing program (614) then adjusts each link's measured attenuation by this baseline value (12050) to determine non-baseline attenuation which is a measure of attenuation caused by precipitation or other interference. Non-baseline attenuation link data is compared to an attenuation threshold and non-baseline attenuation data is below this attenuation threshold, the received link data is discarded. This filter removes inactive links with insufficient attenuation to be useful for predicting precipitation intensity.

The parsed and pre-processed cellular link data and associated metadata and ancillary data are then stored (12060) as cellular network processed attenuation data (624) to a database such as cellular network link attenuation database (351). Cellular network topology information can be stored separately in cellular network link topology database (358 of Table 8).

6.4.3 Weather Radar Data Collection Process

FIG. 23 illustrates an exemplary method (13000) for receiving and storing weather radar data. Radar data collection program (512) receives weather radar data (13010) from one or more weather radar data sources (344).

Radar data collection program (512) parses (13020) received data files to extract measurement data. Parsed data is dependent on the weather radar data product. For example, radar data collection program (512) parses reflectivity data to obtain reflectivity readings at discrete location points, for example at discrete longitude and latitude coordinates or at discrete grid points determined by the system. Radar data collection program (512) parses other weather radar data sets to obtain location indexed wind measurements and precipitation estimates. At step (13030), parsed data is associated with the current cadence instance Mi and stored as radar raw data (521) in radar database (322).

Data is pre-processed (13035) by radar data processing program (611) to associate the measurement data with metadata and ancillary data. Metadata and ancillary data related to weather radar includes radar station IDs, radar station locations including latitude and longitude, and reference and radar operational parameters such as information on synchronization, calibration, date, time, antenna position, Nyquist velocity, and operational mode. During pre-processing, any required ancillary data or metadata that was not included in data files received by information collection and normalization server (310) is retrieved. During pre-processing (13035), the information collection and normalization server (310) calculates additional ancillary data such as distance of data point location from radar and data point location altitude, which can be determined based on beam angle and distance from radar.

At step (13040) radar data processing program (611) applies one or more radar transforms to the radar raw data (521) to extract ground level data, for example by selecting data from a lowest radar beam angle, to map the radar data from polar coordinates to Cartesian coordinates and to map data to tiles of a radar data tile layer of $M_i$ collection stack.

Radar data processing program (611) optionally performs additional pre-processing to acquire and process data useful for determining information that could affect the accuracy (13050) of precipitation estimated from the radar data. For example, reflectivity readings can be affected by material through which a radar signal travels, including through precipitation, vegetation, and structures. Radar data processing program (611) can determine, for each location, factors that can affect reflectivity measurements such as, for example, a distance traveled through intervening precipitation or other partially obstructive material. Information that can affect accuracy is associated with measurement locations and the information and association is stored in the radar characteristics database (392).

Parsed and pre-processed weather radar data and associated metadata and ancillary data are stored (13060) as radar processed data (621) to radar database (322).

6.4.4 Weather Satellite Data Connection Process

FIG. 24 illustrates an exemplary method (14000) for receiving and storing weather satellite data. Satellite image data collection program (516) receives satellite data (14010) from one or more weather satellite sources.

Satellite image data collection program (516) parses (14020) received data files to extract measurement data. Parsed data is dependent on the weather satellite data product from which the data is derived. The information collection and normalization server (310) can, for example, employ dedicated programs to parse a NetCDF formatted satellite data output file from a mapped image into a pixel-by-pixel ASCII text output. The information collection and normalization server (310) parses image and data files containing, for example, IR, radar, microwave, or visible data to obtain individual data readings at discrete location points, for example at discrete longitude and latitude coordinates or at discrete grid points determined by the system. At step (14030), parsed data is associated with the current cadence instance and stored to satellite image database (326) as satellite image raw data (527).

Data is pre-processed (14035) by satellite image data processing program (617) to associate the measurement data with metadata and ancillary data. Metadata and ancillary data related to weather satellites includes satellite IDs, locations including latitude and longitude, orbital height, and satellite instrumentation operational. During pre-processing, any required ancillary data or metadata that was not included in data files received by the information collection and normalization server (310) is retrieved.

At step (14040) satellite image data processing program (617) retrieves satellite image transform and uses it to transform weather satellite image and measurement data from satellite image and measurement data map coordinates to system-determined tiles including determining averaged or interpolated grid point, cell, and tile data values from map location values if grid resolution is lower or higher than map resolution.

Satellite image data processing program (617) optionally performs additional pre-processing to acquire and process data useful for determining information that could affect the accuracy (14050) of the precipitation estimates calculated using the satellite data. For example, reflectivity readings from satellite radar readings can be affected by material through which a radar signal travels, including through cloud cover and precipitation. Satellite image data processing program (617) can determine, for each location, factors that can affect reflectivity measurements such as, for example, a distance traveled through intervening clouds, precipitation, or other atmospheric conditions. Information that can affect accuracy is associated with measurement locations and stored to imaging satellite characteristics database (359 of Table 8).

Parsed and pre-processed weather satellite data and associated metadata and ancillary data are stored (14060) as satellite image processed data (627) in the satellite image database (326).

6.4.5 Map Data Collection Process

FIG. 25 illustrates an exemplary method (15000) for receiving and storing map data. Map data collection program (517) receives (15010) map from map data source (e.g. 348). Map data received by map data collection program (517) includes elevation data as well as GIS and topographic map data.

Map data collection program (517) parses (15020) received GIS, elevation, and topographic map files to extract data. Parsed data includes, for example, elevation, ground cover such as vegetation and vegetation types, water features, and building or other structures at map coordinate locations, for example at specific latitude and longitude locations. Parsed map data is stored as map raw data (528) in map database (880).

Data is pre-processed (15035) to associate the measurement data with metadata and ancillary data. Metadata and ancillary data can include data source and map or data creation, collection, or publication date.

Map data processing program (618) applies one or more transforms (15040) to transform data from map coordinates to system-determined tiles. Transformation can include interpolating map features to grid, cell, or tile features if map and grid, cell, or tile coordinate resolutions are different. In addition, map data processing program (618) can process map data to recognize features of interest such as airports and parking lots, and add feature tags to map data that identify, for example, the type, location, geographic boundaries, and surface area of recognized features of interest.

Parsed and pre-processed map data and associated metadata and ancillary data are stored (15050) to a database such as map database (880).

6.4.6 Ground Station Data Collection Process

FIG. 26 illustrates an exemplary method (16000) for receiving and storing ground station data. Ground weather data collection program (513) receives (16010) ground station data from ground weather data source (346). Additionally, or alternatively, information ground weather data collection program (513) collects ground station data directly from a plurality of ground stations or from other ground station data aggregation sources.

Ground weather data collection program (513) parses (16020) received ground station data to extract rain gauge data and, optionally, other data typically collected by ground stations including temperature measurements, atmospheric pressure data, humidity data, and wind speed and direction. At step (16030), parsed data is associated with the current cadence instance and stored as ground weather station raw data (346) to ground weather station database (323).

Data is pre-processed (16035) by ground weather station data processing program (612) to associate the measurement data with metadata and ancillary data such as weather station ID, measurement equipment, and calibration or reliability records. Ground weather station data processing program (612) translates weather station measurement units to a standard measurement units configured for all data collected by ground weather data collection program (513).

At step (16038), ground weather station data processing program (612) uses a ground weather data transform to transform data from ground weather station locations to system-derived tiles. Transforming the data to tiles can include interpolated location-specific measurement data to tile locations. For example, a limited number of tile may each include a ground station with a rain gauge located within the tile. Precipitation measurements for tiles that do not include a rain gauge located within the tile can be assumed to equal to the precipitation measured by the nearest rain gauge or can be approximated as a function, such as a weighted distance function, of the precipitation measurements by a plurality of surrounding rain gauges. Other weather gauge measurement values are similarly transformed to tile located measurements.

Parsed and pre-processed map data and associated metadata and ancillary data are stored (16040) to ground weather station database (323).

6.4.7 Additional Data Collection Programs

The information collection and normalization server (310) can receive and process data of types and from sources other than and in addition to those included in the data collection methods and data sources described in relation to FIGS. 20-26. For example, the information collection and normalization server (310) can receive NWP data from an NWP data source (341). The NWP data includes current and forecast weather or atmospheric data including wind speed and direction, precipitation intensity and precipitation type, temperature, humidity, dew point, and visibility estimates. NWP data collection program (515) parses NWP data and assigns it to the current cadence instance Mi. NWP data processing program (616) pre-processes NWP data and stores the data in one or more databases, including NWP model atmospheric database (329). Pre-processing of NWP data can also include using a pre-calculated transform to transform data from NWP data coordinates to system-determined tile locations including determining averaged or interpolated tile data values from NWP data coordinate values if tile resolution is different (either lower or higher) than the NWP data coordinate resolution. NWP data processing program (616) can extract ground level data from NWP data and store ground level NWP data in NWP model ground weather database (353).

6.5 Offline/Background Programs 6.5.1 Analysis Programs

Analysis programs are independent programs that process one or more sets of data (either cellular or point-to-point microwave links, radar data, and/or map data) in order to enhance the accuracy of the subsequent weather parameter modelling. These programs are executed on the offline/background processing server (330) against information stored in the system database (320) in order to adjust collected data. The results are stored back to the system database (320) when the analysis processes are complete.

6.5.1.1 Coverage Maps

Given the characteristics of the (combined sources) cellular and point-to-point microwave links (e.g., topology, frequencies, link locations, polarization), the program identifies blind regions, where precipitation intensities below specific precipitation intensities cannot be observed due to radar occultation. The coverage map program creates a single coverage map per precipitation intensity value level, in which the areas of detectable precipitation at a specific intensity are identified (i.e. "for this network, this is our coverage for rain intensity at 5 mm/hour, and this is our coverage when the rain intensity is 10 mm/hour").

This approach is different from previous approaches in which a certain shape and size for the rain-cell to be detected has been assumed, and the coverage map is dependent on the chosen shape as well as on the precipitation intensity value level to be detected. The present approach relates to the given network and assumes nothing about the rain-cell structure.

The system then creates a coverage map in a three stage process:

Stage 1—define the map area (a) Sort all participating sites according to geographical locations (longitude/latitude on a UTM grid).

(b) Choose the antenna mast located furthest to the north and to the west (mast 1). Choose the antenna mast located furthest to the south and to the east (mast 2). Map borders will be constructed by finding the most Northern western and Northern eastern antennas, and then finding the most Southern western and Southern eastern antennas.

(c) Define a rectangular zone that covers all the existing links.

(d) Expand this rectangular zone to cover the "area of influence" (see below) of all the links within it.

Stage 2—segment microwave links into segments and points.

(a) For each link in a given map area, a recursive division is conducted to very small segments that are equal in length, each segment defined by 2 discrete points.

This division is accomplished by going through the following process iteratively, until the length of each segment is smaller or equal to a predefined distance. In an embodiment, a plot of attenuation along the length of a link is generated and the predefined distance is determined by finding the shortest segment link wherein a difference in attenuation greater than a threshold amount is observed between a start point and an end point of the segment.

(i) Divide the link to two equal segments and define a middle point. After this step there are two segments and three equally distributed points:

Beginning point (antenna "a" location),
Ending point (antenna "b" or UE location).
Middle point.

(ii) Divide the two new segments to two and define a middle point for each.

After this step we have four segments and five equally distributed points.

(iii) Iterate step ii) until all links are processed and the segment sizes are below the predefined distance.

Stage 3—determine coverage for different precipitation intensities.

(a) The basic assumption of this stage is that the precipitation intensity is uniform for the entire area, and the coverage map identifies "blind spots" where the precipitation intensity is below a specific precipitation intensity is undetectable.

This approach allows a "threshold" precipitation intensity value to be defined, so that it can be understood what the area is in which precipitation at this intensity or higher is detectable. The real-time precipitation map enabled by the technology differentiates between different levels of intensity and enables precipitation at all levels of intensity above the threshold level to be seen.

Area of Influence Calculations

The technology divides the map area into a grid. The grid is a matrix of discrete points, and the distance between two points is defined by the lowest resolution obtainable. This resolution is defined based on the density of the network.

For each grid point, the algorithm checks whether or not it is within the area of influence of at least one reference point of one link.

Each of the reference points on every link has a area of influence, which is defined by the formula: area of influence=Rain/$\{[(Q/(a*L)]^{(1/b)}\}$, where:

Area of influence is the radius in kilometers around this point in which precipitation at a given level is "sensed" by that link (i.e., if there is rain at that intensity or above within that circle, the link to which this reference belongs will be attenuated).

Q—a given quantization level in the specific link.

Rain—The precipitation intensity we want to measure.

a and b—pre-set parameters which depend on a link's frequency and polarization, and on the drop size distribution typical to the area (e.g., taken from the open literature).

L-link length (distance between 2 sites).

If a grid point is within the range (area of influence) of at least one link, this grid point is considered to be detectable (or "covered").

Since the area of influence of each reference point depends on the precipitation intensity (see the formula), the algorithm performs stage two for a series of different precipitation intensities, with intervals between intensities set at 0.1 mm/hr. For each precipitation intensity, the system calculates a different set of grid points that are within the area of influence of one or more discrete microwave link points.

The technology saves the different coverage maps for the different intensities separately and permits an evaluation of the network's coverage for a wide range of intensities.

6.6 Link-Based Precipitation Estimates 6.6.1 Attenuation-To-Precipitation Transform Creation Referring to FIG. 27, a portion of a 5G Terrestrial Wireless Network is shown overlaying a static microwave grid (17100) of grid points, each grid point represented by a solid circle. Static microwave grid (17100) includes, for example, grid points (17101, 17102, 17103, and 17104). In an embodiment, geographic area is divided into a plurality of grid points comprising static microwave grid (17100) wherein each grid point is arranged at an intersection of a grid pattern comprising square grid cells measuring approximately 500 m per side.

Figure 1:
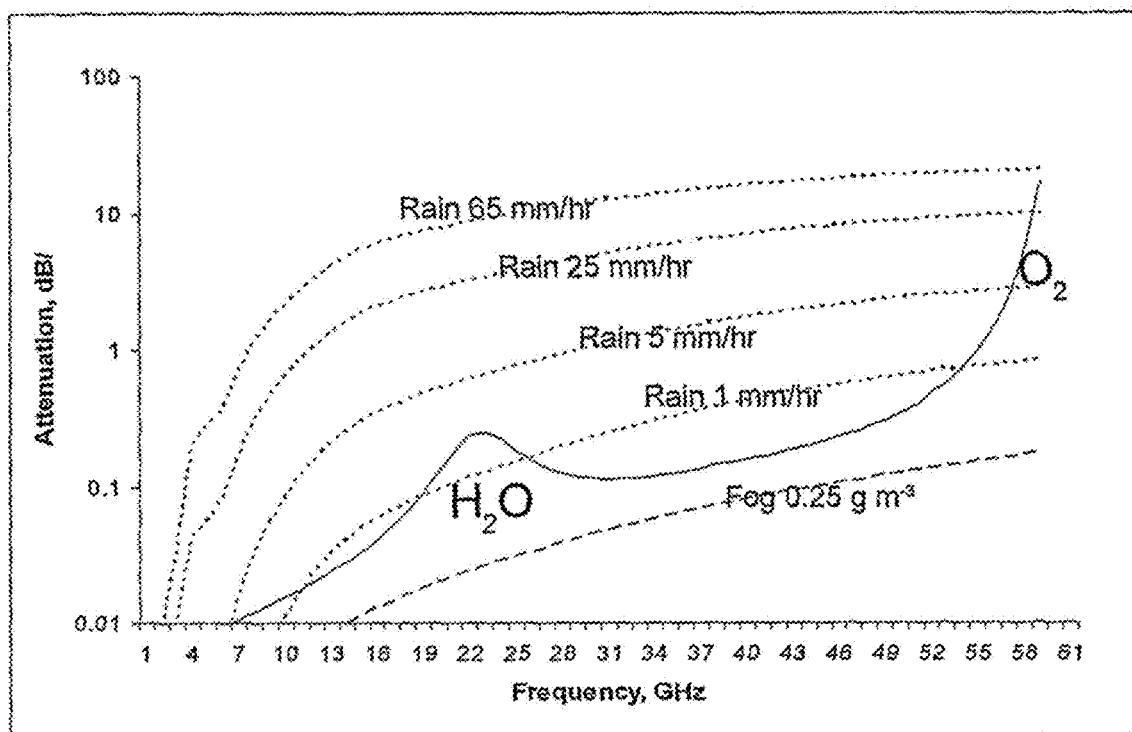
FIG. 1 illustrates microwave signal attenuation as a function of frequency and atmospheric moisture.
Figure 2:
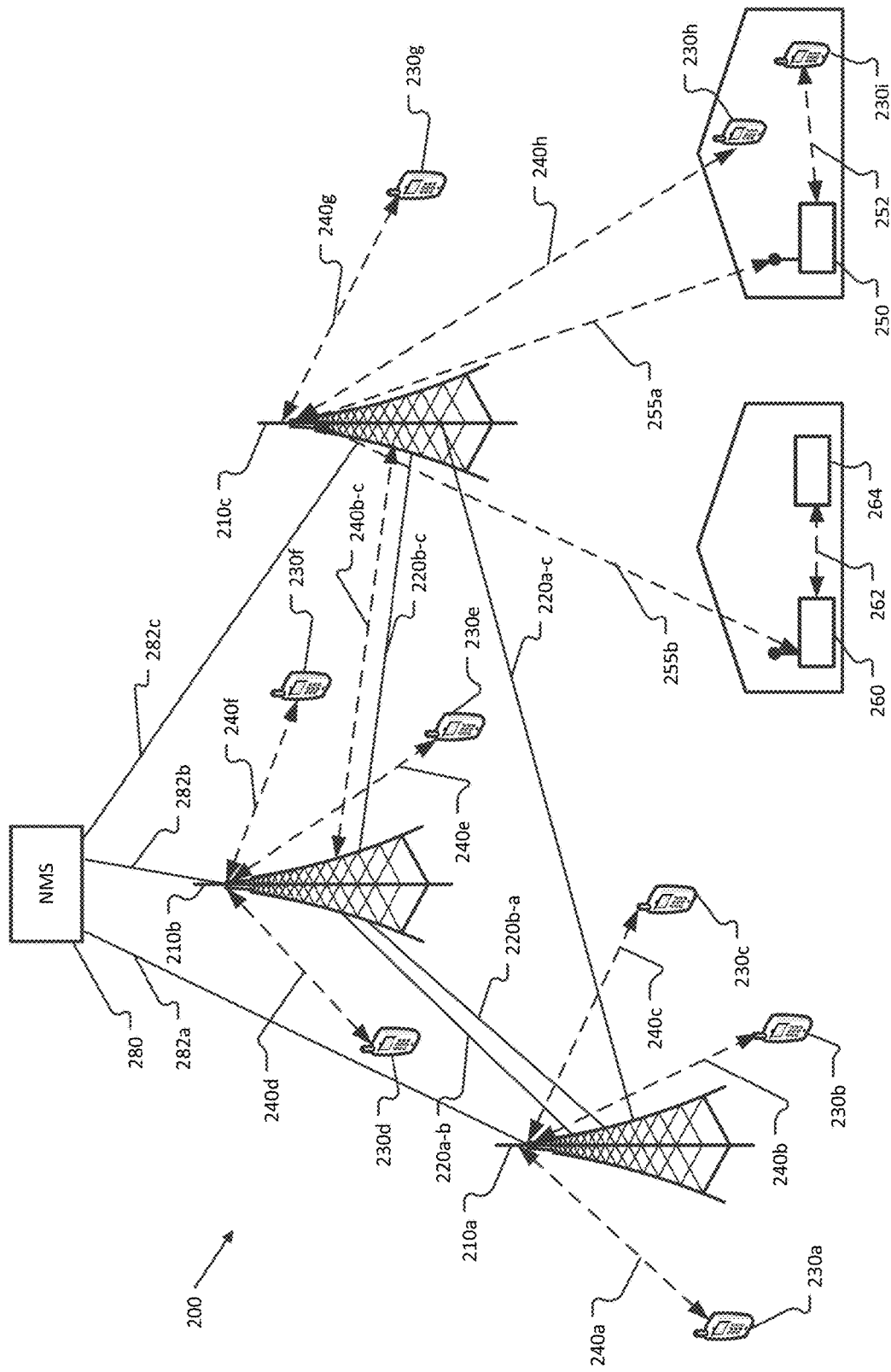
FIG. 2 illustrates an example 5G network topology and its microwave links.

The overlying radio network includes elements similar to and having essentially the same functionality as radio network elements shown and described in relation to network (200) which is illustrated in FIG. 2. The overlying radio network includes antenna masts (17010a and 17010b) which are connected via point-to-point microwave link (17012) and UEs (17020a, 17020b, 17020c, and 17020d) each with at least one cellular link (17028a-17028b) with antenna mast (17010b). For clarity only a limited number of small-cell/base stations and UEs are illustrated. An overlying network can include many more UEs and/or small-cell/base stations. By way of example and not limitation, the overlying network can include hundreds of antenna masts and UEs, and can further include additional network elements such as those shown in FIG. 2.

Referring to FIG. 28, a process (18000) for creating attenuation-to-precipitation transforms for use by determining precipitation intensity estimation coverage and for estimating precipitation intensity using point-to-point and cellular microwave link attenuation data is shown. Process (18000) can be carried out by processing program of offline/background processing server (330) to pre-calculate transforms for determining precipitation intensity from attenuation measurements. A detailed discussion of aspects of process (18000) as they apply to generating precipitation estimates for point-to-point microwave links such as backhaul link (18012) is described in section 6.5.1.

At step (18125), as illustrated in FIG. 27, a static microwave grid (17100) overlaying an area including eNBs and UEs is created. At step (18150) a grid-to-tile transform is created to map grid points of static microwave grid (17100) to tiles of a system tile layer such as a precipitation intensity tile layer. The grid-to-tile transform is saved to a transform and filter database (393).

At step (18100), point to point microwave links (e.g. link 17012) and cellular microwave links (17028a-17028d) are mapped to static microwave grid (17100). At step (18110) each link is subdivided into a plurality of equal length segments and a plurality of link points, each designated by an "X" symbol (for example 17014a, 17024d1) are added to each link. To determine the distance between each link point, a plot of attenuation along the length of a link is generated and the distance between link points is determined by finding the shortest segment link wherein a difference in attenuation greater than a threshold amount is observed between a start point and an end point of the segment. In some embodiments, the mapping takes the form of a lookup table that maps a link identification (for example, a link ID or a pair of endpoint locations) to a link represented on the static microwave grid. The lookup table forms part of the transform to map links to grid effects by mapping a link to a set of grid points associated with a percentage of the link attenuation, and then applying a precipitation conversion to that percentage of attenuation to determine precipitation for each effected grid point.

Beginning at step (18120), where a precipitation intensity level is selected, a link-to-grid precipitation transform corresponding to the selected precipitation intensity is created to transform microwave link attenuation data to microwave grid points of static microwave grid (17100). In an exemplary embodiment, transforms are created for three selected precipitation intensity levels, for example for 1.0 mm/hr, 2.0 mm/hr, and 3.0 mm/hr.

At step (18130) an area of influence is calculated for each link point. The area of influence is determined based on the typical precipitation intensity of the region in the specific season, and represents the maximal distance between a static microwave grid point and a microwave link point where precipitation or other atmospheric phenomena such as fog or humidity estimated at the link point is assumed to occur at the static microwave link point. Areas of influence for point-to-point microwave links are each illustrated as a dot-dash-dot formatted circle surrounding a microwave link point. For example, microwave link point (17014a) is associated with a first area of influence (17016a) and microwave link point (17014b) is associated with a second area of influence (17016b). Areas of influence for cellular microwave links are each illustrated as a dashed line formatted circle surrounding a cellular microwave link point. For example, cellular microwave link point (17024d1) is associated with area of influence (17026d1) and cellular microwave link point (17024d2) is associated with area of influence (17026d2). It is noted that radii of influence illustrated in FIG. 27 are scaled for clarity and are not intended to replicate actual area of influence values.

In general, precipitation intensity within each area of influence can be estimated using microwave link attenuation measurements associated with the microwave link on which a corresponding link point is located. For example, precipitation intensity can be estimated, based on the microwave link (17012) attenuation measurement data, at each link point (17014a, 17014b, ... 17014n). The estimated precipitation intensity can be applied to points of static microwave grid (17100) that are located within associated areas of influence (170146a, 17016b, ... 17016n).

In a similar manner, precipitation intensity can be estimated using measured cellular microwave link attenuation data, for example attenuation data associated with a cellular microwave link (17028a) can be used to determine a precipitation intensity which can be applied to points of static microwave grid (17100) that fall within areas of influence associated with the microwave link (17028a). For example, precipitation attenuation associated with cellular microwave link (17028a) can be applied to grid points (17105, 17106) which are within area of influence (17026a1), grid point (17107) within area of influence (17026a2) and other grid points that fall within additional areas of influence (not labeled) associated with cellular microwave link (17028a).

Cellular microwave links (17028a-17028b) are generally each less sensitive to precipitation attenuation as compared to static point-to-point microwave links (e.g. 17012). This is due to a number of factors, primarily including that cellular microwave link frequencies being less susceptible to attenuation. The cellular microwave link area of influence (17026d1, 17026c2, etc.) is generally smaller than point-to-point microwave link area of influence (e.g. 17016a-17016n).

An area of influence is determined for each link point. Area of influence is generally larger for larger magnitude precipitation intensities, i.e. higher intensity precipitation has a greater effect on microwave link attenuation and is thus easier to detect further away from the microwave link. At step (18135) the set of grid points of static microwave grid (17000) that are each included in one or more area of influence is determined. At step (18140) the calculated areas of influence and the set of covered grid points are written to a link-to-grid transform which is saved in transform and filter database (393). The link-to-grid transform can later be retrieved from transform and filter database (393) by a precipitation estimate generating program such as point-to-point microwave link precipitation program (917) and be used to generate precipitation estimates at the covered grid points based on microwave link attenuation data.

At step (18155), if an additional link-to-grid transform needs to be created for and additional precipitation intensity level, process (18000) loops back to step (18120) and selects the next precipitation intensity level for which a transform is to be created. Otherwise the process ends.

A cellular radio access network including many more handsets than antenna masts and therefore includes many more cellular microwave links than point-to-point microwave links, with cellular microwave links often located close to each other. The abundance and mutual proximity of multiple cellular microwave links can improve precipitation intensity estimations. Each grid point can be included in the area of influence of multiple microwave links. For example, grid point (17101) is included in a first cellular microwave link (17028*c*) area of influence (17026*c*2) and a second cellular microwave link (17028*b*) area of influence (17026*b*2). Precipitation intensity estimates for grid point (17101) include estimates based on microwave link measurements for both microwave links (17028*b*) and (17028*c*). Therefore, measurements from multiple UE cellular links can be pooled. The pooled measurements can be analyzed to look for similar perturbations occurring on multiple links, for example on multiple links in a particular region at a particular time. A small perturbation occurring on each of multiple links is indicative that the perturbation represents precipitation or other condition of interest.

It is anticipated that, depending on the density of UEs and associated cellular microwave links in a given region, a grid point could be included in a area of influence of each of a large number of cellular microwave links, for example 10, 100, or more links. Precipitation intensity estimates can be aggregated from each of a plurality of links, which enables a robust precipitation intensity estimate despite lower sensitivity, as compared to microwave links, of each of the individual cellular microwave links. Precipitation intensity estimates can be aggregated for a grid point from both cellular and point-to-point microwave links. For example, grid point (17108) is covered by both point-to-point microwave link area of influence (17016*a*) and cellular microwave link area of influence (17026*a*4).

6.6.2 Generating Link-Based Precipitation Estimates and Coverage Maps Using Pre-Calculated Transforms FIG. 29 shows a method (18500) for generating precipitation intensity estimated from microwave link attenuation data using pre-calculated link-to-grid and grid-to-tile transforms such as those calculated in section 6.6.1. Process (18500) can be carried out by programs running on the modeling and prediction server (360) including point-to-point microwave link precipitation program (917) and cellular network microwave precipitation program (914).

At step (18160) microwave link attenuation data including point-to-point microwave link processed attenuation data (620) and/or cellular network processed attenuation data (624) are retrieved, for example from point-to-point microwave link attenuation database (321) and cellular network link attenuation database (351).

At step (18165) a grid-to-tile transform corresponding to static microwave grid (17100) and link-to-grid transforms corresponding to precipitation intensity levels for which precipitation estimates are desired are retrieved from transform and filter database (393).

At step (18170) a precipitation processing program (917, 914) applies the link-to-grid and grid-to-tile transforms to processed attenuation data to generate precipitation estimates, which are saved as a $M_iF_0$ precipitation intensity layer in a precipitation intensity database. In an embodiment, precipitation estimates for each of multiple precipitation intensities are calculated by iteratively applying grid-to-link transforms corresponding to each of the precipitation intensities to the attenuation data. For example, a 3.0 mm/hr precipitation intensity link-to-grid transform can be used by link precipitation program (917 or 914) to determine grid points with 3.0 mm/hr or greater precipitation intensity by determining, based on measurement data, the set of links having attenuation that predicts 3.0 mm/hr or greater precipitation intensity. Link precipitation program (917 or 914) assigns a value of 3.0 mm/hr precipitation intensity to grid points of static microwave grid (17100) that are covered by areas of interest at link points along the set of links determined to have link attenuation that predicts precipitation intensity of 3.0 mm/hr or greater. Link precipitation program (917 or 914) can use a 2.0 mm/hr precipitation intensity link-to-grid transform to determine grid points with 2.0 mm/hr or greater precipitation intensity and a 1.0 mm/hr precipitation intensity link-to-grid transform c to determine grid points with 1.0 mm/hr or greater precipitation intensity. The results from the multiple transforms can be blended by selecting the greatest precipitation intensity estimate at each grid point of static microwave grid (17100). A grid-to-tile transform can then be applied to the blended grid point precipitation intensities to map the precipitation intensities to a precipitation intensity tile layer of $M_iF_0$.

Link-to-grid precipitation intensity transforms can also be used to generate precipitation estimate coverage maps. Each link-to-grid precipitation transforms includes all grid points of static microwave grid (17100) that are covered by the transform (i.e. all grid points at which a precipitation intensity associate with the transform can be determined). A grid-to-tile transform can be applied to all covered grid points of a particular precipitation intensity link-to-grid transform to generate a tile layer that includes the coverage area of the particular precipitation intensity transform. A coverage area tile layer can be generated for each precipitation intensity grid-to-link transform. The coverage area tile layers can be used, for example by map generation program (810) or HyperCast program (890) to generate one or more coverage maps, each providing a visual representation of the extent of coverage of microwave link-based precipitation estimates for a geographic region associated with static microwave grid (17100).

6.6.3 Dynamic Link to Static Link Transform
6.6.3.1 Overview

An exemplary method for determining precipitation estimates based on measurements of attenuation of dynamic cellular links using the technology described herein includes, prior to receiving attenuation measurements, determining multiple possible locations of user equipment device (UEs) that are in communication contact with an eNB, determining link characteristics of a proforma link between each possible UE location and the eNB, and pre-calculating transforms for generating microwave grid attenuation and tile layer precipitation estimates using an attenuation measurement associated with each proforma link. The method further includes receiving cellular measurement data including UE location information and attenuation measurements, determining a location of each UE for which measurement data is received, associating each UE and UE attenuation measurement with a proforma link based on the location of the UE, and using the pre-calculated transforms to generate precipitation estimates based on the UE attenuation measurements.

6.6.3.2 Background

Within the context of a cellular wireless communications network such as a LTE network, dynamic links are cellular microwave links between eNBs and UEs which can come on and off line quickly. UE dynamic link endpoint locations can shift rapidly as UEs move from one location to another location. The network formed by the microwave links between the UE and eNBs is thus constantly shifting, so the attenuation contribution to precipitation for each dynamic link is also shifting. Recalculating the effects of precipitation dynamic link attenuation each time a UE changes location and determining precipitation estimates based upon the revised precipitation-based attenuation can consume substantial amounts of time and computational resources. As sampling of dynamic link attenuation is sped up (e.g. the interval between samples is decreased), the resulting computational load makes the calculations required to recalculate the attenuation contribution from each dynamic link becomes computationally infeasible, resulting in hindcasts that complete after the events being forecast.

6.6.3.3 Proforma Link Grid and Proforma Links

A system according to the technology disclosed herein can reduce the computational resources and time to determine precipitation estimates from dynamic link attenuation measurements by pre-calculating transforms for converting dynamic link attenuation measurement to precipitation estimates within a geographic region and mapping dynamic link measurements, when received, to these pre-calculated transforms. Referring to FIG. 30, offline/background processing server (330) creates a proforma link grid (1040) which overlays the geographic region that includes eNB (1300). Proforma link grid (1040) is formed with a plurality of grid cells (e.g. 1041, 1043). A grid point (e.g. 1101, 1103) is located at the center of each grid cell. Each grid point represents a proforma UE location, which is an endpoint of a proforma eNB-to-UE communication link. A proforma link is defined herein as a link that would be established between a UE and eNB when the UE is located at a grid point (1101, 1103, etc.) and is communicating with the eNB. The offline/background processing server (330) can pre-calculate characteristics of the possible multiple proforma links in a region as a static network, then pre-calculate transforms to translate link attenuation measurements to precipitation estimates, and save the transforms to a database. The system maps each dynamic link between a UE and eNB for which attenuation measurement data is received to a proforma link and uses the pre-calculated transforms associated with the proforma link to process the attenuation measurement data. Thus, each dynamic UE-to-eNB link is mapped to a pre-determined proforma link and the set of proforma links are processed as if the dynamic links were static links in order to determine the attenuation contribution of each dynamic link to precipitation rate.

FIG. 30 shows multiple proforma links (1202-1246) extending from eNB (1300) to each of multiple grid points (1102-1140) of proforma link grid (1040). A proforma link extends between eNB (1300) and each grid point within eNB coverage area (1320). eNB coverage area (1320) is based on a maximum distance from eNB (1300) from which a wireless microwave communication link can be established between eNB and a UE such as a mobile wireless communication device or LTE router. The size and shape of eNB coverage area (1320) is a function of factors including local propagation environment, antenna pointing, signal polarization, eNB transmission signal strength, UE transmission signal strength, and eNB and UE equipment characteristics. A typical eNB coverage area extends 3-4 miles radially from eNB (1300). The eNB coverage area (1320) can be increased or decreased if, for example, eNB (1300) transmission strength is increased or decreased.

The proforma link grid (1040) overlays a geographic area that includes at least a first eNB (1300) and possibly one or more additional eNBs (not shown). Each grid point, e.g. grid points (1102-1146) corresponds to a specific geographic location and represents a possible instantaneous location for a UE communicating with and eNB (1300). A minimum grid point separation distance is calculated as the distance that corresponds to one-half of the minimum link attenuation measurement precision. For example, if the link attenuation data is reported with 0.1 dB resolution, then spacing between grid points, e.g. between grid points (1101 and 1103) is set to the distance associated with a link length that produces 0.05 dB or less of attenuation in the current RF environment.

The proforma link grid (1040) spacing may alternatively be determined based, at least in part, on historical data, current attenuation measurements, or predictive models. For example, grid spacing can be based on information including historical measurements of UE density and distribution within a geographic region, distance between grid point locations that corresponds to a detectable difference in attenuation along links, i.e. along links (1202-1246), or on a combination of historical or expected UE distribution and estimated link attenuation differences. It is noted that proforma link grid (1040) does not necessarily correspond to static microwave grid (17100) that is used for processing (static) point-to-point microwave links depicted in FIG. 27.

If there are plurality of eNBs that form overlapping proforma link grids, the proforma link grids may be combined after they are calculated. Overlapping grid cells may be combined for efficiency in processing.

6.6.3.4 Pre-Calculating Cellular Link Transforms

FIG. 31 depicts a process flowchart for an exemplary method (3000) for mapping dynamic cellular network links to pre-determined (static) proforma links with which pre-computed filters and transforms are associated. At step (3010), the offline/background processing server (330) creates proforma link grid (1100) and determines a coverage area (3020), e.g. coverage area (1300 of FIG. 33), for each eNB in a particular region.

At step (3030), the offline/background processing server (330) creates a proforma link (i.e. 1202-1246) between each grid point (1102-1146) and eNB (1300) and determines link characteristics of each proforma link. Link characteristics for each proforma link include the geospatial coordinates of the proforma link endpoints (eNB and grid point location), proforma link length, an eNB or UE transmit frequency and transmit power level, microwave signal polarization, and propagation environment characteristics (vegetation, structures, water bodies, etc.) along the length of the proforma link. Proforma link grid (1040), grid point locations, and proforma link characteristic are stored by the offline/background processing server (330) in the transform and filter database (393).

At step (3040) offline/background processing server (330) pre-calculates a baseline attenuation transform for each proforma link. Each baseline attenuation transform is configured to be used by cellular microwave link data processing program (614) to separate, from raw attenuation measurement data, measured attenuation due to precipitation from background attenuation along a particular link or to calculate attenuation due to precipitation. The baseline attenuation transform can be determined based on measurement data and/or propagation modelling using the proforma link characteristics. Baseline attenuation transforms are stored by the offline/background processing server (330) in the transform and filter database (393).

At step (3045), offline/background processing server (330) pre-calculates transforms that can be used by cellular network microwave precipitation program (914) to determine precipitation estimates based on proforma link attenuation measurements. The offline/background processing server (330) subdivides each proforma link (1202-1246) into multiple link segments based on modeled link attenuation, as described in section 6.6.1. The length of each link segment is a function of the total attenuation along the length of a link. Proforma links (1202-1246) can include links of varying in length from tens or hundreds of feet to up to the limit of eNB coverage area (1320), e.g. 3-4 miles. Shorter proforma links can include a limited number of link segments and, if the link is too short to subdivide, can include a single segment. The offline/background processing server (330) determines link-to-grid transforms for transforming cellular microwave link (1202, etc.) attenuation measurements to a microwave grid points such as grid points of microwave grid (17100), and determines grid-to-tile transforms for transforming attenuation measurements to a cellular network microwave tile layer of a $M_rF_0$ tile layer stack of a cadence instance $M_i$. Link-to-tile transforms and grid-to-tile transforms are stored by the offline/background processing server (330) in the transform and filter database (393).

Each eNB and UE can change transmit power level from time to time, for example to fulfill LTE automatic neighbor relation (ANR) requirements. Cellular links can be configured with one or more different transmit frequencies and polarization schemes. Cellular link attenuation data used to determine precipitation estimates can therefor include sets of links with transmit power, transmit frequencies, and polarization that can be heterogeneous among links from a single collection interval and that can change from one collection interval to another collection interval. The transmit power, polarization, and frequency used to transmit data on each proforma link can affect precipitation estimates and may not be known prior to receiving dynamic link attenuation measurements. The offline/background processing server (330) can pre-calculate a plurality of sets of transforms, wherein each transform corresponds to a different anticipated or historic link transmit power level, transmission frequency, polarization, or combination of power level, frequency, and polarization. The offline/background processing server (330) can pre-calculate multiple transforms for each proforma link wherein each of the multiple transforms corresponds to a combination of possible link transmit characteristics that can affect precipitation estimates derived from link attenuation. A particular set of transforms can be selected for use in precipitation intensity estimation calculations based on a reported dynamic link transmit power level, polarization, and link frequency associated with attenuation measurements. Alternatively, the offline/background processing server (330) can recalculate transforms when eNB changes transmit power level.

6.6.3.5 Determining Precipitation Estimates Using Pre-Calculated Cellular Link Transforms FIG. 32 depicts a flowchart for an exemplary method (4000) for mapping cellular dynamic links to proforma links and generating precipitation intensity estimates based on dynamic link attenuation using pre-calculated proforma link transforms. Referring to FIGS. 11, 12, and 33, a microwave collection program (510a or 510b) collects cellular network raw attenuation data (524) from a terrestrial wireless network data source (340a or 340b) corresponding to a LTE network that includes eNB (1300) and UEs (1402, 1412, 1425, 1427, 1429, 1442) and stores the raw data to cellular network link attenuation database (351) of system database (320). The raw data comprises a UE identification, an eNB identification, the UE location or time of travel for signals sent between the UE and eNB, and signal attenuation information. The raw data also includes link characteristics information including signal transmit power, frequency, polarization. Cellular microwave link data processing program (614) can retrieve any missing link characteristics information and associated it with link measurement information during pre-processing of link data, as discussed in section 6.4.2. Cellular microwave link data processing program (614) retrieves (3050) cellular network raw attenuation data (524) from cellular network link attenuation database (351) when a set of newly collected raw data is available, for example upon receiving a notification from a data collection program.

At step (3055) cellular microwave link data processing program (614) processes the raw attenuation measurement data to filter out non-useful measurements. Filtering out non-useful measurements can include applying one or more filters to the data including, for example, a cellular network frequency filter to filter out non-microwave frequency range measurements and a cellular network received signal strength filter to filter out zero readings and measurements having too little attenuation to be useful for use in precipitation estimates.

At step (3058) cellular microwave link data processing program (614) assigns each UE from which useful measurement data was retrieved to a grid point and associates the measurement data with a proforma link corresponding to the grid point. Referring to FIG. 33, for each UE that is associated with a useful measurement (i.e. a measurement that was not filtered out), cellular microwave link data processing program (614) determines a location of the UE (e.g. 1402) and then determines the closest grid point (e.g. 1402) to the UE. Cellular microwave link data processing program (614) assigns the UE to the closest grid point, indicated by dashed arrows, and associates attenuation measurement data corresponding to the UE with the proforma link (e.g. 1202) that corresponds to the grid point. If multiple UEs are assigned to the same grid point, and attenuation measurements are consistent with each other, duplicate measurement data is discarded. If multiple UEs are assigned to the same grid point and attenuation measurement are not consistent, one or more criteria can be used to select attenuation measurement to use, for example by selecting to the largest attenuation value, or data can be averaged or otherwise combined. Each proforma link with which measurement data from a UE is associated (i.e. links (1202, 1212, 1225, 1227, 1229, 1242) is an active link, as indicated by solid arrows in FIG. 31.

The location of each UE can be determined based on a geographic location of the UE determined by cellular microwave link data processing program (614) from GPS coordinates received with link attenuation measurement data or based on another UE geolocation method such as, for example, UE signal triangulation based on signals received by multiple eNBs. If a UE is located substantially equidistant from two or more grid points, the grid point closest to eNB (1300) is selected. That is, the UE is assigned to the link having the shortest link length which can increase the resolution of attenuation caused by precipitation as compared to baseline link attenuation, which generally increases with increased link length. For example, UE (1442) is located approximately equidistant between grid point (1144) and grid point (1142). UE (1442) is assigned to grid point (1142) and proforma link (1242) is activated because link (1242) has a shorter link length than link (1244).

Alternatively, a UE can be assigned to a grid point based on a known distance of the UE from an eNB and a particular antenna of the eNB that receives a signal transmitted by the UE or that transmits a signal to the UE. Each eNB, for example eNB (1300) generally includes multiple antennas, for example eight antennas per cell tower, so that each antenna covers an arc (e.g. arc 1512) of roughly 45 degrees. A signal is received from UE (1412) at and the antenna covering arc (1512). The grid point (1112) subtended by the receiving angle of the antenna, i.e. by arc (1512) and located closest to the known distance from eNB (1300) of UE (1412) is selected and UE (1412) is assigned to grid point (1112).

At step (3060) cellular microwave link data processing program (614) loads a pre-calculated proforma link transforms for determining precipitation intensity based on the attenuation data. Cellular microwave link data processing program (614) determines from the measurement data one more dynamic link eNBs (e.g. 1300) and loads proforma link transforms corresponding to each determined eNB. Cellular microwave link data processing program (614) loads proforma transforms for active link. Alternatively, cellular microwave link data processing program, (614) loads transforms for all proforma links and sets non-active links to "off". Cellular microwave link data processing program (614) selects transforms that correspond to the transmit power, frequency, and polarization of the active dynamic links.

At step (3070), cellular microwave link data processing program (614) performs further processing on attenuation measurement data for each active link to determine attenuation due to precipitation. Cellular microwave link data processing program (614) retrieves, from transform and filter database (393), a precomputed baseline attenuation transform corresponding to each active link (1202, 1212, etc.) and uses the retrieved transforms to determine a precipitation attenuation value for each link. Cellular microwave link data processing program (614) replaces UE locations with associated grid point locations in cellular network processed data (624) and saves the processed data, including link length based on grid point location, precipitation attenuation, and other link details associated with the link to cellular network link attenuation database (351). Data fields for inactive links, i.e. links to which no UE has been assigned (illustrated with dashed lines in FIG. 31), are written with zero level values, effectively setting the inactive links to "off".

At step (3080), modeling and prediction server (360) uses the cellular network processed data (624) and precomputed transforms to determine precipitation estimates. Cellular network microwave precipitation program (914) retrieves cellular network processed data (624) from Cellular network link attenuation database (351) and retrieves precomputed link-to-grid and grid-to-tile transforms from transform and filter database (393). Cellular network microwave precipitation program (914) uses the transforms corresponding to active links to determine precipitation estimates and saves (3090) the precipitation estimates in cellular network precipitation database (354) as a cellular microwave precipitation tile layer of a cadence instance $M_i$. Using pre-calculated transforms reduces computational resources and time required to produce precipitation estimates based on dynamic link attenuation by eliminating the need to calculate and re-calculate the network and attenuation effect maps in response to changing dynamic link endpoint locations, frequencies, and transmit power levels.

At step (3100), process (3000) returns to step (3050) to retrieve raw measurement data if cellular microwave link data processing program (614) determines that new cellular link measurement data is available for processing. Cellular microwave link data processing program (614) can determine that new cellular link measurement data is available in response to receiving and alert, for example in response to receiving a message from the information collection and normalization server (310) indicating that new measurement data is available. If no new cellular link measurement data is available for processing, the process terminates.

6.7 Precipitation Estimates and Forecasting Process

Referring to FIG. 34, a process (19000) for forecasting precipitation by the modeling and prediction server (360) for each cadence instance is shown. One or more precipitation intensity tile layers of $M_i$ Collection Layer are retrieved (19100) from a storage location such as precipitation database (327) or radar database (322). Referring to FIGS. 3, 5, and 8, in an embodiment retrieved precipitation intensity tile layers include one or more precipitation tile layers (8010, 8020) of a $M_i$ Collection Data Stack. The retrieved precipitation intensity tile layers can include precipitation intensity expressed as rainfall rates measured in inches/hour. Estimated precipitation intensity can be calculated by the modeling and prediction server (360) using microwave link attenuation measurements, by the offline/background processing server (330) from reflectivity data, or can be supplied by radar data source such as, for example, a weather radar data source (344) or by a NWP data source (341) such as the Rapid Refresh (RAP) numerical weather model, maintained by NOAA.

At step (19105), the modeling and prediction server (360) can optionally create a blended precipitation intensity tile layer (e.g. blended weather data) by applying a blending function (8200) to two or more precipitation intensity tile layers (8010, 8020) retrieved from $M_i$ Collection Data Stack. The blended precipitation intensity tile layer can include precipitation intensity (or other weather data) from two or more data sources. In an embodiment, a blended precipitation intensity tile layer (8102) can include precipitation intensity calculated using microwave link attenuation measurements (8010) blended with precipitation intensity retrieved from a weather radar data source (344, 8020). In an embodiment, a blended precipitation intensity tile layer can include precipitation intensity retrieved from an additional or alternative data source such as NWP data source (341).

Blending of precipitation tile layers is performed in the modelling and prediction server (360) at step (19105) of a forecasting process (19000) in order to generate $M_i$ forecast cycle specific blended precipitation tile layer. Alternatively, a precomputed blended precipitation intensity tile layer (8102) can be computed as part of a post collection processing activity such as a blending function (8200) and the results (e.g. processed blended weather data) associated as part of the $M_iF_0$ forecast cycle to the start of forecasting process (19000). These blending steps may be performed by the modelling and prediction server (360) or may be performed by other servers, for example, the information collection and normalization server (310) or the offline/background processing server (330). Alternative embodiments include further or alternative blending functions such as, for example, a blending function that propagates ground level precipitation intensity calculated from microwave link attenuation measurements to higher elevation layers of tropospheric NWP data. The blended weather data in stored in a data type appropriate database associated with the current cadence instance One or more wind vector tile layers (8030) are retrieved (19010) from NWP atmospheric database (329), radar database (322), ground weather station database (323), or Other Data database (324) by the modelling and prediction server (360). Wind vector data tile layers include forecast data from the NOAA Rapid Refresh (RAP) numerical weather model, which is obtained using the weather data collection processes described herein. Wind vector tile layers from multiple wind vector data sources can be blended with a blending function (8200) using techniques similar to those used for precipitation estimate blending (19012). Blending wind vectors includes generating a blended wind data tile layer data using wind data from two or more input wind vector tile layers, each from a different wind vector data source. In an embodiment, a wind vector tile layer can be smoothed (19014). In an embodiment, wind vector tile layers include a series of forecast tile layers (8104, 8114, 8124, 8134) bounded by the range $M_iF_{(j-k)}$ where (j) is a start time of a forecast and (k) is an end time of a forecast. Wind vector tile layers thus include a series of tile layers, each tile layer corresponding to a current or forecasted time point and each tile layer including wind vectors (8104, 8114, 8124, 8134) assigned to individual tiles. In an embodiment, a time zero wind vector tile layer, i.e. $M_i$ Collection Data Stack wind vector tile layer (8030), is retrieved and $M_iF_{(j-k)}$ wind vector tiles (8104, 8114, 8124, 8134) are determined by the modeling and prediction server (360).

One or more convective available potential energy (CAPE) tile layers are retrieved (19200) from a data source such a NWP data source. In an embodiment, CAPE tile layers include a series of forecast tile layers bounded by the range $M_iF_{(j-k)}$ where (j) is a start time of a forecast and (k) is an end time of a forecast. In an embodiment, a time zero CAPE tile layer, i.e. $M_i$ Collection Data Stack C tile layer, is retrieved and $M_iF_{(j-k)}$ CAPE tiles are determined by the modeling and prediction server (360).

Each tile of precipitation intensity tile layer (8010, 8020) or blended precipitation intensity tile layer (8102, 8112, 8122, 8132) from $M_i$ Collection Data Stack and in each $M_iF_{(j-k)}$ forecast data stack is classified (19300) as including a storm condition including one of clear, mature, rising, or decaying and, if not clear, is further classified as convective storm or stratiform storm. If a tile includes a precipitation intensity of zero or a precipitation intensity below a threshold value, for example below a precipitation intensity value noise floor value, the tile is classified as normal. Otherwise, if the tile CAPE value is greater than or equal to 500, the tile is classified as convective storm. If the CAPE value is less than 500, the tile is classified as a stratiform storm. Referring to FIGS. 35A and 35B, a convective storm precipitation intensity rise and decay time profile (20100) and a stratiform storm precipitation intensity rise and decay time profile (20200) are illustrated. The modeling and prediction server (360) further determines a peak magnitude of a convective storm (20112) and peak magnitude of a stratiform storm (20212), as will be discussed in further detail below. The tile can be classified as rising (20110, 20210), mature (20112, 20212), or decaying (20114, 20214) by observing a time series of precipitation intensity values (and/or estimated precipitation intensity values). If the current precipitation intensity value is greater than a previous precipitation intensity value, the tile is classified as rising, if the precipitation intensity value has not changed the tile is classified as stable and if the current precipitation intensity value is less than a previous precipitation intensity value, the tile is classified as decaying. In an embodiment, classification (19300) can include shifting precipitation intensities between tiles of the precipitation intensity tile layer $M_iF_j$ (8112) using wind vector tiles of the wind vector tile layer $M_iF_j$ (8114) to predict future precipitation intensities for tiles of the precipitation intensity tile layer, as will be discussed in further detail below. Forecasting process (19000) can be repeated over time. If, at classification step (19300), a tile has previously been classified, the previous classification is used.

6.7.1 Nowcasting Process

Forecasting or Nowcasting includes iterating precipitation intensity calculations multiple times to generate a forecast precipitation tile layer at each of multiple forecast time points $(M_iF_{(1-n)})$. Again, referring to FIG. 34, a desired forecast time period is divided into discrete time increments and an iteration of calculation steps (19300-19440, 19450) is repeated once for each iteration step. For example, a sixty (60) minute forecast can be split into twelve increments of five minutes each (e.g. the forecast increment is 5 minutes) and the iteration calculation steps are repeated twelve times to complete the full sixty minute forecast. Additionally, FIG. 8 illustrates exemplary information flows (8000) during nowcast forecasting.

Forecasting process (19000) uses the principle of advection. The model assumes that rain is simply carried by the wind (advection). At step (19400), and during a first forecast iteration, tiles of $M_iF_0$ precipitation intensity tile layer (8010, 8020) are shifted using tiles of $M_iF_0$ wind vector tile layer (8030) to generate a first forecast blended precipitation intensity tile layer (8102) which is saved to precipitation forecast database (325) as $M_iF_1$ forecast instance (8100) in the Forecast Stack. At each subsequent iteration of step (19400), a new forecast $M_iF_j$ precipitation intensity tile layer is generated by shifting tiles of $M_iF_{(j-1)}$ precipitation intensity layer using tiles of $M_iF_{(j-1)}$ wind vector tile layer (to produce forecast instances 8110, 8120, 8130, and so on). Each $M_iF_{(j-1)}$ forecast precipitation intensity tile layer (8112, 8122, 8132, etc.) is saved to precipitation forecast database (325) as the $M_iF_{(j-1)}$ Forecast Stack. An exemplary method for shifting precipitation intensity tiles using wind vector tiles is described below in relation to FIG. 36.

At step (19410), forecast precipitation intensity of each tile of the forecast precipitation intensity tile layer of $M_iF_j$ Forecast Stack is adjusted to account for incremental rise of decay of precipitation intensity estimated either a convective storm or a stratiform storm rise and decay profile, depending on the classification of the tile. Exemplary decay profiles (precipitation intensity versus time) are illustrated for a convective storm (FIG. 35A) and for a stratified storm (FIG. 35B). As previously discussed, the modeling and prediction server (360) determines a peak intensity value for each storm and the corresponding decay curve is scaled using the calculated peak intensity. Precipitation intensity at a tile is mapped to the corresponding scaled decay curve and then adjusted by time shifting, using the iteration time increment, along the curve. The $M_iF_j$ forecast precipitation intensity tile layer, including tiles with wind shifted and decay adjusted precipitation intensity values, is saved (19420) to forecast results database (325) in the $M_iF_j$ Forecast Stack.

If the forecasting iterations are complete (19430), for example if all 12 iterations of a 60 minute forecast that has been broken into five minute increments have been completed, forecasting process (19000) ends (19500).

If additional iterations are required to finish the forecast simulation, the simulation time is incremented (19440) to $M_iF_{(j+1)}$. The $M_iF_j$ precipitation tiles and the $M_iF_j$ wind vector tiles, which will be used to shift the $M_iF_j$ precipitation tiles to generate precipitation forecast tiles (i.e. $M_iF_{(j+1)}$ forecast precipitation tiles), during the new simulation time point are loaded (19450), and the iteration steps are repeated, for example by returning to step (19300) reclassifying precipitation tile storm type and decay profile.

Alternatively (not shown) each iteration can include reusing previous storm intensity and decay profile classifications, in which case forecasting process (19000) proceeds to precipitation shift step (19400) following wind vector loading (19450).

Referring to FIG. 31, in an exemplary method for shifting precipitation intensity tiles using wind vector tiles in step (19400) of forecasting process (19000) precipitation intensity is shifted into and out of each tile of a precipitation tile layer (e.g. each tile of precipitation tile layer of forecast stack $M_iF_j$) individually. Precipitation intensity shifting by wind vectors can be calculated for each of multiple tiles in parallel and calculations for each tile can be performed by an individual processor of a plurality of parallel processors. Precipitation forecasting can thus be massively parallelized. A subject precipitation tile (21110) is isolated from the precipitation tile layer of forecast stack $M_iF_j$ and a precipitation tile palette (21100) is generated. Precipitation palette (21100) includes subject precipitation tile (21110) and the eight precipitation cells surrounding the subject precipitation tile.

Wind vector palette (21300) includes wind vector tile (21310) of a wind vector tile layer of forecast stack $M_iF_j$ and the eight wind vector tiles surrounding wind vector tile (21310). Wind vector tile (21310) corresponds to subject precipitation tile (21110) and the eight wind vector tiles surrounding wind vector tile (21310) correspond to the eight precipitation tiles surrounding the subject precipitation intensity tile (21110).

The modeling and prediction server (360) can execute a shift by wind function (21600) to shift precipitation intensity out of subject precipitation tile (21110) and into one or more surrounding precipitation tiles of precipitation tile palette (21100) and out of one or more surrounding precipitation tiles and into subject precipitation intensity tile (21110) from one or more surrounding precipitation tiles. Wind vectors of wind vector tiles comprising wind vector tile palette (21300) are used to shift the precipitation intensities between precipitation intensity tiles. Wind shift function (21600) produces shifted precipitation intensity tile (21510). Precipitation intensity tile (21510) is a precipitation intensity tile of forecast precipitation intensity tile layer of Forecast Stack $M_iF_{(j+1)}$.

Wind vector magnitude of each wind vector tile of palette (21300) is converted by shift by wind function (21600) to numerical value describing how many tiles the precipitation intensity at a particular precipitation intensity tile will be shifted. Wind vector direction determines in what direction the precipitation intensity and wind intensity value will be shifted. For example, a wind vector tile with magnitude of 2 and direction of due west will shift a first precipitation intensity at a first precipitation intensity tile to a second precipitation intensity tile that is located two tiles west of the first tile. A second precipitation intensity at a third precipitation intensity tile located two tiles to the east of the first tile and also subject to a magnitude 2, due west wind vector will be shifted two tiles to the west as well, such that, following the wind shift step (19400), the first precipitation intensity tile will include the second precipitation intensity.

If multiple precipitation intensities are shifted to a subject precipitation intensity tile (21310), the precipitation intensities located at the subject tile following the shift are summed at the precipitation intensity tile. For example, if a third precipitation intensity and the first precipitation intensity are both shifted to the subject precipitation intensity tile (21110), the precipitation intensity at the subject precipitation intensity tile will be, after step (19400), the sum of the first and third precipitation intensities.

If a wind vector value is an integer less than 1, a portion of the precipitation intensity will be shifted. For example, a wind vector of magnitude 0.1 will shift 10% of the precipitation intensity value by 1 grid point and 90% of the precipitation intensity value will not be shifted.

Shift by wind function (21600) can be executed independently for each subject tile (21100) of a $M_iF_0$ precipitation layer. Forecasting calculation can thus be carried out by a plurality of processors, all operating in parallel. Calculation of each precipitation intensity tile (21510) can be carried out by one of the plurality of parallel operating processors to reduce forecast processing time.

6.8 Example Uses of the Technology

6.8.1 Hydrology Services

Freshwater flood prediction and notification systems rely on accurate and timely measurements of accumulated precipitation amount and type, forecast precipitation intensities, and accumulation amounts and precipitation types within a particular river or stream drainage basin, which are combined with other information such as river streaming strength, geographic, soil, and vegetation characteristics of the drainage basin and other information in ways known in the art.

Traditional methods of predicting fresh water floods are based upon radar data, and rain gauge measurements, and waterway flow measurements. Rain gauges typically are sparsely distributed and measurement can have a long sampling periodicity. Radar-predicted precipitation intensity estimates are problematic in that they often do not accurately reflect ground level precipitation and have poor geospatial resolution, generally no better than 1 km square and often worse. In addition, radar predicted measurements are often not available for steeply sloped or urban areas due to technology limitations.

The described technology enables improved flood prediction and warning by providing granular and accurate measurements of real time, historic, and forecast precipitation intensity and accumulations in both rural and urban areas, including in regions and topographies where traditional weather monitoring infrastructure is limited or is unable to provide spatially high resolution and accurate precipitation measurements and forecasts.

In a non-limiting example, a user interacts with a user interface (for example, User interface 1000 of FIG. 15) or has a program that interacts with an system's API (835) in order to identify and retrieve sets of high temporal and spatial resolution collected and forecast precipitation data such as accumulated and forecast precipitation amounts and type. This information can be input by the user into external flood prediction systems such as CI-FLOW (not shown in drawings).

Alternatively, a flood prediction program may be added to the modeling and prediction server (360) using the extensible forecast mechanism described earlier. The flood prediction program is executed automatically as part of each cadence instances forecast calculations. The extension flood production program is configured to execute as part of the pre-forecast processing stage, and again at the end of each forecast cycle, in order to calculate water flow amounts. This program generates data calculated based upon the flow modelling program and takes as inputs the precipitation type, intensity and accumulation, and outputs stream and river flow forecasts based upon preconfigured geographic conditions of a drainage basin, soil characteristics, streaming strength measurements, etc. The results of these calculations are stored in a system database associated with the flood prediction program, and are represented as a forecast tile layer associated with waterway flows. The modeling and prediction server (360) can be further configured to monitor the forecast flows within locations of interest and to have the information distribution and alerting server (370) send notifications and alerts if preconfigured thresholds are exceeded.

In a non-limiting example, a user defines one or more locations of interest as well as the parameters to be collected from the system. The user also defines a start time and, optionally, an end time of the desired data. The information distribution and alerting server (370) uses this input information to determine the cadence instances and cadence instance tile layers that correspond to the selected types of data and locations of interest. The desired cadence instances may be identified algorithmically (e.g. $M_{(i-h)}$ through $M_j$) where $M_i$ is the current or most recent cadence instance, $M_{(i-h)}$ is a cadence instance that corresponds to the start time, and $M_j$ is the cadence instance that corresponds to the end time selected. The information distribution and alerting server (370) then identifies the desired data (e.g. flow rate data) using the cadence instance forecast tile stacks, e.g. $M_i$, $F_0$ to $F_t$ where $F_t$ is a forecast at a defined end time, and the specific tiles within each tile layer from the locations of interest. This information is then retrieved and made available to the user, either as part of a user interface display or as part of a report. The user may also specify alerts for specified locations of interest as desired, and the system will generate those alerts when specific value thresholds are reached.

6.8.2 Water System Management

Water system management operators can use the disclosed technology to obtain data and configure alerts to support management decisions by municipal, regional and wide area water management systems. In a non-limiting example, an operator can define one or more locations of interest for monitoring. As discussed above in relation to hydrology services, the disclosed technology can access one or more cadence instances $M_iF_j$ to determine accumulated, real-time, and forecast precipitation estimates and display, for the operator, the accumulated precipitation for a location of interest for a selected period of time. This information is provided with higher fidelity than traditional weather prediction systems due to the improved forecasting algorithms and information sources. Exemplary displays and/or reports can include locations colored according to an amount of accumulated precipitation, a graph that that shows precipitation accumulation as a function of time per given location, and alerts, configured by the operator, that indicate when accumulated precipitation for a location exceeds a defined level.

6.8.3 Insurance

Insurance providers can obtain, from the disclosed technology, improved granular weather data including historic precipitation data that is both more accurate than previously available and that has greater temporal and spatial resolution than other historically or currently available data sources. Insurance providers use the historic precipitation data to predict risk to an insured based upon adverse weather events, and adjust their underwriting accordingly. These decisions may be made for general locales, or for specific locations down to and including on a per structure basis. Historic and estimated weather data including precipitation type and estimates can also be used by insurance providers to assess damage claims. For example, an insurance provider can access historic precipitation estimates corresponding to an insured building for which a hail damage claim has been filed and determine, based on the historic data, whether the building was likely exposed to a hail event of sufficient severity to cause the claimed damage.

In a non-limiting example, a user of the system defines a location of interest corresponding to a structure, and uses the system to query the cadence instance tile stacks for precipitation type and amount estimates (and other weather parameter data such as forecast wind velocities). This data is available as a set of cadence instances bounded by $M_0$ and $M_i$ where $M_0$ includes the earliest data collected by the system and $M_i$ is the current cadence instance. This data is used to identify locations where rapidly developing, severe, or extreme weather events have occurred in the past, which may be associated with increased future risk. The information selected data is retrieved from the database and is either returned and displayed graphically in a display, returned in a report, or may be returned as a data set that can be input into insurance company computing systems used for making underwriting decisions. Alternatively, the system may be configured to generate alerts and notifications based upon the returned data, such as notifications based upon locations of interest that may have been damaged by weather, or that are in a location that is expected to be effected by forecast severe weather.

6.8.4 Agriculture and Finance/Commodities Trading

High fidelity historical, real time, and forecast precipitation data may be provided by the disclosed technology to farmers and other agricultural customers with improved resolution and fidelity and may be used to make "in the field" decisions regarding the cultivation and harvesting of crops on the basis of weather information. The improved fidelity and granularity of the information supports improved prediction capabilities, for example, on a field by field basis instead of current systems that provide county by county resolution and poor forecast to actual event correlation. A farmer (user) uses accumulated and predicted precipitation estimates to make management and planning decisions, such as when and how much to irrigate each field, planning subsurface and other drainage systems, planning optimal crop selection based on when and how much rain historically falls on a particular field, planning harvesting schedules based on expected rain events, pesticide application rates and times, and initiating preventative actions to protect crops from predicted weather events such as hail storms.

In a first non-limiting example, a farmer defines a location of interest as one or more of the fanner's fields for which precipitation data is desired and a desired time period that data is requested for, and the system provides historical and forecast precipitation amounts and types. In an alternative implementation, the disclosed technology can use imaging analysis of map data to determine locations of fields and automatically create definitions for the locations of interest which are communicated to the system using the API (835). The system determines the cadence instances and tile layers that correspond to the defined locations of interest and requested data. The system the retrieves the requested data (such as precipitation estimates) from the appropriate system databases and makes that information available to the user (the farmer). In this way, accurate field level historic and predicted precipitation data can be provided to users.

Additional users, for example commodity traders, can acquire precipitation estimates corresponding to selected types of crops, for example cotton or coffee, including real time aggregated precipitation measurements of all fields of the selected crop in a region, country or continent to enable better prediction of commodity price and supply. In addition, commodity traders can make improved short term commodity trades based on how predictions about crops were or may be affected by weather events using the system's improved weather data to support their trading programs.

6.8.5 Utilities and Electric

The disclosed technology provides utility companies with accurate and precise weather-related information useful for optimizing power production schedules and for allocating prevention and repair resources. An electric power utility forecasts electric power demand using weather parameter information including real-time and forecast rain estimates, humidity, and temperature data. Power production schedules can be planned to accommodate predicted increases or decreases in power consumption that may be related to increases or decreases in air conditioning use that may occur in response to temperature magnitudes, humidity levels, rain events, and combinations thereof. An electric power utility selects an area to be monitored by defining one or more locations of interest and setting a prediction time frame. For example, if a user selects a six hour forecast for a location of interest, the modeling and prediction server (360) determines the cadence instance and tile layers that correspond to the selected weather parameters, location of interest, and timeframes and retrieves weather parameter data corresponding to the forecast tiles stacks from one or more system databases.

Utility companies can use spatially and temporally accurate accumulated and predicted data provided by the disclosed technology to recognize and predict snow, sleet, and icing conditions that have the potential to damage power lines.

6.8.6 Outdoor Venues

Real time and forecast data including precipitation and precipitation type provided by the disclosed technology can be used by operators of outdoor venues, and customers of the venues, to aid in decision making. The disclosed technology can provide highly accurate short term, for example 120 minute forward looking, precipitation forecasting.

In a non-limiting example, users configure event venues as locations of interest to receive precipitation forecast data and set up alerts including, for example, forecast start and end time of a precipitation event that could affect a planned event. Once the user has set up the configuration, the information distribution and alerting server (370) can determine the cadence instance and tiles that correspond to selected event locations for the selected weather parameters. The information distribution and alerting server (370) can retrieve requested weather parameter information such as, for example, forecast precipitation intensity, forecast wind, forecast temperature, and other weather parameter forecast data from corresponding to cadence instance tile stacks $M_iF_0$ through $M_iF_k$ where $M_iF_k$ is the cadence instance tile stack corresponding to the most distant forecast time point. Customers can use weather information to make go/no go decisions for events, for taking preventative measures such as covering a playing field if heavy rain is predicted and for shifting start times and resume times of events based on predicted weather conditions.

6.8.7 Smart Cities

The disclosed technology can provide data useful for decision making by smart city customers including city, county, and other municipality managers and decision makers. Data provided to smart city customers can include historic, real-time, and forecast weather data including precipitation intensity and type, precipitation accumulation, real time and predicted fog data, and visibility data. Data can include weather related alerts and warnings.

The disclosed technology can provide snowfall accumulation maps that can be used by customers to optimize snow removal efforts. The disclosed technology can display a map of a city or selected region with color coding of snow accumulation on streets and parking lots that can be used by customers to plan snow plow routes and schedules. Street and parking lot geography can be determined automatically by the disclosed technology using image recognition techniques or by access data sources such as street displays on Google maps. Snowfall accumulation and predicted accumulation can be provided at locations selected by a smart city customer, for example accumulation on a parking lot can be requested by the customer defining the parking lot as a location of interest. Accumulation at important locations such as main intersections, hospital and emergency service entrance or access locations, and accumulations at locations along roadways can be requested by a customer marking locations of interest at selected locations. The information distribution and alerting server (370) can determine tiles that correspond to roads, parking lots, and other locations for which snowfall information is desired. The information distribution and alerting server (370) can retrieve snow and other precipitation accumulation historic data from corresponding to cadence instance tile stacks $M_i$, i=x to y where $M_x$ is a cadence instance corresponding to an earliest desired historical time point and $M_y$ is the cadence instance corresponding to the current time. The information distribution and alerting server (370) can retrieve forecast data from cadence instance tile stacks $M_iF_0$ through $M_iF_k$ where $M_iF_k$ is the cadence instance tile stack corresponding to the most distant forecast time point. The disclosed technology can provide predictions including an estimate of a time at which snow accumulation will reach a threshold at a selected location and warnings when a threshold is reached or surpassed.

The disclosed technology can provide smart city customers accurate weather inputs for other weather-related decision making processes such as for determining when to close roads or bridges and for posting warning signs in case of current or predicted floods, storms, and other intense weather events. Smart city customers can use real-time and predicted data for street light optimization. For example, customers can optimize street light operation during daytime based on current and predicted visibility which can be determined using measurements of rain intensity, fog, and pollutants. Smart city customers can also optimize waste water treatment facility operations and drainage operations based on accumulated, real time, and forecast precipitation data.

6.8.8 Aviation

The disclosed technology can provide accumulated, real time, and forecast weather data that is useful for aviation customers including airports, pilots, and passenger and freight air carriers. The disclosed technology can estimate RVR data and other aviation related information. Aviation customers can receive additional weather parameter information including historic, predicted, and real time precipitation types, rates, and accumulations.

Aviation customers can configure the information distribution and alerting server (370) with alerts to generate warnings and notifications based on accumulated, real time, and predicted weather data including precipitation estimates. Notifications can warn of current or predicted icing conditions on a runway, which can be determined based on precipitation and temperature data. Notifications can include a report of current precipitation type and precipitation accumulation estimates, such as estimates of snow, rain, or hail accumulation on a runway, as well as a predicted time for surpassing a threshold accumulation amount and can include a warning when accumulation reaches a threshold amount. Alerts can include notifications to warn aviation customers of potentially damaging weather events such as hail or lightning based on forecast data.

6.8.9 Transportation

Ground or water transportation customers can receive per-route weather monitoring and forecasting data to help operational planners, drivers, and other transport operators select an optimal route and modify a selected route, while navigating the route, in response to changing or forecast conditions. The improved weather forecasting of the described technology permits more accurate estimation of travel delays due to weather. The disclosed technology can generate notifications based on real-time and forecast data including warnings regarding potential icing conditions, low visibility due to fog or snow squalls, snow accumulation on specific roads or in specific locations or areas.

6.9 Conclusion

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and implementations where it is desirable to improve the accuracy and timeliness of precipitation forecasts. Accordingly, the claims set forth below should be construed in view of the full breadth and spirit of the technology as disclosed herein.

What is claimed is:

1. A computer-operated method for producing accurate, temporally-current weather forecasts comprising:
    (a) receiving, with at least one processor, a request for geolocated weather information, the request having a geolocation parameter associated therewith;
    (b) identifying, with the at least one processor, at least one temporal forecast time series from a time series of temporal forecasts associated with at least one cadence instance of a cadence cycle comprising a series of repeating processing operations that collect weather data, process weather data, and generate forecast weather data;
    (c) in response to the geolocation parameter, the at least one processor selecting weather forecast information from the identified at least one temporal forecast time series associated with the at least one cadence instance of the cadence cycle; and
    (d) based on the selecting weather forecast information, the at least one processor electronically providing temporally-updated geolocated weather forecast information in response to the request;
    wherein the cadence cycle is not required to be synchronized with the series of repeating processing operations that collect weather data.

2. The method of claim 1 wherein the request includes a time or time range and the identifying and selecting is performed based at least in part on the time or time range.

3. The method of claim 1 wherein the weather forecast information is associated with a plurality of cadence instances of the cadence cycle.

4. The method of claim 1 further including updating the identified at least one temporal forecast time series with received weather information.

5. The method of claim 1 wherein the selecting includes selecting weather forecast information associated with a past cadence instance.

6. The method of claim 1 wherein the selecting includes selecting weather forecast information associated with a current cadence instance.

7. The method of claim 1 wherein the selecting includes selecting weather forecast information associated with a cadence instance not more than X minutes old.

8. The method of claim 1 wherein the selecting includes selecting weather forecast information associated with at least first and second cadence instances, the second cadence instance being older than the first cadence instance.

9. The method of claim 1 wherein the selecting includes selecting weather forecast information from a future forecast associated with a current cadence instance.

10. The method of claim 1 wherein the selecting includes selecting weather forecast information from a future forecast associated with a past cadence instance.

11. A computer-operated system for producing accurate, temporally-current weather forecasts, the system comprising:
    a storage storing instructions; and
    a processor connected to the storage, the processor executing the stored instructions;
    wherein the instructions comprise instructions that control the processor to:
    (a) receive a request for geolocated weather information, the request having a geolocation parameter associated therewith;
    (b) identify at least one temporal forecast time series from a time series of temporal forecasts associated with at least one cadence instance of a cadence cycle comprising a series of repeating processing operations that collect weather data, process weather data and generate forecast weather data;

(c) in response to the geolocation parameter, select weather forecast information from the identified at least one temporal forecast time series associated with the at least one cadence instance of the cadence cycle; and (d) based on the selecting weather forecast information, electronically provide temporally-updated geolocated weather forecast information in response to the request, wherein the cadence cycle is not required to be synchronized with the series of repeating processing operations that collect weather data.

12. The system of claim 11 wherein the request includes a time or time range and the processor is configured to identify and select based at least in part on the time or time range.

13. The system of claim 11 wherein the weather forecast information is associated with a plurality of cadence instances of the cadence cycle.

14. The system of claim 11 wherein the instructions configure the processor to update the identified at least one temporal forecast time series with received weather information.

15. The system of claim 11 wherein the instructions configure the processor to select weather forecast information associated with a past cadence instance.

16. The system of claim 11 wherein the instructions configure the processor to select weather forecast information associated with a current cadence instance.

17. The system of claim 11 wherein the instructions configure the processor to select weather forecast information associated with a cadence instance not more than X minutes old.

18. The system of claim 11 wherein the instructions configure the processor to select weather forecast information associated with at least first and second cadence instances, the second cadence instance being older than the first cadence instance.

19. The system of claim 11 wherein the instructions configure the processor to select weather forecast information from a future forecast associated with a current cadence instance.

20. The system of claim 11 wherein the instructions configure the processor to select weather forecast information from a future forecast associated with a past cadence instance.

21. A non-transitory computer-readable storage storing instructions that, when executed by a processor, control the processor to perform operations comprising:

(a) receive a request for geolocated weather information, the request having a geolocation parameter associated therewith;

(b) identify at least one temporal forecast time series from a time series of temporal forecasts associated with at least one cadence instance of a cadence cycle comprising a series of repeating processing operations that collect weather data, process weather data, and generate forecast weather data;

(c) in response to the geolocation parameter, select weather forecast information from the identified at least one temporal forecast time series of repeating processing operations that collect weather data, process weather data, and generate forecast weather data; and (d) based on the selecting weather forecast information, electronically provide temporally-updated geolocated weather forecast information in response to the request, wherein the cadence cycle is not required to be synchronized with the series of repeating processing operations that collect weather data.

22. The computer-readable storage of claim 21 wherein the request includes a time or time range and the stored instructions configure the processor to identify and select based at least in part on the time or time range.

23. The computer-readable storage of claim 21 wherein the weather forecast information is associated with a plurality of cadence instances of the cadence cycle.

24. The computer-readable storage of claim 21 wherein the instructions configure the processor to update the identified at least one temporal forecast time series with received weather information.

25. The computer-readable storage of claim 21 wherein the instructions configure the processor to select weather forecast information associated with a past cadence instance.

26. The computer-readable storage of claim 21 wherein the instructions configure the processor to select weather forecast information associated with a current cadence instance.

27. The computer-readable storage of claim 21 wherein the instructions configure the processor to select weather forecast information associated with a cadence instance not more than X minutes old.

28. The computer-readable storage of claim 21 wherein the instructions configure the processor to select weather forecast information associated with at least first and second cadence instances, the second cadence instance being older than the first cadence instance.

29. The computer-readable storage of claim 21 wherein the instructions configure the processor to select weather forecast information from a future forecast associated with a current cadence instance.

30. The computer-readable storage of claim 21 wherein the instructions configure the processor to select weather forecast information from a future forecast associated with a past cadence instance.

* * * * *